(12) United States Patent
Zeng et al.

(10) Patent No.: US 7,983,500 B2
(45) Date of Patent: Jul. 19, 2011

(54) ENCODING METHOD, ENCODING APPARATUS, DECODING METHOD, AND DECODING APPARATUS

(75) Inventors: Zhifang Zeng, Shanghai (CN); Junichi Ogikubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 1199 days.

(21) Appl. No.: 11/702,930

(22) Filed: Feb. 6, 2007

(65) Prior Publication Data

US 2007/0217704 A1 Sep. 20, 2007

(30) Foreign Application Priority Data

Feb. 8, 2006 (JP) .................................. 2006-031649

(51) Int. Cl.
*G06K 9/46* (2006.01)
(52) U.S. Cl. ........................................ 382/245; 382/232
(58) Field of Classification Search .......... 382/232–253; 375/240–241
See application file for complete search history.

(56) References Cited

U.S. PATENT DOCUMENTS

| | | | | |
|---|---|---|---|---|
| 4,679,094 A * | 7/1987 | Rutherford et al. | ...... | 358/426.09 |
| 5,367,383 A * | 11/1994 | Godshalk et al. | ............. | 382/239 |
| 6,078,696 A * | 6/2000 | Nguyen et al. | ................ | 382/253 |
| 6,205,252 B1 * | 3/2001 | Nguyen et al. | ................ | 382/234 |
| 6,826,227 B1 * | 11/2004 | Duval et al. | .................... | 375/240 |
| 7,142,604 B2 * | 11/2006 | De Lameillieure | ...... | 375/240.26 |
| 7,466,867 B2 * | 12/2008 | Sung et al. | .................... | 382/246 |
| 7,570,819 B2 * | 8/2009 | Sung et al. | .................... | 382/232 |
| 2002/0071505 A1 * | 6/2002 | Cameron et al. | ............. | 375/341 |
| 2002/0110196 A1 * | 8/2002 | Nguyen et al. | ........... | 375/240.22 |
| 2003/0053701 A1 * | 3/2003 | Shiraishi | ....................... | 382/237 |
| 2003/0179938 A1 * | 9/2003 | Van der Vleuten | .......... | 382/232 |
| 2005/0249427 A1 * | 11/2005 | Shiraishi | ...................... | 382/245 |
| 2006/0115166 A1 * | 6/2006 | Sung et al. | .................... | 382/239 |
| 2006/0171596 A1 * | 8/2006 | Sung et al. | .................... | 382/232 |

FOREIGN PATENT DOCUMENTS

| | | |
|---|---|---|
| JP | 10 190478 | 7/1998 |
| JP | 2005 354643 | 12/2005 |

* cited by examiner

*Primary Examiner* — Bhavesh M Mehta
*Assistant Examiner* — Sean Motsinger
(74) *Attorney, Agent, or Firm* — Frommer Lawrence & Haug LLP; William S. Frommer; Ellen Marcie Emas

(57) ABSTRACT

An encoding method of losslessly encoding picture data is disclosed. The picture data are composed of pixel data. The pixel data whose number of quantizer bits is larger than eight bits are separated into a first portion and a second portion. The first portion is composed of eight bits on an LSB side. The second portion is composed of remaining bits on an MSB side excluding the first portion. A first encoding process is losslessly performed for the first portion. A second encoding process is losslessly performed for the second portion. The second encoding process is different from the first encoding process.

30 Claims, 61 Drawing Sheets

1A

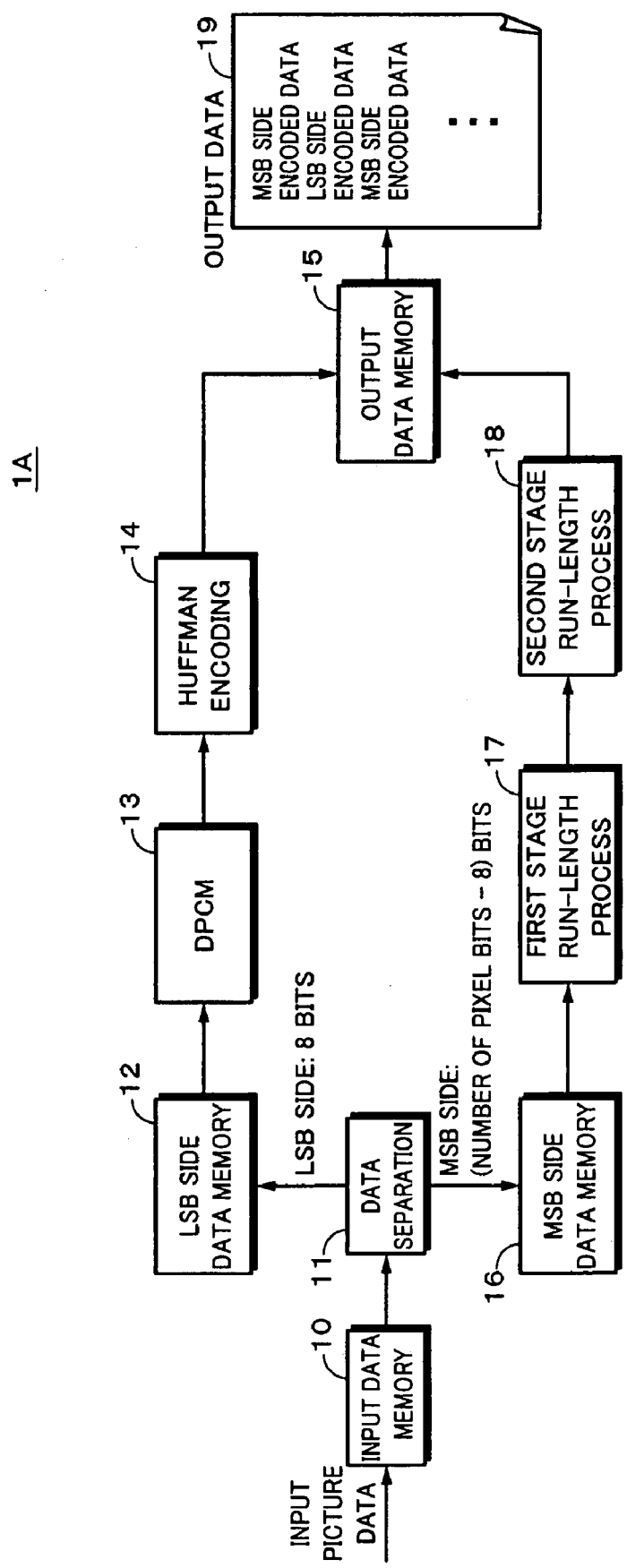

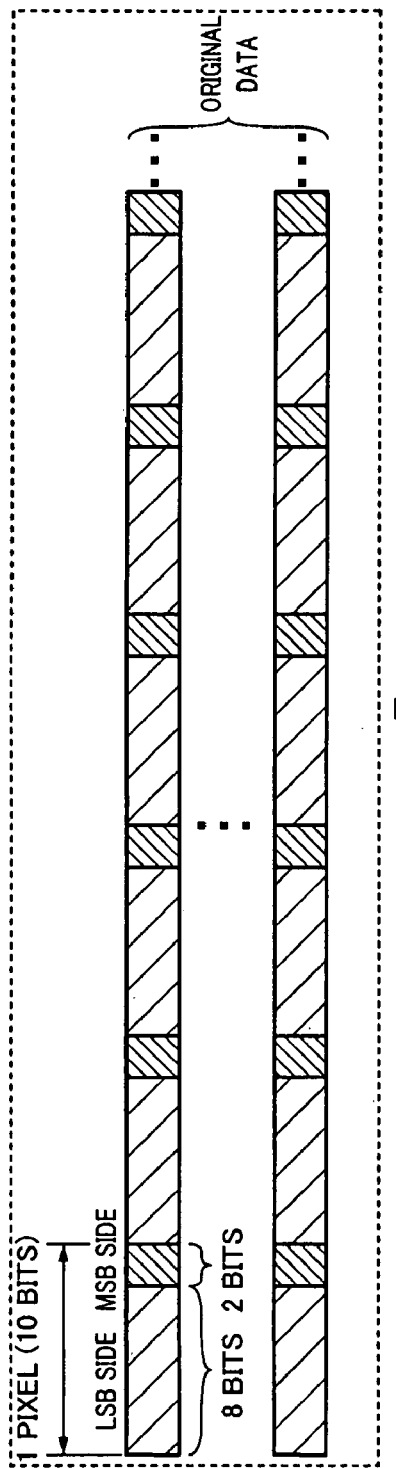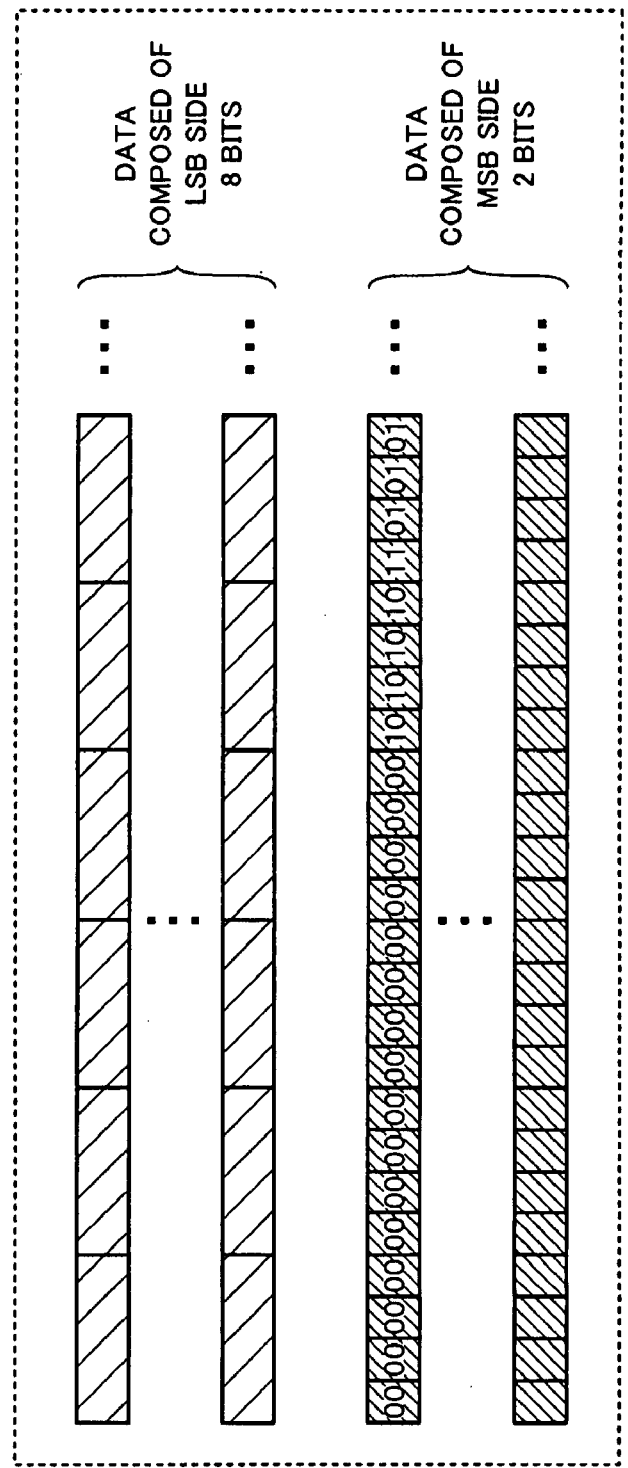

Fig. 4

| | ORIGINAL PIXEL DATA | MSB SIDE DATA | NUMBER OF REPETITIONS (NUMBER OF RUNS OF RUN-LENGTH PROCESS IN 1 BYTE) |
|---|---|---|---|
| PIXEL 9 BITS | 9 bits (1 MSB side bit, 8 LSB side bits) | MSB SIDE BIT (1 BIT): 11111111 (8) | 8 |
| PIXEL 10 BITS | 10 bits (2 MSB side bits, 8 LSB side bits) | MSB SIDE BITS (2 BITS): 2 2 2 2 (8) | 4 |
| PIXEL 11 BITS | 11 bits (3 MSB side bits, 8 LSB side bits) | MSB SIDE BITS (3 BITS), STAFFING: 3 3 (8) | 2 |
| PIXEL 12 BITS | 12 bits (4 MSB side bits, 8 LSB side bits) | MSB SIDE BITS (4 BITS): 4 4 (8) | 2 |

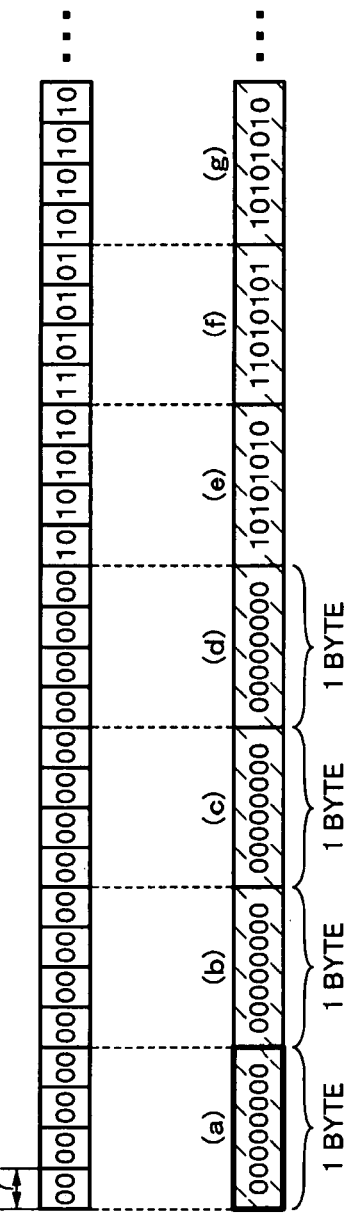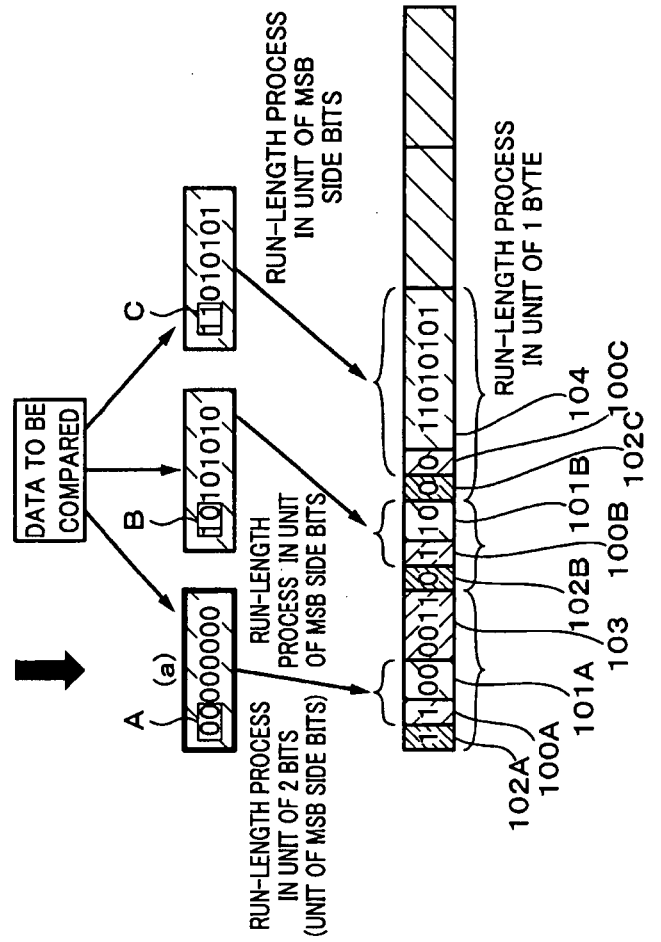

Fig. 17
| | ORIGINAL PIXEL DATA | MSB SIDE DATA | NUMBER OF REPETITIONS (NUMBER OF RUNS OF RUN-LENGTH PROCESS IN 2 BYTES) |
|---|---|---|---|
| PIXEL 9 BITS | 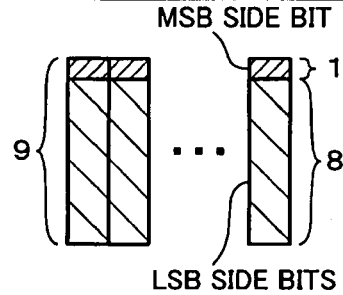 | 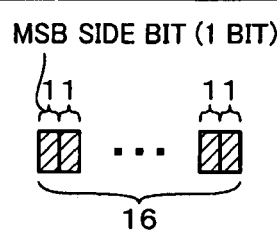 | 16 |
| PIXEL 10 BITS | 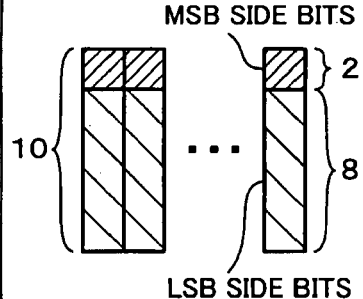 | 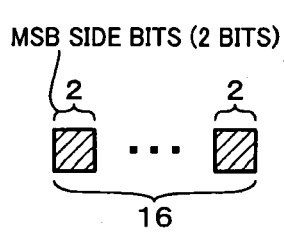 | 8 |
| PIXEL 11 BITS | 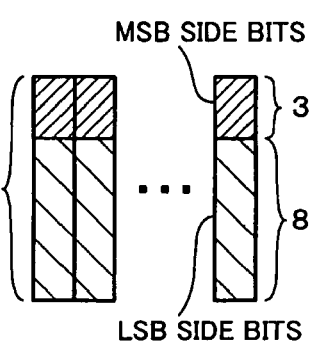 | 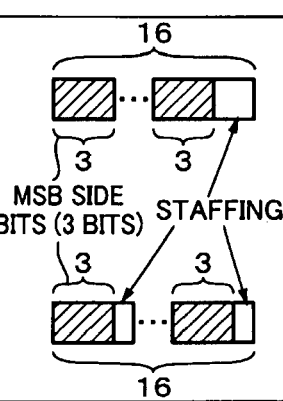 | 4 |
| PIXEL 12 BITS | 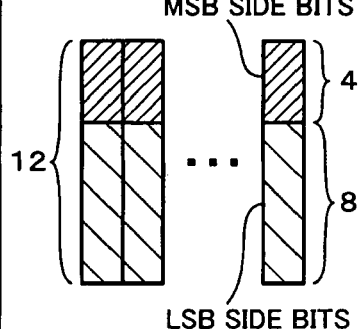 | 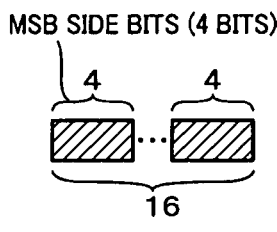 | 4 |

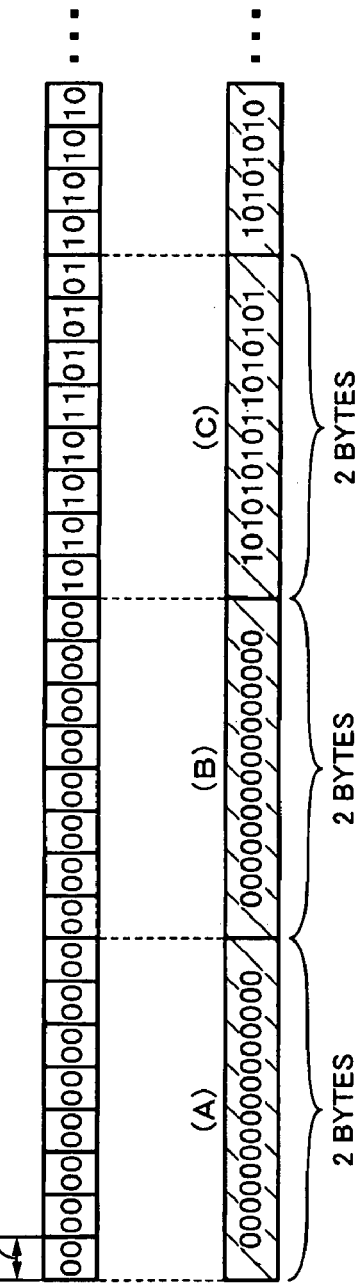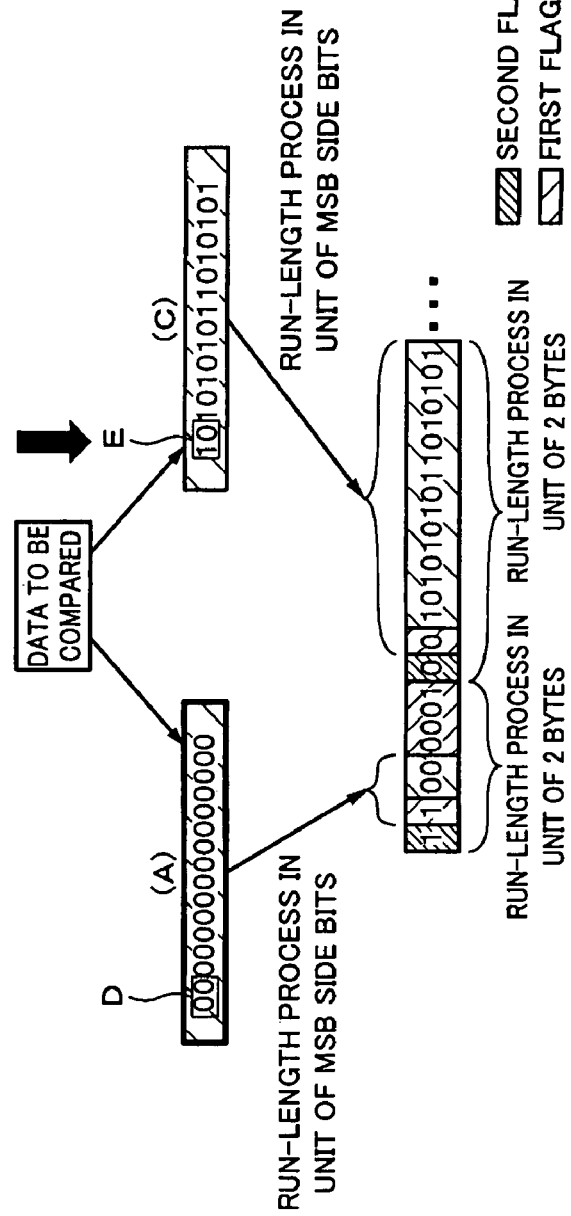

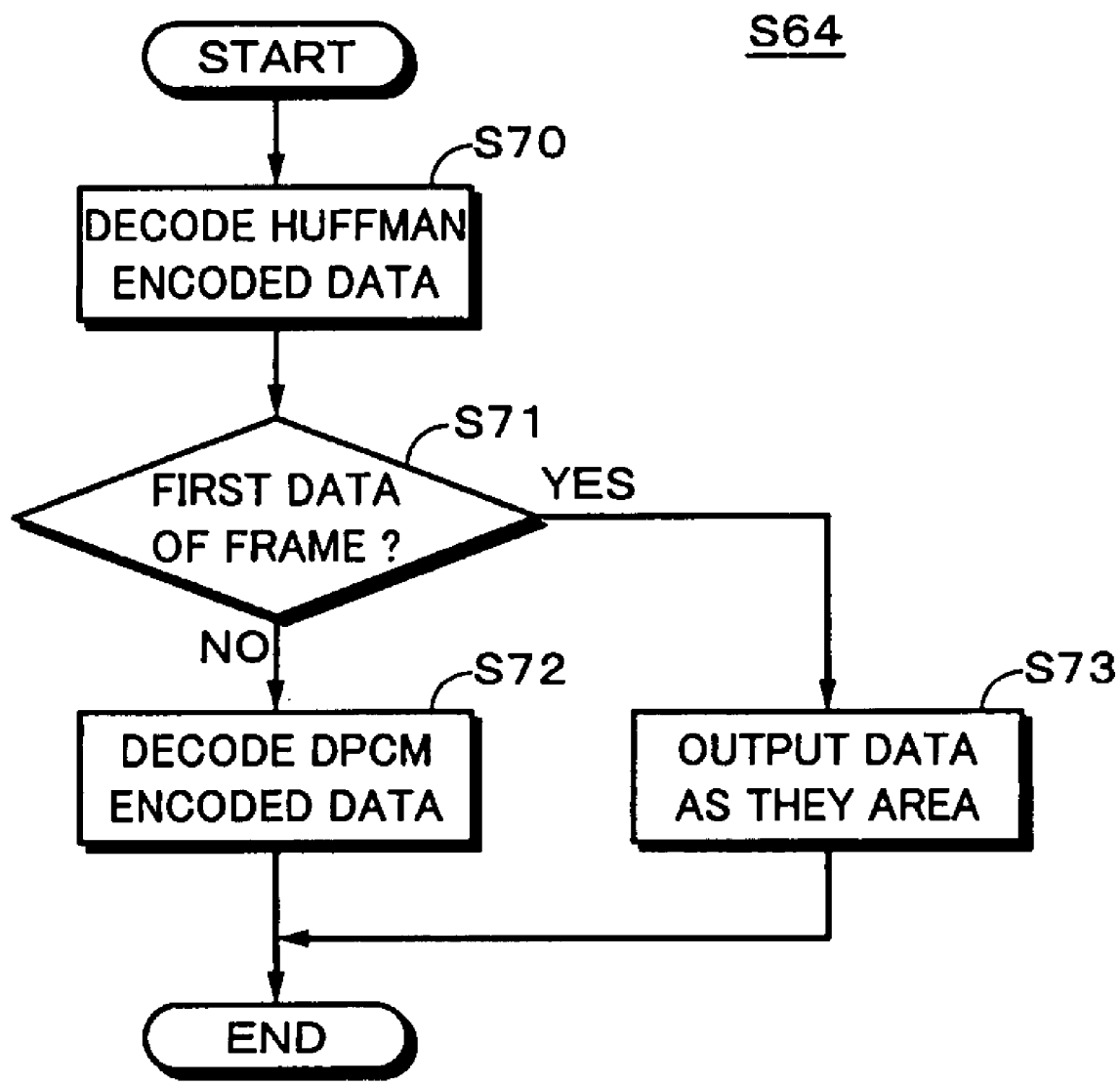

Fig. 25A

MSB SIDE ENCODED DATA  `11 1 00 0011`

Fig. 25B

| DECODING PROCEDURE | DATA | PROCESS | OUTPUT DATA |
|---|---|---|---|
| (1) | `1` | READ 1 BIT. SINCE SECOND FLAG = 1, RUN-LENGTH PROCESS HAS BEEN PERFORMED IN UNIT OF 1 BYTE. | |
| (2) | `1` | READ 1 BIT. SINCE FIRST FLAG = 1, RUN-LENGTH PROCESS HAS BEEN PERFORMED IN 1 BYTE. | |
| (3) | `00` | READ 2 BITS AND REPEATEDLY OUTPUT "00" FOUR TIMES. | `00 00 00 00` |
| (4) | `0011` | READ 4 BITS, OBTAIN "3" AS NUMBER OF RUNS OF RUN-LENGTH IN UNIT OF 1 BYTE, AND REPEATEDLY OUTPUT DATA "00000000" THAT HAS BEEN JUST OUTPUT. | `00 00 00 00 00 00 00 00 00 00 00 00` |

▨ SECOND FLAG
▧ FIRST FLAG
☐ LEVEL OF RUN-LENGTH IN UNIT OF MSB SIDE BITS
▨ NUMBER OF RUNS IN UNIT OF 1 BYTE

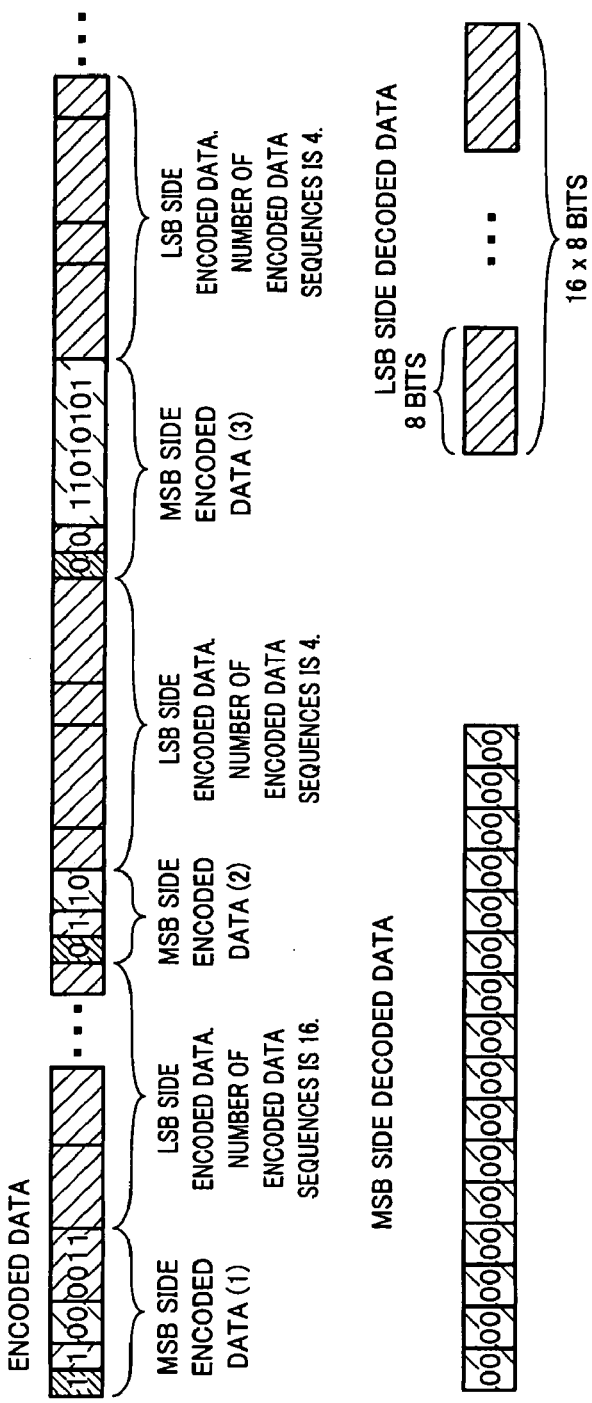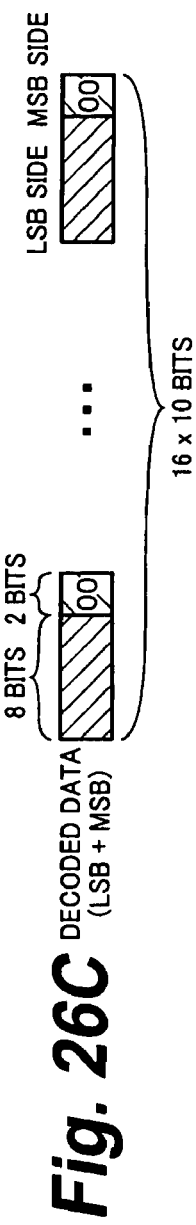

Fig. 27A  MSB SIDE ENCODED DATA

Fig. 27B

| DECODING PROCEDURE | DATA | PROCESS | OUTPUT DATA |
|---|---|---|---|
| (1) |  | READ 1 BIT. SINCE SECOND FLAG = 0, RUN-LENGTH PROCESS HAS NOT BEEN PERFORMED IN UNIT OF 1 BYTE. |  |
| (2) |  | READ 1 BIT. SINCE FIRST FLAG = 1, RUN-LENGTH PROCESS HAS BEEN PERFORMED IN 1 BYTE. |  |
| (3) | 10 | READ 2 BITS AND REPEATEDLY OUTPUT "10" FOUR TIMES. | 10 10 10 10 |

SECOND FLAG
FIRST FLAG
LEVEL OF RUN-LENGTH IN UNIT OF MSB SIDE BITS
NUMBER OF RUNS IN UNIT OF 1 BYTE

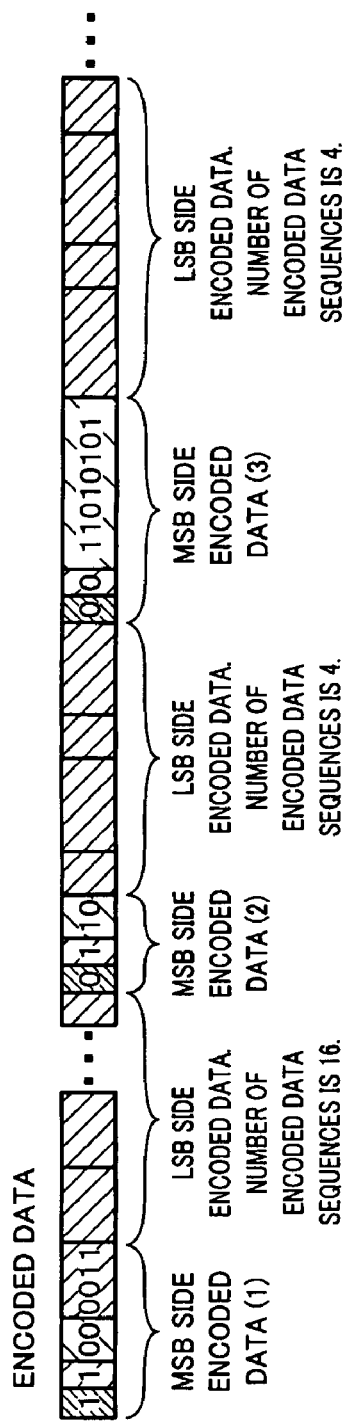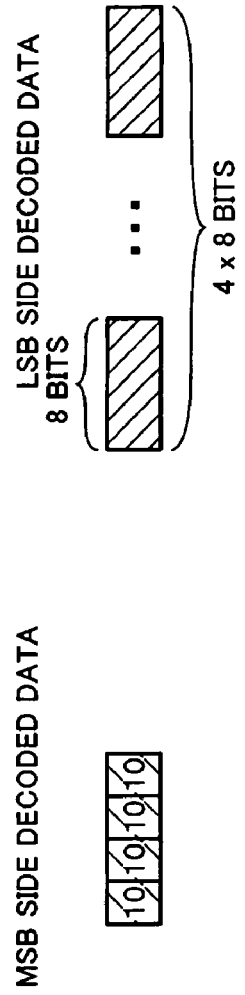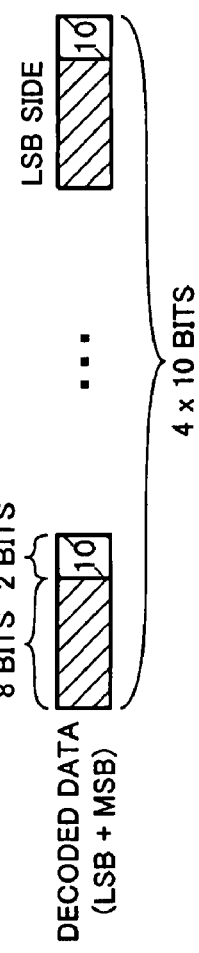
Fig. 28A
Fig. 28B
Fig. 28C

Fig. 29A

MSB SIDE ENCODED DATA  `00 11010101`

Fig. 29B

| DECODING PROCEDURE | DATA | PROCESS | OUTPUT DATA |
|---|---|---|---|
| (1) | ▨ | READ 1 BIT. SINCE SECOND FLAG = 0, RUN-LENGTH PROCESS HAS NOT BEEN PERFORMED IN UNIT OF 1 BYTE. | |
| (2) | ▨ | READ 1 BIT. SINCE FIRST FLAG = 0, RUN-LENGTH PROCESS HAS NOT BEEN PERFORMED IN 1 BYTE. | |
| (3) | `11010101` | SINCE RUN-LENGTH PROCESS HAS NOT BEEN PROCESSED IN 1 BYTE, DATA ARE OUTPUT AS THEY ARE. | `11010101` |

▨ SECOND FLAG
▨ FIRST FLAG
▨ LEVEL OF RUN-LENGTH IN UNIT OF MSB SIDE BITS
▨ NUMBER OF RUNS IN UNIT OF 1 BYTE

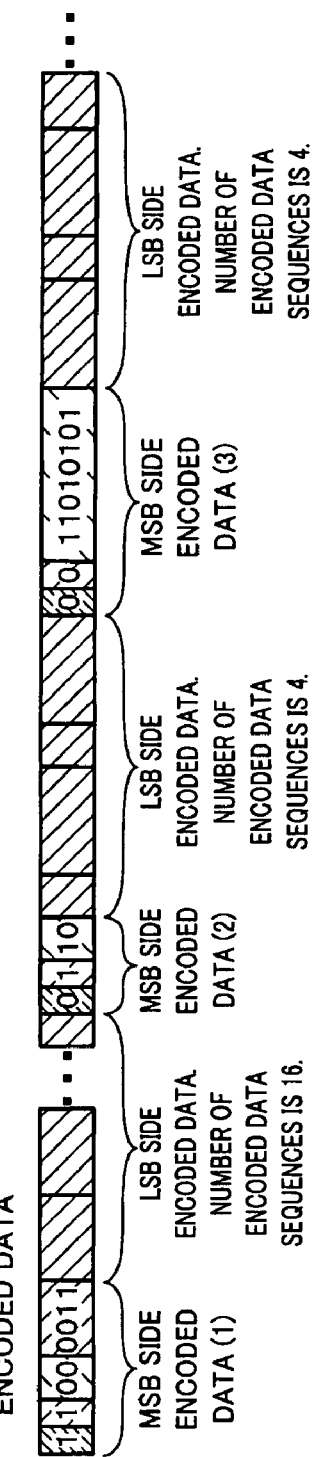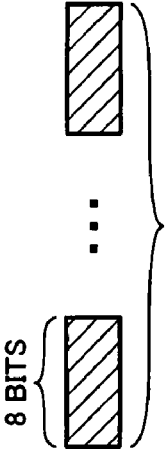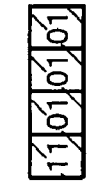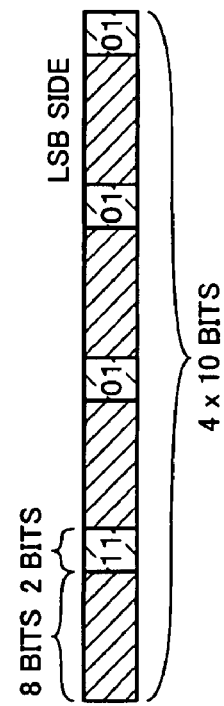
Fig. 30A, Fig. 30B, Fig. 30C

Fig.35A

MSB SIDE ENCODED DATA 11 1 00 0011 0 1 10 0 0 /1101010 1 ...

Fig.35B

| DECODING PROCE- DURE | DATA | PROCESS | OUTPUT DATA |
|---|---|---|---|
| (1) | 11 | READ 1 BIT. SINCE SECOND FLAG = 1, RUN-LENGTH PROCESS HAS BEEN PERFORMED IN UNIT OF 1 BYTE. | |
| (2) | 1 | READ 1 BIT. SINCE SECOND FLAG = 1, RUN-LENGTH PROCESS HAS BEEN PERFORMED IN 1 BYTE. | |
| (3) | 00 | READ 2 BITS AND REPEATEDLY OUTPUT "00" FOUR TIME. | 00 00 00 00 |
| (4) | 0011 | READ 4 BITS AND OBTAIN "3" AS NUMBER OF RUNS OF RUN-LENGTH PROCESS IN UNIT OF 1 BYTE AND REPEATEDLY OUTPUT DATA OF 1 BYTE THAT HAVE BEEN JUST OBTAINED, "00000000", THREE TIMES. | 00 00 00 00 00 00 00 00 00 00 00 00 |
| (5) | 0 | READ 1 BIT. SINCE SECOND FLAG = 0, RUN-LENGTH PROCESS HAS NOT BEEN PERFORMED IN UNIT OF 1 BYTE. | |
| (6) | 1 | READ 1 BIT. SINCE SECOND FLAG = 1, RUN-LENGTH PROCESS HAS BEEN PERFORMED IN 1 BYTE. | |
| (7) | 10 | READ 2 BITS AND REPEATEDLY OUTPUT "10" FOUR TIMES. | 10 10 10 10 |
| (8) | 0 | READ 1 BIT. SINCE SECOND FLAG = 0, RUN-LENGTH PROCESS HAS NOT BEEN PERFORMED IN UNIT OF 1 BYTE. | |
| (9) | 0 | READ 1 BIT. SINCE FIRST FLAG = 0, RUN-LENGTH PROCESS HAS NOT BEEN PERFORMED IN 1 BYTE. | |
| (10) | 11010101 | SINCE RUN-LENGTH PROCESS HAS NOT BEEN PERFORMED IN 1 BYTE, DATA ARE OUTPUT AS THEY ARE. | 11010101 |

▨ SECOND FLAG  ◻ LEVEL OF RUN-LENGTH IN UNIT OF MSB SIDE BITS
▱ FIRST FLAG  ▨ NUMBER OF RUNS IN UNIT OF 1 BYTE

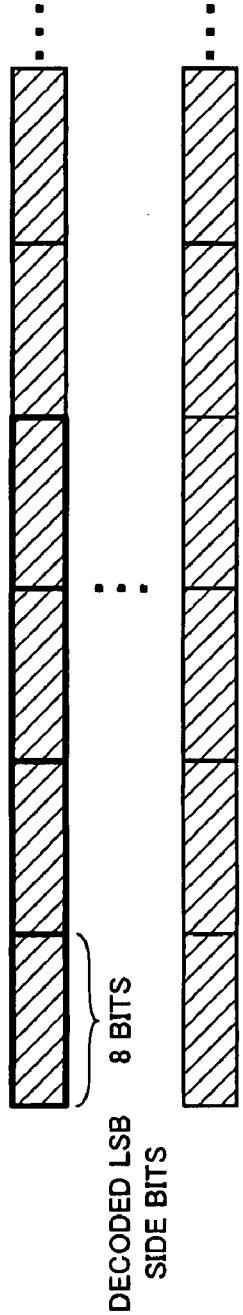
*Fig. 36A* DECODED LSB SIDE BITS
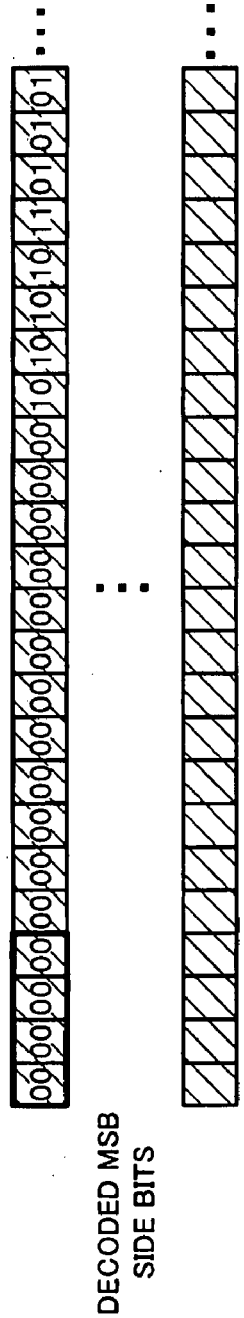
*Fig. 36B* DECODED MSB SIDE BITS
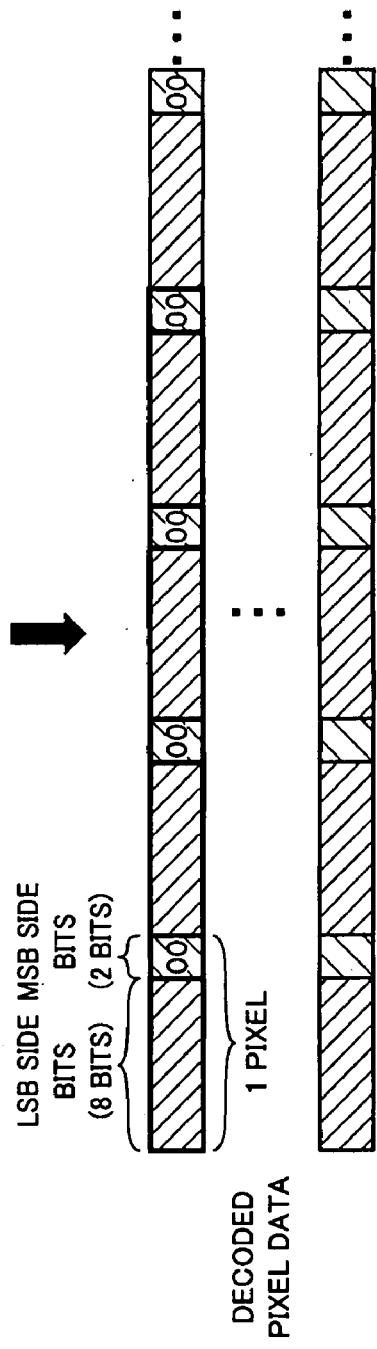
*Fig. 36C* DECODED PIXEL DATA

Fig. 39A

MSB SIDE ENCODED DATA  `1 1 1 0 0 0 0 0 1`

Fig. 39B

| DECODING PROCEDURE | DATA | PROCESS | OUTPUT DATA |
|---|---|---|---|
| (1) | `1` | READ 1 BIT. SINCE SECOND FLAG = 1, RUN-LENGTH PROCESS HAS BEEN PERFORMED IN UNIT OF 2 BYTES. | |
| (2) | `1` | READ 1 BIT. SINCE FIRST FLAG = 1, RUN-LENGTH PROCESS HAS BEEN PERFORMED IN 2 BYTES. | |
| (3) | `00` | READ 2 BITS AND REPEATEDLY OUTPUT "00" EIGHT TIMES. | `00 00 00 00 00 00 00 00` |
| (4) | `0001` | READ 4 BITS, OBTAIN "1" AS NUMBER OF RUNS OF RUN-LENGTH PROCESS IN UNIT OF 1 BYTE, AND OUTPUT DATA OF 2 BYTES THAT HAVE BEEN JUST OUTPUT, "00000000 00000000", ONE TIME. | `00 00 00 00 00 00 00 00 00 00 00 00 00 00 00 00` |

▨ SECOND FLAG
▯ FIRST FLAG
▱ LEVEL OF RUN-LENGTH IN UNIT OF MSB SIDE BITS
▱ NUMBER OF RUNS IN UNIT OF 1 BYTE

Fig. 40A MSB SIDE ENCODED DATA /10101010⎮11010101/

Fig. 40B

| DECODING PROCEDURE | DATA | PROCESS | OUTPUT DATA |
|---|---|---|---|
| (1) | ▨0 | READ 1 BIT. SINCE SECOND FLAG = 0, RUN-LENGTH PROCESS HAS NOT BEEN PERFORMED IN UNIT OF 2 BYTES. | |
| (2) | 0 | READ 1 BIT. SINCE FIRST FLAG = 0, RUN-LENGTH PROCESS HAS NOT BEEN PERFORMED IN 2 BYTE. | |
| (3) | /1010101011010101/ | SINCE RUN-LENGTH PROCESS HAS NOT BEEN PERFORMED IN 2 BYTES, DATA ARE OUTPUT AS THEY AREA. | /1010101011010101/ |

▨ SECOND FLAG
▤ FIRST FLAG
☐ LEVEL OF RUN-LENGTH IN UNIT OF MSB SIDE BITS
▱ NUMBER OF RUNS IN UNIT OF 1 BYTE

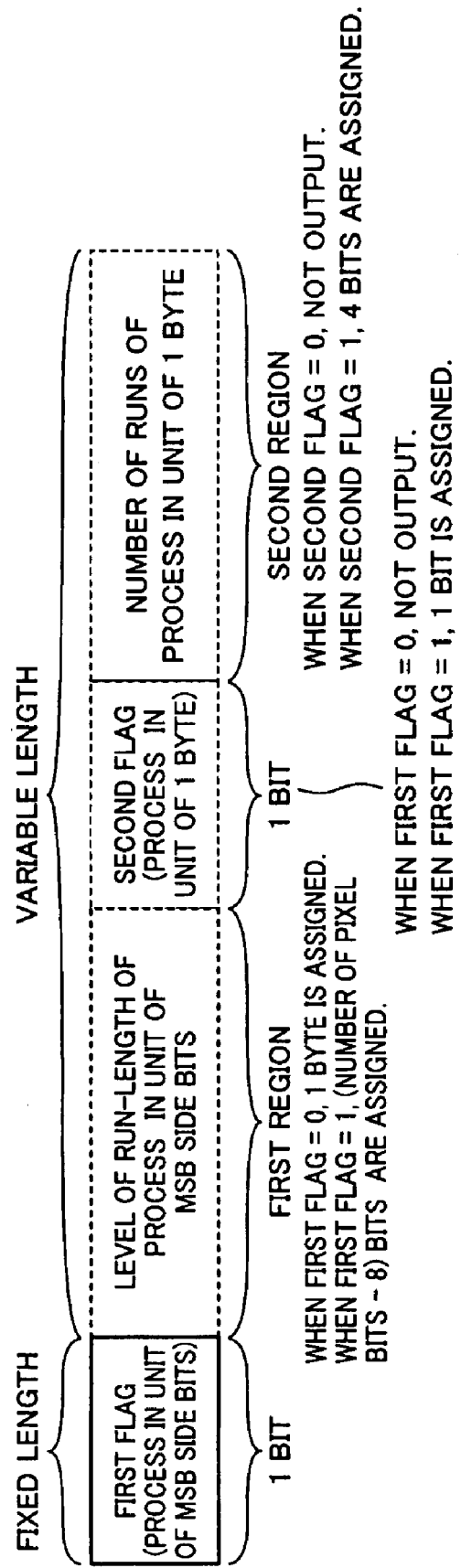

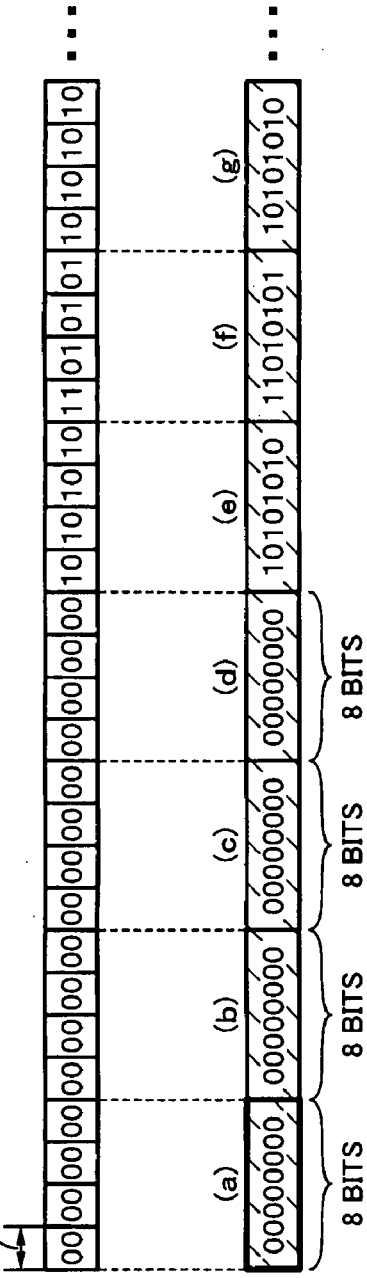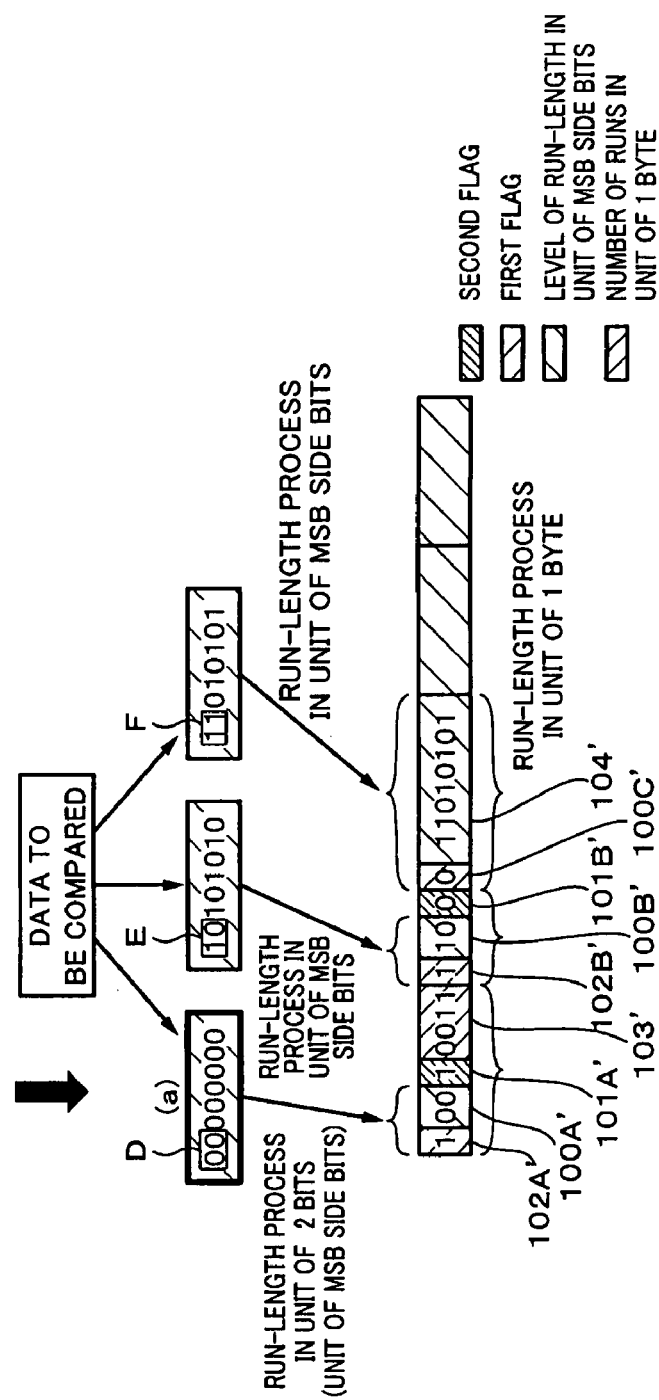
Fig. 43A Fig. 43B Fig. 43C Fig. 43D

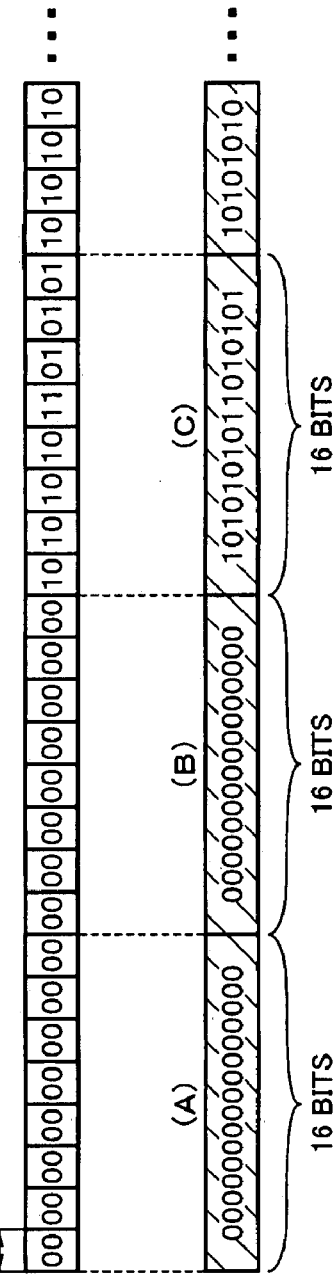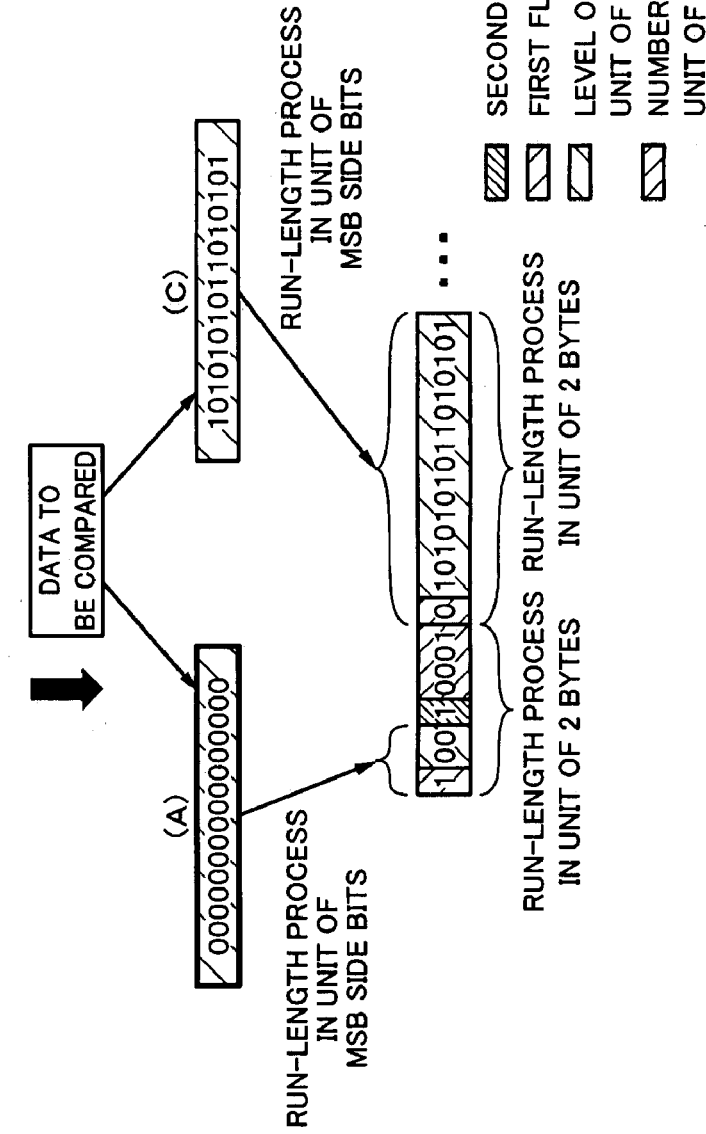
Fig. 48A Fig. 48B Fig. 48C Fig. 48D

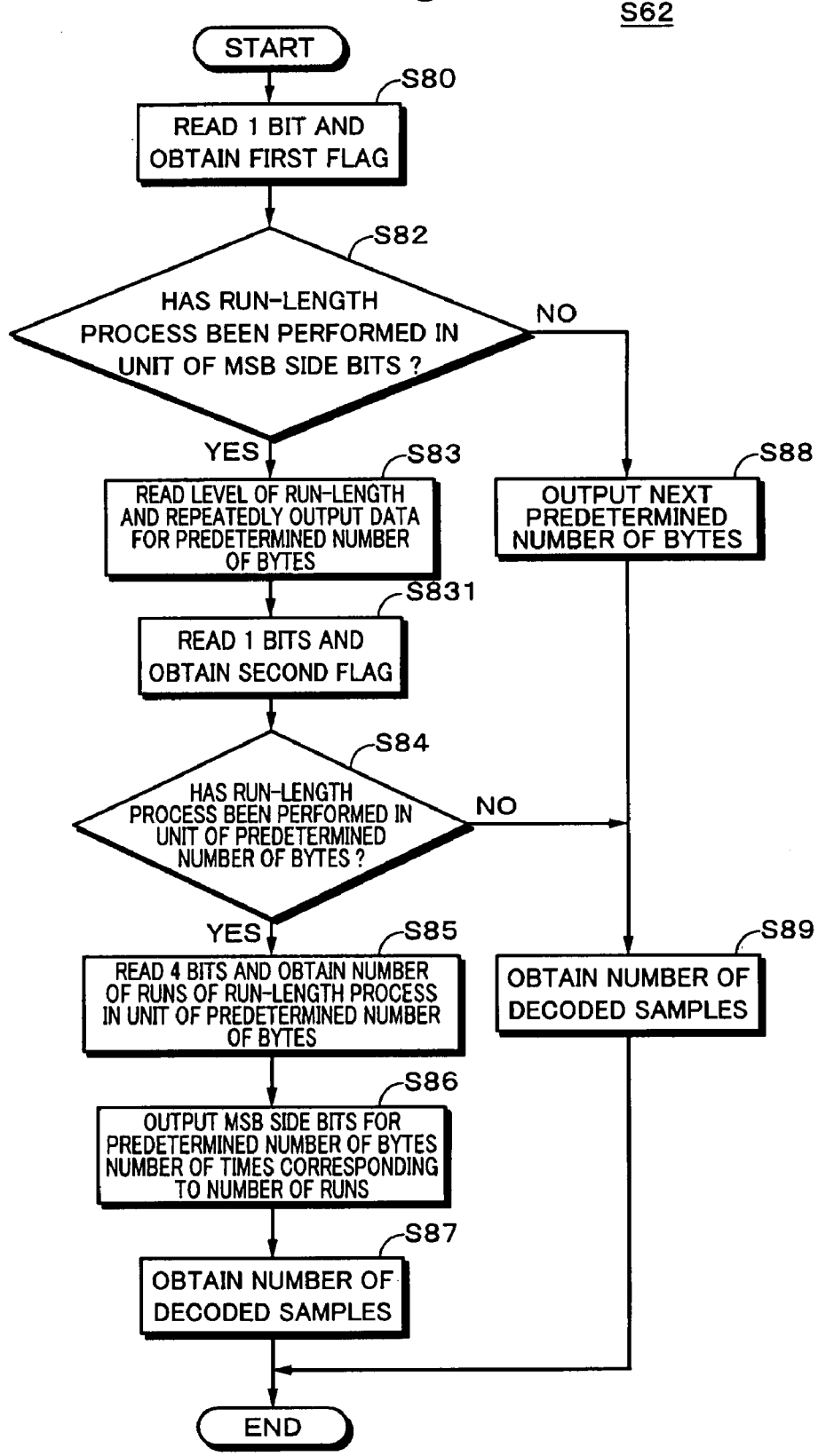

Fig. 50A MSB SIDE ENCODED DATA

Fig. 50B

| DECODING PROCEDURE | DATA | PROCESS | OUTPUT DATA |
|---|---|---|---|
| (1) | 1 | READ 1 BIT. SINCE FIRST FLAG = 1, RUN-LENGTH PROCESS HAS BEEN PERFORMED IN 1 BYTE. | |
| (2) | 00 | READ 2 BITS AND REPEATEDLY OUTPUT "00" FOUR TIMES. | 09 09 09 09 |
| (3) | 1 | READ 1 BIT. SINCE SECOND FLAG = 1, RUN-LENGTH PROCESS HAS BEEN PERFORMED IN UNIT OF 1 BYTE. | |
| (4) | 0011 | READ 4 BITS, OBTAIN "3" AS NUMBER OF RUNS OF RUN-LENGTH PROCESS IN UNIT OF 1 BYTE, AND OUTPUT DATA OF 1 BYTES THAT HAS BEEN JUST OUTPUT, "00000000", THREE TIMES. | 09 09 09 09 09 09 09 09 09 09 09 09 09 09 09 09 |

▨ SECOND FLAG
▤ FIRST FLAG
☐ LEVEL OF RUN-LENGTH IN UNIT OF MSB SIDE BITS
☐ NUMBER OF RUNS IN UNIT OF 1 BYTE

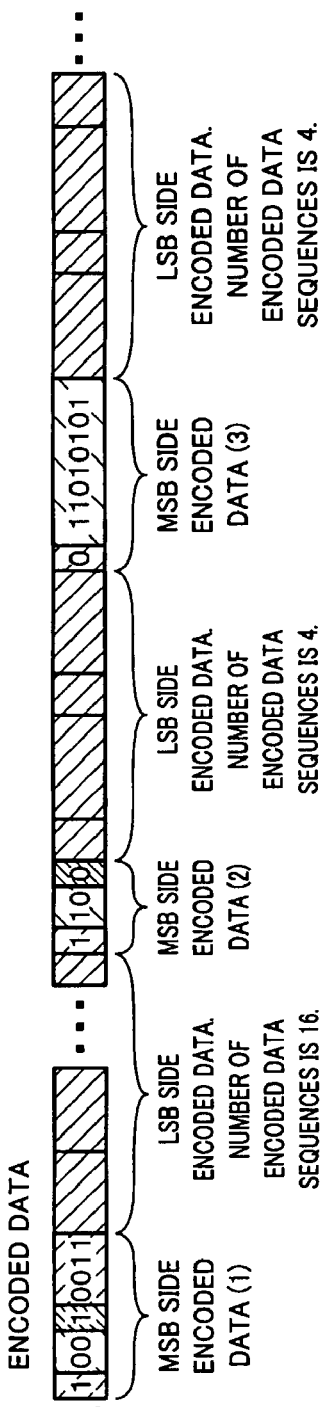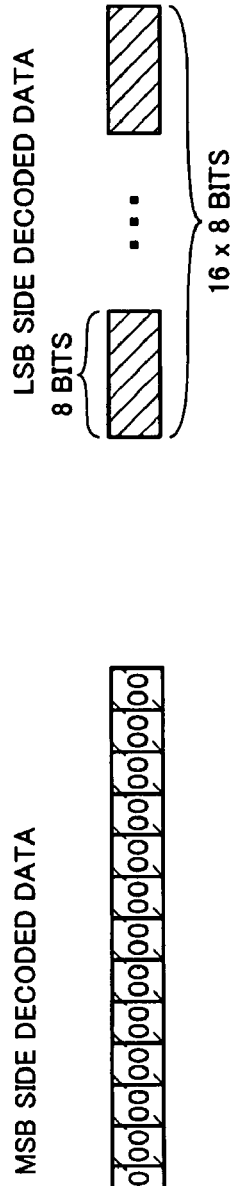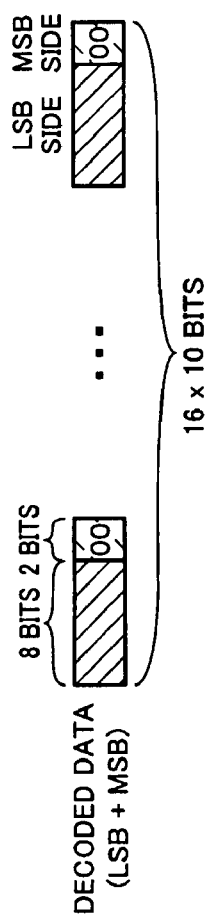

Fig. 52A  MSB SIDE ENCODED DATA

Fig. 52B

| DECODING PROCEDURE | DATA | PROCESS | OUTPUT DATA |
|---|---|---|---|
| (1) | | READ 1 BIT. SINCE FIRST FLAG = 1, RUN-LENGTH PROCESS HAS BEEN PERFORMED IN 1 BYTE. | |
| (2) | | READ 2 BITS AND REPEATEDLY OUTPUT "10" FOUR TIMES. | 10101010 |
| (3) | | READ 1 BIT. SINCE SECOND FLAG = 0, RUN-LENGTH PROCESS HAS NOT BEEN PERFORMED IN UNIT OF 1 BYTE. | |

- SECOND FLAG
- FIRST FLAG
- LEVEL OF RUN-LENGTH IN UNIT OF MSB SIDE BITS
- NUMBER OF RUNS IN UNIT OF 1 BYTE

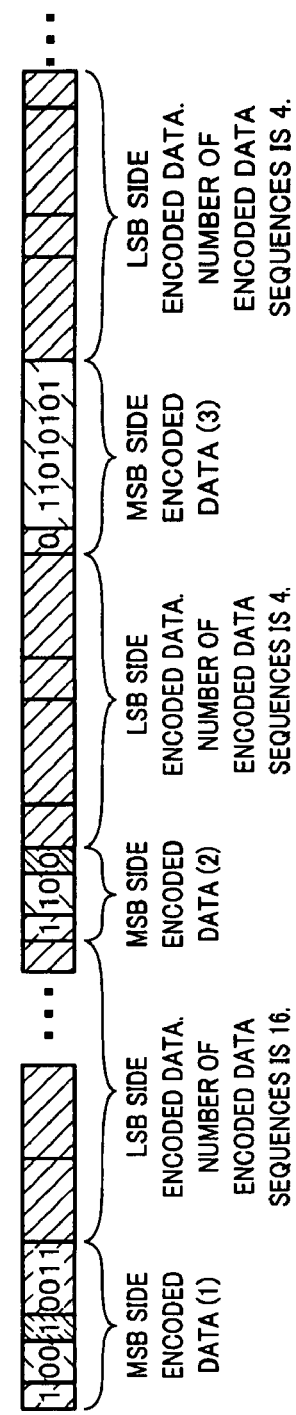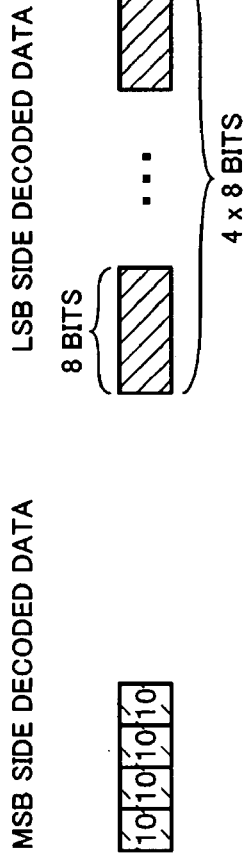

Fig. 54A

MSB SIDE ENCODED DATA  0̄ 11010101

Fig. 54B

| DECODING PROCEDURE | DATA | PROCESS | OUTPUT DATA |
|---|---|---|---|
| (1) | 0̄ | READ 1 BIT. SINCE FIRST FLAG = 0, RUN-LENGTH PROCESS HAS NOT BEEN PERFORMED IN 1 BYTE. | |
| (2) | 11010101 | SINCE RUN-LENGTH PROCESS HAS NOT BEEN PERFORMED IN 1 BYTE, DATA ARE OUTPUT AS THEY ARE. | 11010101 |

- SECOND FLAG
- FIRST FLAG
- LEVEL OF RUN-LENGTH IN UNIT OF MSB SIDE BITS
- NUMBER OF RUNS IN UNIT OF 1 BYTE

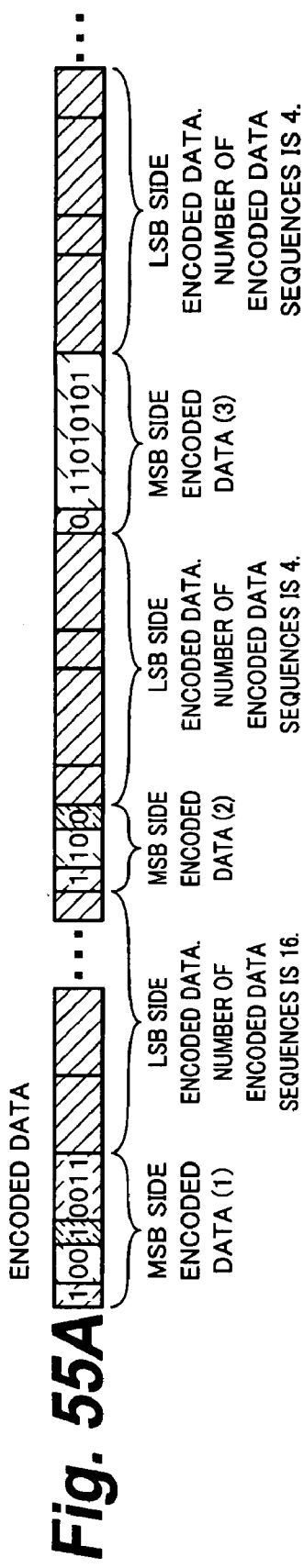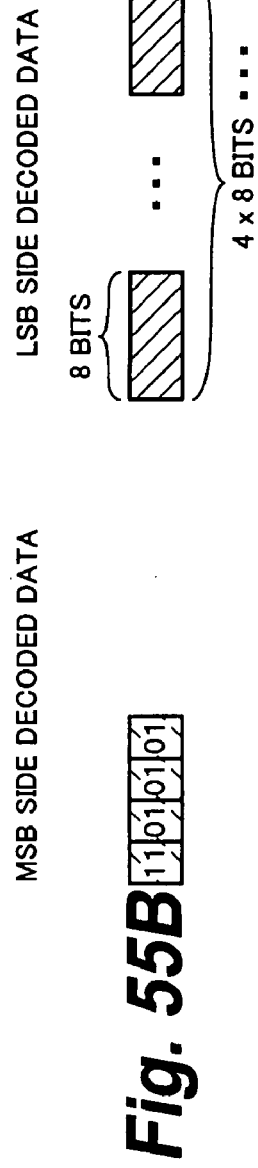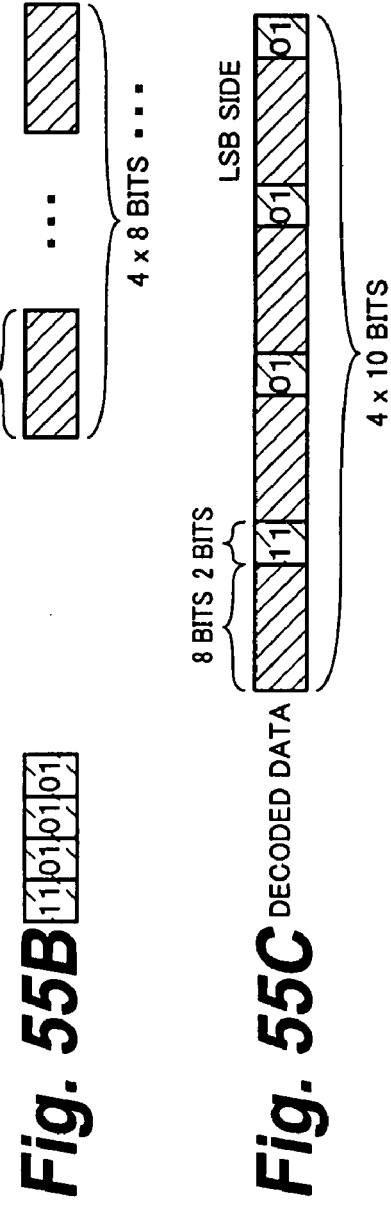
Fig. 55A
Fig. 55B
Fig. 55C

Fig. 57A

MSB SIDE ENCODED DATA: `1 00 1 0011 1 10 0 0 11010101` ...

Fig. 57B

| DECODING PROCEDURE | DATA | PROCESS | OUTPUT DATA |
|---|---|---|---|
| (1) | `1` | READ 1 BIT. SINCE FIRST FLAG = 1, RUN-LENGTH PROCESS HAS BEEN PERFORMED IN 1 BYTE. | |
| (2) | `00` | READ 2 BITS AND REPEATEDLY OUTPUT "00" FOUR TIMES. | `00 00 00 00` |
| (3) | `1` | READ 1 BIT. SINCE SECOND FLAG = 1, RUN-LENGTH PROCESS HAS BEEN PERFORMED IN UNIT OF 1 BYTE. | |
| (4) | `0011` | READ 4 BITS AND OBTAIN "3" AS NUMBER OF RUNS OF RUN-LENGTH PROCESS IN UNIT OF 1 BYTE AND REPEATEDLY OUTPUT DATA OF 1 BYTE THAT HAVE BEEN JUST OUTPUT, "00000000", THREE TIMES. | `00 00 00 00 00 00 00 00 00 00 00 00` |
| (5) | `1` | READ 1 BIT. SINCE FIRST FLAG = 1, RUN-LENGTH PROCESS HAS BEEN PERFORMED IN 1 BYTE. | |
| (6) | `10` | READ 2 BITS AND REPEATEDLY OUTPUT "10" FOUR TIMES. | `10 10 10 10` |
| (7) | `0` | READ 1 BIT. SINCE SECOND FLAG = 0, RUN-LENGTH PROCESS HAS NOT BEEN PERFORMED IN UNIT OF 1 BYTE. | |
| (8) | `0` | READ 1 BIT. SINCE FIRST FLAG = 0, RUN-LENGTH PROCESS HAS NOT BEEN PERFORMED IN 1 BYTE. | |
| (9) | `11010101` | SINCE RUN-LENGTH PROCESS HAS NOT BEEN PERFORMED IN 1 BYTE, DATA ARE OUTPUT AS THEY ARE. | `11010101` |

SECOND FLAG
FIRST FLAG
LEVEL OF RUN-LENGTH IN UNIT OF MSB SIDE BITS
NUMBER OF RUNS IN UNIT OF 1 BYTE

Fig. 58A MSB SIDE ENCODED DATA  `1|00|1|0001`

Fig. 58B

| DECODING PROCEDURE | DATA | PROCESS | OUTPUT DATA |
|---|---|---|---|
| (1) | `1` | READ 1 BIT. SINCE FIRST FLAG = 1, RUN-LENGTH PROCESS HAS BEEN PERFORMED IN 2 BYTES. | |
| (2) | `00` | READ 2 BITS AND REPEATEDLY OUTPUT "00" EIGHT TIMES. | `00 00 00 00 00 00 00 00` |
| (3) | `1` | READ 1 BIT. SINCE SECOND FLAG = 1, RUN-LENGTH PROCESS HAS BEEN PERFORMED IN UNIT OF 2 BYTES. | |
| (4) | `0001` | READ 4 BITS, OBTAIN "1" AS NUMBER OF RUNS OF RUN-LENGTH PROCESS IN UNIT OF 1 BYTE, AND OUTPUT DATA OF 1 BYTE THAT HAVE BEEN JUST OUTPUT, "00000000 00000000", ONE TIME. | `00 00 00 00 00 00 00 00` |

- SECOND FLAG
- FIRST FLAG
- LEVEL OF RUN-LENGTH IN UNIT OF MSB SIDE BITS
- NUMBER OF RUNS IN UNIT OF 1 BYTE

Fig. 59A  MSB SIDE ENCODED DATA

| DECODING PROCEDURE | DATA | PROCESS | OUTPUT DATA |
|---|---|---|---|
| (1) | `0` | READ 1 BIT. SINCE FIRST FLAG = 0, RUN-LENGTH PROCESS HAS NOT BEEN PERFORMED IN 2 BYTES. | |
| (2) | `1010101011010101` | SINCE RUN-LENGTH PROCESS HAS NOT BEEN PERFORMED IN 2 BITS, DATA ARE OUTPUT AS THEY AREA. | `1010101011010101` |

▨ SECOND FLAG
▨ FIRST FLAG
▨ LEVEL OF RUN-LENGTH IN UNIT OF MSB SIDE BITS
▨ NUMBER OF RUNS IN UNIT OF 1 BYTE

ENCODING METHOD, ENCODING APPARATUS, DECODING METHOD, AND DECODING APPARATUS

CROSS REFERENCES TO RELATED APPLICATIONS

The present invention contains subject matter related to Japanese Patent Application No. 2006-031649 filed on Feb., 8, 2006, and Japanese Patent Application No. 2006-031650 filed on Feb. 8, 2006, the entire contents of which being incorporated herein by reference.

BACKGROUND OF THE INVENTION

1. Field of the Invention

The present invention relates to an encoding method and an encoding apparatus that allow lossless encoding for picture data composed of pixel data whose number of quantizer bits is larger than eight bits to be effectively and losslessly encoded, and to a decoding method and a decoding apparatus corresponding to the encoding method and the encoding apparatus.

2. Description of the Related Art

In recent years, a digital cinema system that shows a movie by reproducing picture data for example from a picture server and projecting the reproduced picture data on a screen has been developed for movie theaters. In this system, picture data that have been encoded are distributed through a network or recorded on a record medium such as a large capacity optical disc and then provided to the picture server. The picture data are transferred from the picture server to the projector. Thereafter, the projector projects the picture to the screen.

It is preferred that picture data that necessitate high quality such as picture data supplied for such a digital cinema system be encoded by so-called loss-less encoding of which data are not lost in the encoding process and baseband digital video data can be perfectly restored when they are decoded.

As an example of such loss-less encoding, a technology of which a difference value between the current picture data and the immediately preceding picture data is rearranged in the unit of a bit and the resultant data are encoding by the run-length process and Huffman encoding process is described in Japanese Patent Application Laid-Open No. HEI 10-190478 (hereinafter this related art is referred to as patent document 1).

In addition, when picture data necessitate high quality, gradational information of one pixel also necessitates high resolution. The gradational information of a pixel is generally represented by the number of quantizer bits of a pixel. Although the number of quantizer bits of a pixel used for example for personal computers is eight, high quality picture data necessitates a resolution of larger than eight bits, for example 10 bits or 12 bits.

SUMMARY OF THE INVENTION

However, in the past, there was no encoding system that performed loss-less encoding process for picture data whose number of quantizer bits of a pixel was larger than eight bits.

In other words, in the loss-less encoding system of the past, data were encoded in the unit of eight bits. For data whose data unit is larger than eight bits, they were encoded in the unit of eight bits rather than 16 bits. Instead, encoding system in the unit of eight bits was simply extended to a system in the unit of 16 bits. The same process in the unit of eight bits was performed in parallel. In the latter case, for example, data were separated into an eight-bit portion on the Least Significant Bit (LSB) side and the remaining portion starting with the nine-th bit on the Most Significant Bit (MSB) side. These portions were encoded by the same encoding system.

Thus, when data were encoded in the unit of more than eight bits, it took a process time twice as large as the case of which data were encoded in the unit of one byte.

In addition, in this method, data were not optimized with respect to compression efficiency. In other words, when data were separated into the LSB side and the MSB side, high order bits of the MSB side were all "0's". It is thought that encoding of this portion is wasteful.

In view of the foregoing, it would be desirable to provide an encoding method and an encoding apparatus that allow picture data composed of pixel data whose number of quantizer bits is larger than eight bits to be effectively encoded and to a decoding method and a decoding apparatus corresponding to the encoding method and the encoding apparatus.

According to an embodiment of the present invention, there is provided an encoding method of losslessly encoding picture data composed of pixel data. The pixel data whose number of quantizer bits is larger than eight bits are separated into a first portion and a second portion. The first portion is composed of eight bits on an LSB side. The second portion is composed of remaining bits on an MSB side excluding the first portion. A first encoding process is losslessly performed for the first portion. A second encoding process is losslessly performed for the second portion. The second encoding process is different from the first encoding process.

According to an embodiment of the present invention, there is provided an encoding apparatus which losslessly encodes picture data composed of pixel data. The encoding apparatus includes a separation section, a first encoding section, and a second encoding section. The separation section separates the pixel data whose number of quantizer bits is larger than eight bits into a first portion and a second portion. The first portion is composed of eight bits on an LSB side. The second portion is composed of remaining bits on an MSB side excluding the first portion. The first encoding section losslessly performs a first encoding process for the first portion. The second encoding section losslessly performs a second encoding process for the second portion. The second encoding process is different from the first encoding process.

According to an embodiment of the present invention, there is provided a decoding method of decoding encoded data. First encoded data for which a first portion composed of eight bits on an LSB side of pixel data whose number of quantizer bits is larger than eight bits has been losslessly encoded according to first encoding are decoded. Second encoded data for which a second portion composed of remaining bits on the MSB side of the pixel data excluding the first portion has been losslessly encoded according to second encoding are decoded. The second encoding is different from the first encoding. The first decoded data that have been decoded and outputted at the first decoding step and the second decoded data that have been decoded and outputted at the second decoding step are combined such that pixel data of the first decoded data correspond to pixel data of the second decoded data.

According to an embodiment of the present invention, there is provided a decoding apparatus which decodes encoded data. The decoding apparatus includes a first decoding section, a second decoding section, and a data combining section. The first decoding section decodes first encoded data for which a first portion composed of eight bits on an LSB side of pixel data whose number of quantizer bits is larger than eight bits has been losslessly encoded according to first encoding. The second decoding section decodes second encoded data for which a second portion composed of remaining bits on the MSB side of the pixel data excluding the first portion has been losslessly encoded according to second encoding. The second encoding is different from the first encoding. The data combining section combines the first decoded data that have been decoded and outputted by the first decoding section and the second decoded data that have been decoded and outputted by the second decoding section such that pixel data of the first decoded data correspond to pixel data of the second decoded data.

According to an embodiment of the present invention, the pixel data are separated into a first portion and a second portion. The first portion is composed of eight bits on an LSB side. The second portion is composed of remaining bits on an MSB side excluding the first portion. A first encoding process is losslessly performed for the first portion. A second encoding process is losslessly performed for the second portion. The second encoding process is different from the first encoding process. Thus, since the first encoded process and the second encoding process are performed in manners suitable for data of the first and second portions, data can be more effectively encoded.

According to an embodiment of the present invention, first encoded data for which a first portion composed of eight bits on an LSB side of pixel data whose number of quantizer bits is larger than eight bits has been losslessly encoded according to first encoding are decoded. Second encoded data for which a second portion composed of remaining bits on the MSB side of the pixel data excluding the first portion has been losslessly encoded according to second encoding are decoded. The second encoding is different from the first encoding. The first decoded data that have been decoded and outputted at the first decoding step and the second decoded data that have been decoded and outputted at the second decoding step are combined such that pixel data of the first decoded data correspond to pixel data of the second decoded data. Thus, by decoding the encoded data of which the first portion and the second portion have been separately encoded, original pixel data can be output.

According to an embodiment of the present invention, as described above, pixel data are separated into a first portion composed of eight LSB side bits and a second portion composed of the remaining the MSB side bits excluding the first portion. The separated first portion is losslessly encoded by a first encoding process. The separated second portion is losslessly encoded by a second encoding process different from the first encoding process. Since the first and second encoding processes are performed in the methods suitable for features of data of the first and second portions, respectively, a encoding process for picture data composed of pixel data whose number of quantizer bits is equal to or larger than nine bits can be effectively performed.

In addition, pixel data are separated into a first portion composed of eight LSB side bits and a second portion composed of the remaining the MSB side bits excluding the first portion. The separated first and second portions are encoded by a encoding process. Thus, the encoding process for the first and second portion can be performed in parallel. Thus, the process can be performed at high speed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 1 is a functional block diagram showing an example of a function of an encoding apparatus according to a first embodiment of the present invention;

FIG. 2A and FIG. 2B are schematic diagrams showing an example of a data separation process of a data separation section;

FIG. 4 is a schematic diagram describing processes of the data separation section and a first stage run-length process section;

FIG. 11A, FIG. 11B, FIG. 11C, and FIG. 11D are schematic diagrams describing a specific example of the encoding process for MSB side bits;

FIG. 17 is a schematic diagram describing processes of a data separation section and a first stage run-length process section according to a third modification of the first embodiment of the present invention;

FIG. 19A, FIG. 19B, FIG. 19C, and FIG. 19D are schematic diagrams showing a encoding process for MSB side bits in the unit of two bytes;

FIG. 24 is a flow chart showing in details the decoding process for an example of LSB side encoded data;

FIG. 25A and FIG. 25B are schematic diagram describing a specific example of the decoding process according to the first embodiment of the present invention;

FIG. 26A, FIG. 26B, and FIG. 26C are schematic diagram describing a specific example of the decoding process according to the first embodiment of the present invention;

FIG. 27A and FIG. 27B are schematic diagrams describing a specific example of the decoding process according to the first embodiment of the present invention;

FIG. 28A, FIG. 28B, and FIG. 28C are schematic diagrams describing a specific example of the decoding process according to the first embodiment of the present invention;

FIG. 29A and FIG. 29B are schematic diagrams describing a specific example of the decoding process according to the first embodiment of the present invention;

FIG. 30A, FIG. 30B, and FIG. 30C are schematic diagrams describing a specific example of the decoding process according to the first embodiment of the present invention;

FIG. 35A and FIG. 35B are schematic diagrams describing a specific example of the decoding process according to the first modification of the first embodiment of the present invention;

FIG. 36A, FIG. 36B, and FIG. 36C are schematic diagrams describing a specific example of the decoding process according to the first modification of the first embodiment of the present invention;

FIG. 39A and FIG. 39B are schematic diagrams showing an example of decoding procedures of the decoding process according to the third modification of the first embodiment of the present invention;

FIG. 40A and FIG. 40B are schematic diagrams showing an example of the decoding procedures of the decoding process according to the third modification of the first embodiment of the present invention;

FIG. 41 is a schematic diagram showing the structure of an example of output data on the MSB side according to a second embodiment of the present invention;

FIG. 43A, FIG. 43B, FIG. 43C, and FIG. 43D are schematic diagrams describing a specific example of an encoding process for MSB side bits according to the second embodiment of the present invention;

FIG. 48A, FIG. 48B, FIG. 48C, and FIG. 48D are schematic diagrams showing an example of a encoding process for MSB side bits according to the third modification of the second embodiment of the present invention;

FIG. 49 is a flow chart showing an example of a decoding process for MSB side bits according to the second embodiment of the present invention;

FIG. 50A and FIG. 50B are schematic diagrams describing a specific example of the decoding process according to the second embodiment of the present invention;

FIG. 51A, FIG. 51B, and FIG. 51C are schematic diagrams describing a combining process for MSB side bits and LSB side bits according to the second embodiment of the present invention;

FIG. 52A and FIG. 52B are schematic diagrams describing a specific example of the decoding process according to the second embodiment of the present invention;

FIG. 53A, FIG. 53B, and FIG. 53C are schematic diagrams describing the combining process for MSB side bits and LSB side bits according to the second embodiment of the present invention;

FIG. 54A and FIG. 54B are schematic diagrams describing a specific example of the decoding process according to the second embodiment of the present invention;

FIG. 55A, FIG. 55B, and FIG. 55C are schematic diagrams describing the combining process for MSB side bits and LSB side bits according to the second embodiment of the present invention;

FIG. 57A and FIG. 57B are schematic diagrams describing a specific example of the decoding process according to the first modification of the second embodiment of the present invention;

FIG. 58A and FIG. 58B are schematic diagrams showing an example of a decoding process according to the third modification of the second embodiment of the present invention;

FIG. 59A and FIG. 59B are schematic diagrams showing an example of the decoding process according to the third modification of the second embodiment of the present invention;

DETAILED DESCRIPTION OF THE PREFERRED EMBODIMENTS

Figure 3A:
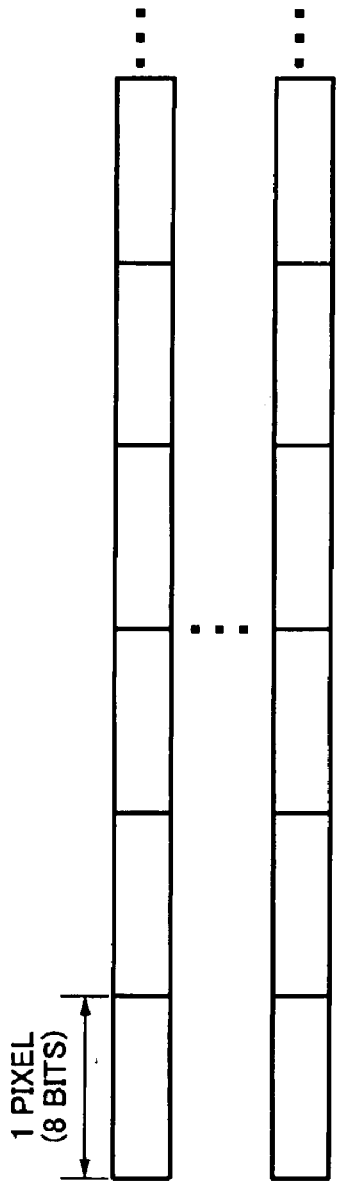
FIG. 3A, FIG. 3B, and FIG. 3C are schematic diagrams describing a encoding process for LSB side bits.

Next, embodiments of the present invention will be described in the following order.
1. First embodiment of present invention
1-1. Encoding process according to first embodiment
1-1-1-1. Encoding apparatus
1-1-1-2. Data structure
1-1-1-3. Encoding process
1-1-1-4. Specific example of encoding process
1-1-1-5. Output format
1-1-2. First modification of first embodiment (first different output format)
1-1-3. Second modification of first embodiment (second different output format)
1-1-4. Third modification of first embodiment (different encoding unit)
1-2. Decoding process according to first embodiment of present invention
1-2-1-1. Decoding apparatus
1-2-1-2. Decoding process
1-2-1-3. Specific example of decoding process
1-2-2. Decoding process according to first modification of first embodiment
1-2-2-1. Decoding apparatus
1-2-2-2. Decoding process
1-2-2-3. Specific example of decoding process
1-2-3. Decoding process according to second modification of first embodiment
1-2-4. Decoding process according to third modification of first embodiment
2. Second embodiment of present invention
2-1. Encoding process according to second embodiment
2-1-1-2. Data structure
2-1-2-3. Encoding process
2-1-1-4. Specific example of encoding process
2-1-1-5. Output format
2-1-2. First modification of second embodiment (first different format)
2-1-3. Second modification of second embodiment (second different output format)
2-1-4. Third modification of second embodiment (different encoding unit)
2-2. Decoding process according to second embodiment
2-2-1-2. Decoding process
2-2-1-3. Specific example of decoding process
2-2-2. Decoding process according to first modification of second embodiment
2-2-2-2. Decoding process
2-2-2-3. Specific example of decoding process
2-2-3. Decoding process according to second modification of second embodiment
2-2-4. Decoding process according to third modification of second embodiment
3. Hardware structure applicable both to first embodiment and second embodiment
3-1. Example of hardware structure
3-2. Example of application to encoding process
3-3. Example of application to decoding process
4. Third embodiment of present invention (hardware structure having plurality of CPUs)
4-1. Example of hardware structure
4-2. Example of application to encoding process
4-3. Example of application to decoding process 1. First Embodiment of Present Invention 1-1. Encoding Process According to First Embodiment
1-1-1-1. Encoding Apparatus First of all, with reference to the accompanying drawings, a first embodiment of the present invention will be described. FIG. 1 is a functional block diagram showing an example of a function of an encoding apparatus 1A according to the first embodiment of the present invention. With reference to FIG. 1, an encoding process according to the first embodiment of the present invention will be described.

The overall operations of the encoding apparatus 1A shown in FIG. 1, an encoding apparatus 1B (not shown), and an encoding apparatus 1C (not shown) are in reality controlled by a Central Processing Unit (CPU) (not shown) according to a predetermined program. Each section shown in FIG. 1 may be accomplished by a memory (not shown) and a program that operates on the CPU. Instead, each section may be composed of an independent hardware component and their operations may be controlled by the CPU.

Input picture data are temporarily stored in an input data memory 10. The input picture data are data composed of pixels of red (R), green (G), and blue (B) whose number of quantizer bits is larger than eight bits and smaller than 16 bits, preferably larger than eight bits and smaller than 13 bits. The picture data may be composed of pixels of for example luminance Y, color difference Cb, and color difference Cr instead of three primary colors of R, G, and B colors. In the description, the encoding process is performed independently for each of pixel data of R, G, and B colors or each of pixel data of luminance Y, color difference Cb, and color difference Cr.

A data separation section 11 separates the picture data stored in the input data memory 10 into eight LSB side bits (hereinafter sometimes referred to as LSB side bits) and the remaining MSB side bits excluding the LSB side bits (hereinafter these MSB side bits sometimes referred to as MSB side bits) for each pixel. In the first embodiment of the present invention, the separated LSB side bits and MSB side bits are encoded according to different encoding systems.

FIG. 2A and FIG. 2B show an outline of an example of the data separation process performed by the data separation section 11. When the number of quantizer bits of a pixel is 10 bits and data of one pixel have a data length of 10 bits, as exemplified in FIG. 2A, eight bits from the LSB are the LSB side bits, whereas two bits from the 9-th bit to the MSB (in this example, 10-th bit) are MSB side bits. The separation into the LSB side bits and the MSB side bits is performed for each pixel. The separated LSB side bits (see the upper sequence shown in FIG. 2B) are stored in an LSB side data memory 12 and the separated MSB side bits (see the lower sequence shown in FIG. 2B) are stored in an MSB side data memory 16.

The LSB side bits and the MSB side bits are successively arranged corresponding to pixels arranged for example horizontally and rightwardly in each line on the screen starting from the upper left corner and stored in the LSB side data memory 12 and the MSB side data memory 16, respectively.

Figure 3B:
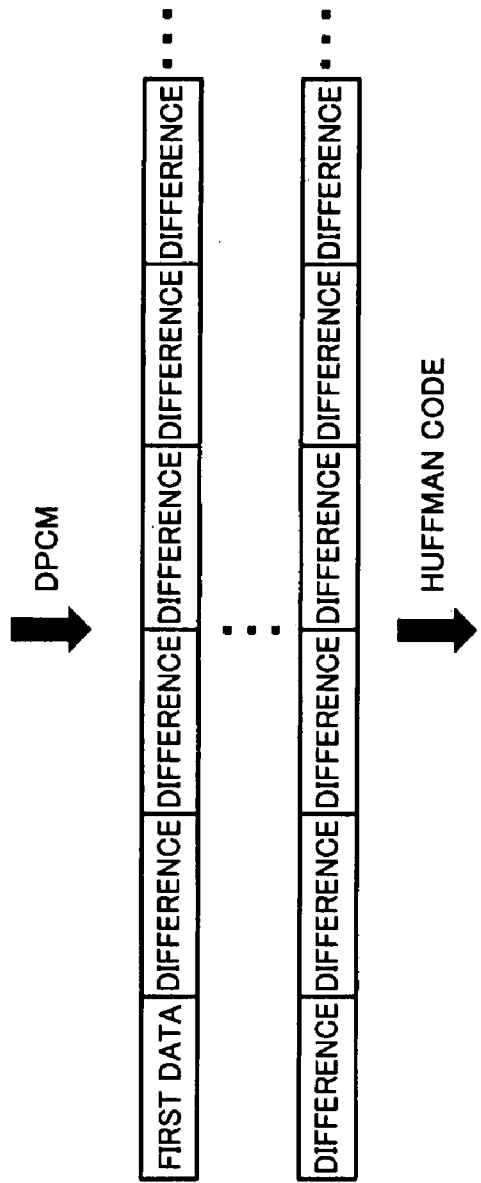
Figure 3C:
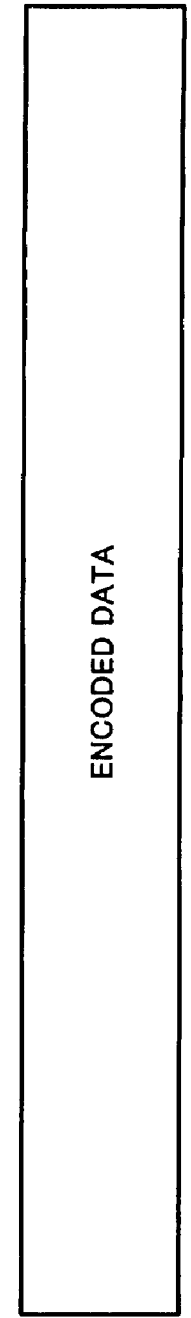

The LSB side bits (see FIG. 3A) stored in the LSB side data memory 12 are processed according to Differential Pulse Code Modulation (DPCM) by a DPCM section 13, for example by obtaining the difference between the immediately previously processed LSB side bits and the newly processed LSB side bits (see FIG. 3B). The first LSB side bits of the frame are used as they are. A Huffman encoding section 14 Huffman-encodes the difference data according to a predetermined Huffman table, namely encodes the difference data with a variable length code (see FIG. 3C). Data that are output from the Huffman encoding section 14 are stored in an output data memory 15. Since the DPCM process and the Huffman encoding process are well know, their description will be omitted.

On the other hand, the MSB side bits stored in the MSB side data memory 16 are processed in two stages by a first stage run-length process section 17 and a second stage run-length process section 18. As a result, the MSB side bits are encoded. The encoded MSB side bits are stored in the output data memory 15. As will be described later, the first stage run-length process section 17 performs the run-length process for a predetermined number of bytes of MSB side bits in the unit of MSB side bits. The second stage run-length process section 18 performs the run-length process in the unit of a predetermined number of bit sequences for a predetermined number of bytes of MSB side bits.

In other words, according to the first embodiment of the present invention, MSB side bits are encoded in the unit of a predetermined number of bytes. At this point, the first stage run-length process section 17 performs the run-length process in a predetermined number of bytes. The second stage run-length process section 18 performs the run-length process in the unit of a predetermined number of bytes. In the following description, it is assumed that a predetermined number of bytes is one byte.

The processed results of the first stage run-length process section 17 and the second stage run-length process section 18 are stored as a encoded output of the MSB side bits to the output data memory 15. The encoded output of the LSB side bits stored in the output data memory 15 and the encoded output of the MSB side bits are output as encoded data of which the input picture data have been encoded. In the example shown in FIG. 1, MSB side encoded data of which the MSB side bits have been encoded and LSB side encoded data of which the LSB side bits have been encoded are interleaved in the unit of a pixel and output. The output data are stored for example in an output file 19.

Since pixel data are separated into LSB side data and MSB side data and they are encoded according to different systems on the basis of features of these data. As a result, the encoding process can be more effectively performed at higher speed than that of the related art.

In other words, the MSB side bits of pixel data have information that features the pixel. Because of correlation of a picture, the values of the MSB side bits of adjacent pixels is likely to be similar. Thus, by encoding the MSB side bits according to the system suitable for the feature, the compression rate can be increased.

In addition, since pixel data are separated into eight LSB side bits and the remaining MSB side bits excluding eight LSB side bits and their separated portions are encoded, each encoding process can be performed in the unit of eight bits or in the unit of eight bits or smaller bits. In addition, since each process can be performed in parallel, the encoding process can be performed at high speed.

Next, processes performed by the first stage run-length process section 17 and the second stage run-length process section 18 will be described in detail. FIG. 4 shows cases of which the data separation section 11 and the first stage run-length process section 17 perform their processes for pixel data whose numbers of quantizer bits are nine bits, 10 bits, 11 bits, and 12 bits. The data separation section 11 separates pixel data into eight LSB side bits and the remaining LSB side bits excluding the eight LSB side bits for each pixel.

In other words, when the number of quantizer bits of pixel data is nine bits, the MSB side bits are only one bit of the MSB. When the number of quantizer bits of pixel data is 10 bits, the MSB side bits are two MSB side bits. Likewise, when the numbers of quantizer bits of pixel data are 11 bits and 12 bits, the MSB side bits are three MSB side bits and four MSB side bits, respectively.

The first stage run-length process section 17 performs the run-length process by comparing a bit sequence of a predetermined number of bytes (in this example, one byte=eight bits) of the MSB side bits stored in the MSB side data memory 16 in the unit of MSB side bits.

In other words, when the number of quantizer bits of pixel data is nine bits, a data sequence of one byte of MSB side bits of adjacent eight pixels is processed by the first stage run-length process section 17. When the number of quantizer bits of pixel data is 10 bits, a data sequence of one byte of MSB side bits of adjacent four pixels is processed by the first stage run-length process section 17. When the numbers of quantizer bits of pixel data are 11 bits and 12 bits, a data sequence of one byte of MSB side bits of adjacent two pixels is processed by the first stage run-length process section 17.

Like the case of which the number of quantizer bits of pixel data is 11 bits, when an integer multiple of MSB side bits does not become eight bits, a predetermined number of staffing bits is added to the MSB side bits so that the total data length becomes one byte. For example, when the number of quantizer bits of pixel data is 11 bits, the MSB side bits excluding eight LSB side bits become three bits. Three MSB side bits for two pixels are processed by the first stage run-length process section 17. Instead, four bits of which one staffing bit is added to three MSB side bits for one pixel may be treated as the MSB side bits.

When the number of quantizer bits of pixel data is 10 bits and one pixel has a data length of 10 bits, the MSB side bits are two bits and a bit sequence of a predetermined number of bytes, namely one byte (=eight bits), of MSB side bits for adjacent four pixels, is compared in the unit of MSB side bits, namely two bits. When the compared result denotes that the bit sequence of the predetermined number of bytes is a repetition of MSB side bits, the bit sequence of the repeated MSB side bits is output as the level of the run-length.

When a bit sequence of MSB side bits of a particular pixel is "01" and bit sequences of MSB side bits of three pixels adjacent to the particular pixel are "01", it is determined that the data sequence to be processed by the first stage run-length process section 17 be formed by repeating bit sequence "01" of MSB side bits. At this point, the level of the run-length is a repeated bit sequence "01" of MSB side bits.

Likewise, when the number of quantizer bits of pixel data is nine bits and one pixel has a data length of nine bits, since MSB side bits are one bit, a bit sequence of a predetermined number of bytes (one byte=eight bits) of MSB side bits of adjacent eight pixels is compared in the unit of one bit of the MSB side bits. When the number of quantizer bits of pixel data is 12 bits and one pixel has a data length of 12 bits, since MSB side bits are four bits, a data sequence of a predetermined number of bytes (one byte=eight bits) of MSB side bits of adjacent two pixels is compared in the unit of MSB side bits, namely four bits. When a staffing bit is used, the process can be performed in the unit of bits including the staffing bit.

In contrast, when the determined result denotes that the bit sequence of the predetermined number of bytes is not a repetition of the MSB side bits, the predetermined number of bytes is output as it is. When bit sequences of MSB side bits of the predetermined number of bytes are for example "01", "01", "11", and "01", it is determined that the sequence be not a repetition of the same MSB side bits. In this case, bit sequence "01011101" composed of four sequences of MSB side bits is output from the first stage run-length process section 17.

The first stage run-length process section 17 sets a first flag that denotes whether or not a predetermined number of adjacent sequences of MSB side bits of a predetermined number of bytes is a repetition of the same bit sequence. The first flag is used to control the process of the first stage run-length process section 17. In addition, the first flag is embedded in output data.

As will be described later, when the value of the first flag is for example "1", it denotes that the predetermined number of adjacent sequences of MSB side bits is a repetition of the same bit sequence. In the process of the first stage run-length process section 17, when the value of the first flag is "1", it denotes that the run-length process can be performed for the predetermined number of adjacent sequences of the MSB side bits. In contrast, when the value of the first flag is for example "0", it denotes that the predetermined number of adjacent sequences of the MSB side bits is not a repetition of the same bit sequence. In the process of the first stage run-length process section 17, when the value of the first flag is "0", it denotes that the run-length process is not able to be performed for the predetermined number of adjacent sequences of the MSB side bits.

The number of repetitions of sequences of MSB side bits of the predetermined number of bytes depends on the number of quantizer bits of picture data of the input picture data as shown in the rightmost column of FIG. 4. Thus, it is not necessary to output the number of repetitions.

The second stage run-length process section 18 performs the run-length process in the unit of a predetermined number of bytes, namely one byte (=eight bits), of MSB side bits stored in the MSB side data memory 16. More specifically, the second stage run-length process section 18 determines whether or not adjacent bit sequences stored in the MSB side data memory 16 is a repetition of the same bit sequence in the unit of a bit sequence of a predetermined number of bytes and counts the number of repetitions. The counted value as the number of repetitions is output as the number of runs in the unit of a predetermined number of bytes from the second stage run-length process section 18. When adjacent bit sequences are not a repetition of the same bit sequence, the number of runs in the unit of the predetermined number of bytes is not output.

The second stage run-length process section 18 sets a second lag that denotes whether or not a bit sequence of a predetermined number of bytes composed of a predetermined number of sequences of MSB side bits is repeated. The second flag is used to control the process of the second stage run-length process section 18. In addition, the second flag is embedded in output data.

As will be described later, when the value of the second flag is for example "1", it denotes that a bit sequence of a predetermined number of bytes composed of a predetermined number of sequences of MSB side bits is repeated. In the process of the second stage run-length process section 18, when the value of the second flag is "1", it denotes that a bit sequence of a predetermined number of bytes composed of a predetermined number of sequences of MSB side bits is repeated. In contrast, when the number of the second flag is "0", it denotes that a bit sequences of a predetermined number of bytes composed of a predetermined number of sequences of MSB side bits is not repeated. In the process of the second stage run-length process section 18, when the value of the second flag is "0", it denotes that a bit sequence of a predetermined number of bytes composed of a predetermined number of sequences of MSB side bits is not repeated.

1-1-1-2. Data Structure

Figure 5:
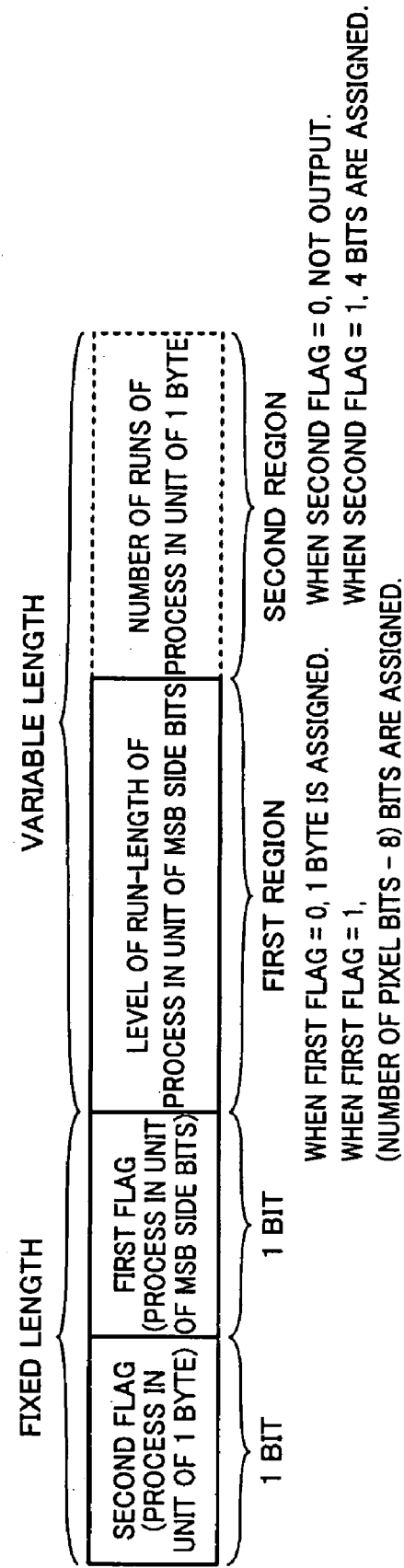
FIG. 5 is a schematic diagram showing an example of the structure of output data on the MSB side according to the first embodiment.

FIG. 5 shows the structure of an example of output data on the MSB side based on the outputs of the first stage run-length process section 17 and the second stage run-length process section 18. As exemplified in FIG. 5, output data on the MSB side are composed of a fixed length portion and a variable length portion preceded by the fixed length portion. In the fixed length portion, the second flag and the first flag are placed.

In the variable length portion, there are a first region and a second region. In the first region, data based on the processed result of the first stage run-length process section 17 are placed. In the second region, data based on the processed result of the second stage run-length process section 18 are placed.

In the first region, data stored therein are decided based on the value of the first flag and a data length thereof is assigned. In other words, when the first flag denotes that the run-length process has been performed in the unit of a bit sequence of MSB side bits, the data length is assigned on the basis of the number of bits of the MSB side bits and the level of the run-length is placed. In the example of which the number of quantizer bits of pixel data is 10 bits, two bits as the data length of the MSB side bits are assigned to the first region and the level of the run-length for example "01" is placed.

When the first flag denotes that the run-length process has not been performed in the unit of a bit sequence of MSB side bits, the size of a predetermined number of sequences of MSB side bits is assigned and a predetermined number of bit sequences of MSB side bits is placed. When the number of quantizer bits of pixel data is 10 bits, a predetermined number of bytes, namely one byte (=eight bits), is assigned to the first region and a bit sequence of four sequences of MSB side bits for example "01011101" is placed.

In the second region, the number of runs of the run-length process in the unit of a predetermined number of bytes based on the processed result of the second stage run-length process section 18 is placed. It is decided whether or not the second region is assigned based on the value of the second flag. In other words, when the second flag denotes that a bit sequence of a predetermined number of bytes is repeated, a predetermined number of bits is assigned to the second region and the number of repetitions (number of runs) as the result of the run-length process of the second stage run-length process section 18 is placed.

In contrast, when the second flag denotes that a bit sequence of a predetermined number of bytes is not repeated, the second region is not assigned. In other words, in this case, the second region is not output.

Instead, when the run-length process has not been performed in the unit of MSB side bits and the run-length process has not been performed in the unit of a predetermined number of bytes, a bit sequence of a predetermined number of bytes that has not been encoded is placed in the variable length portion.

In this structure of output data, the first flag and the second flag denote whether or not the run-length process has been performed in the unit of MSB side bits and denote whether or not the run-length process has been performed in the unit of a predetermined number of bytes, respectively.

1-1-1-3. Encoding Process

Next, with reference to flow charts shown in FIG. 6 to FIG. 10, the encoding process according to the first embodiment of the present invention will be described more specifically. Individual processes shown in the flow charts shown in FIG. 6 to FIG. 10 can be controlled for example by a CPU (not shown) according to a predetermined program. Instead, each section that composes the encoding apparatus 1 exemplified in FIG. 1 can be interlocked to execute the encoding process. In the following description, it is assumed that the encoding process is performed for each frame of picture data.

Figure 6:
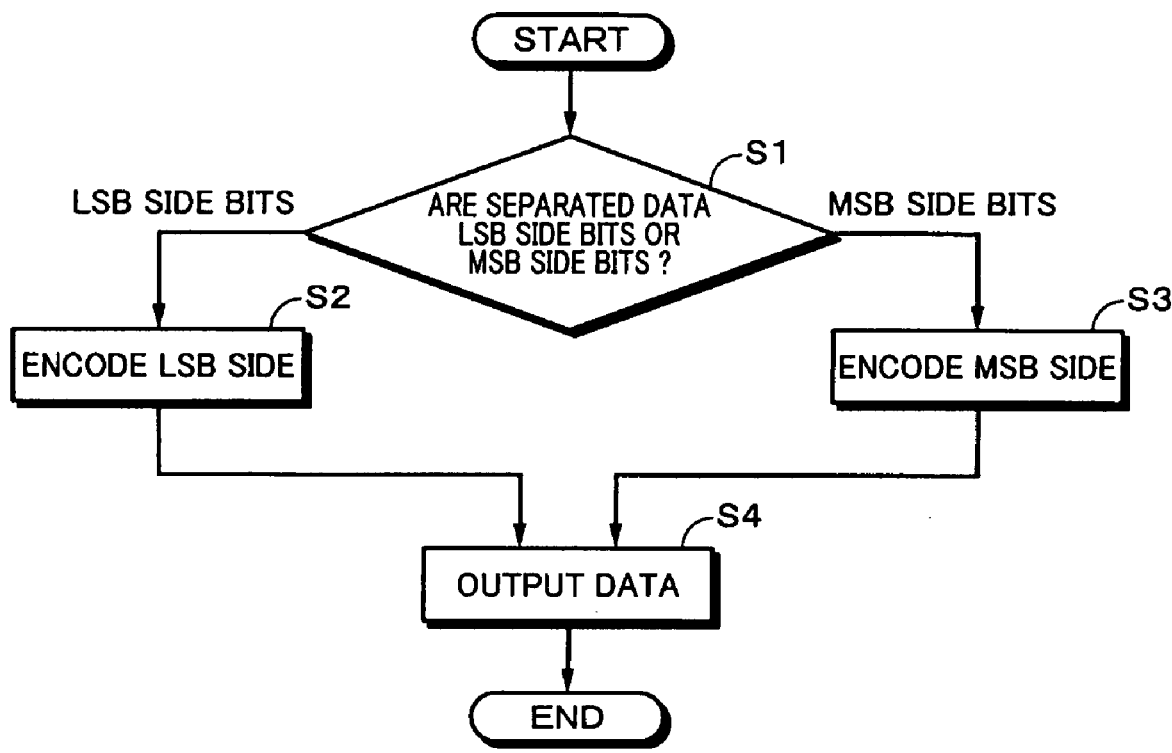
FIG. 6 is a flow chart showing an example of the encoding process according to the first embodiment of the present invention.

FIG. 6 is a flow chart showing the overall flow of the encoding method according to the first embodiment of the present invention. As was described above, in the first embodiment of the present invention, pixel data of each pixel of picture data are separated into eight LSB side bits and the remaining MSB side bits excluding the eight LSB side bits (at step S1). The separated LSB side bits are encoded (at step S2) and the separated MSB side bits are encoded (at step S3). The encoded data of the LSB side bits at step S2 and the encoded data of the MSB side bits at step S3 are interleaved and output in a predetermined manner (at step S4).

Figure 7:
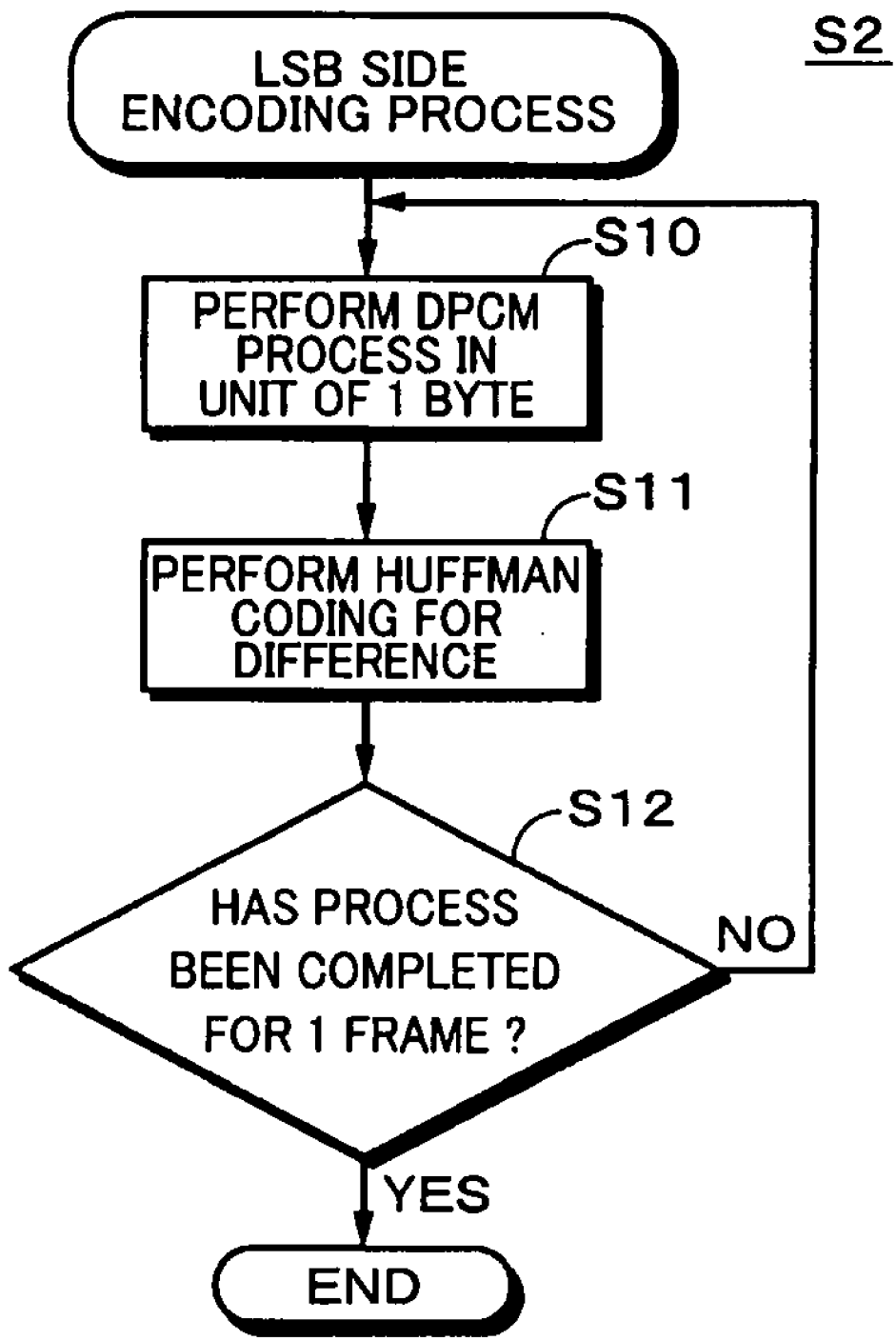
FIG. 7 is a flow chart showing an example of the encoding process according to the first embodiment of the present invention.

FIG. 7 is a flow chart showing an example of the encoding process for LSB side bits at step S2. With reference to also FIG. 3A, the DPCM section 13 performs the DPCM process for the LSB side bits stored in the LSB side data memory 12 for each pixel and outputs difference data (at step S10). Thereafter, the flow advances to step S11. At step S11, the Huffman encoding section 14 performs the encoding process for the difference data that are output from the DPCM section 13 according to the Huffman encoding process and outputs encoded data (see FIG. 3B). Output data of the encoded LSB side bits are written to the output data memory 15 in a predetermined manner. After the encoding process has been completed for one frame (at step S12), the flow advances to step S4 shown in FIG. 6.

Figure 8:
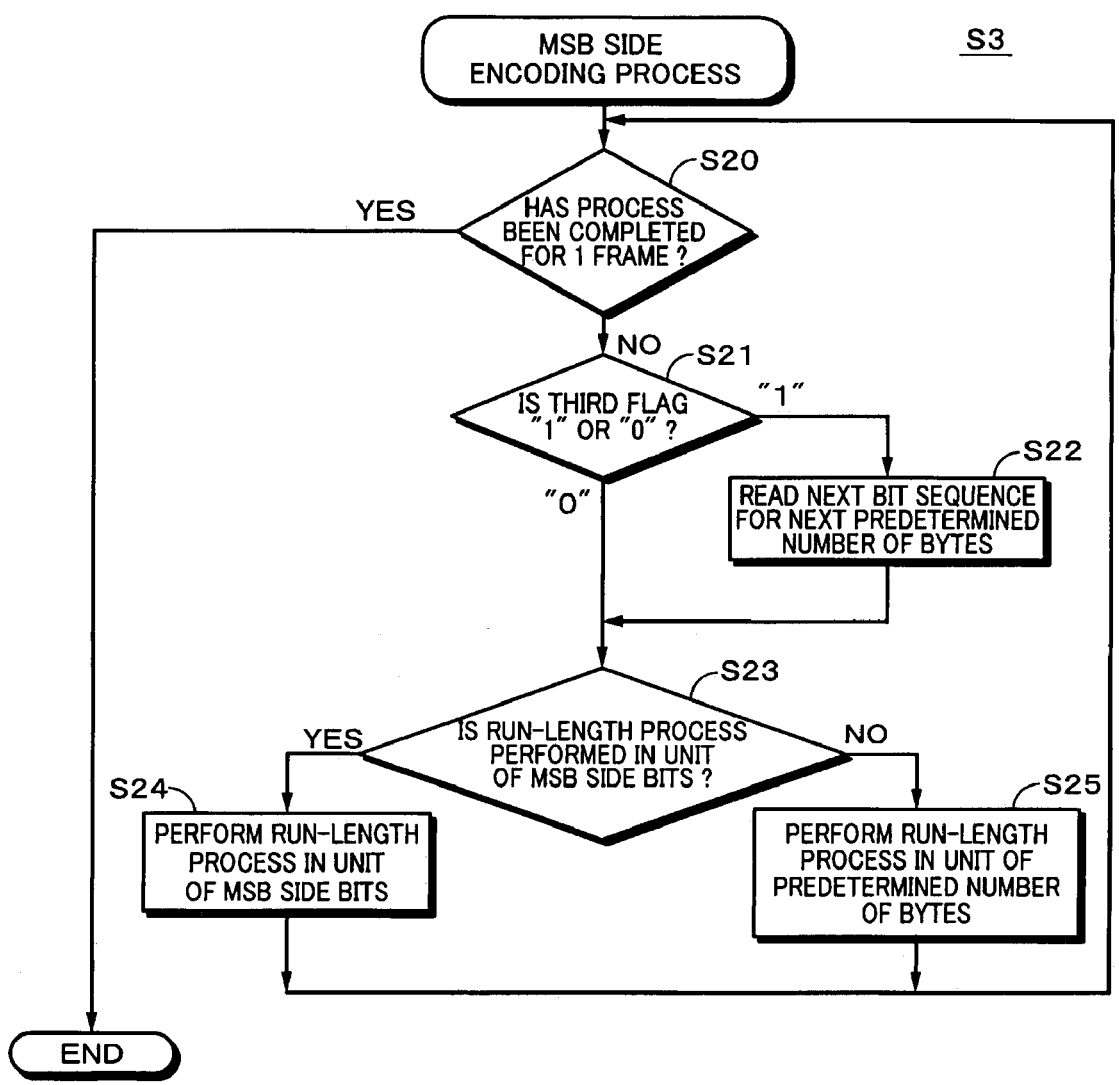
FIG. 8 is a flow chart showing an example of the encoding process according to the first embodiment of the present invention.

FIG. 8 is a flow chart showing an example of the encoding process for MSB side bits at step S3. At step S20, it is determined whether or not the process has been completed for one frame. When the determined result denotes that the process has been completed for one frame, the flow advances to step S4 shown in FIG. 6. When the process has not been completed, the flow advances to step S21.

At step S21, it is determined whether or not a bit sequence for a predetermined number of bytes, namely one byte, is read from the MSB side data memory 16 based on a third flag. When the value of the third flag is "1", it denotes that a bit sequence is read. When the value of the third flag is "0", it denotes that a bit sequence is not read. It is assumed that the initial value of the third flag is "1". When the value of the third flag is "0", it is determined that a bit sequence be not read. In this case, the flow advances to step S23.

In contrast, when the value of the third flag is "1", it is determined that a bit sequence be read. In this case, the flow advances to step S22. At step S22, a bit sequence for a predetermined number of bytes is read from the MSB side data memory 16. Thereafter, the flow advances to step S23. The bit sequence that has been read is stored for example in a memory or a register (not shown).

At step S23, it is determined whether or not the run-length process is performed for a bit sequence of a predetermined bytes of MSB side bits in the unit of MSB side bits. In other words, at step S23, it is determined whether the run-length process is performed in the unit of MSB side bits or the run-length process is performed in the unit of a predetermined number of bytes. The determination at step S23 is performed on the basis of processed results at step S24 and step S25 as will be described with reference to FIG. 9 and FIG. 10 in detail.

In this example, for convenience, a fourth flag is defined. When the value of the fourth flag is "0", the run-length process is performed later in the unit of MSB side bits. When the value of the fourth flag is "1", the run-length process is performed later in the unit of a predetermined number of bytes. It is assumed that the initial value of the forth flag is "0". In other words, in the initial state, the run-length process is performed later in the unit of MSB side bits.

When the determined result at step S23 denotes that the run-length process is performed in the unit of MSB side bits, the flow advances to step S24. At step S24, the first stage run-length process section 17 performs the run-length process for a bit sequence of a predetermined number of bytes of MSB side bits stored in the memory or register (not shown) in the unit of MSB side bits. After the process has been completed, the value of the first value is set to a predetermined value and the value of the third flag is set to "1". Thereafter, the flow returns to step S20.

In contrast, when the determined result at step S23 denotes that the run-length process is not performed in the unit of MSB side bits, the flow advances to step S25. At step S25, the second stage run-length process section 18 performs the run-length process for a bit sequence of a predetermined number of bytes of MSB side bits stored in the memory or register (not shown). After the process has been completed, the second flag and the third flag are set to predetermined values. Thereafter, the flow returns to step S20.

Figure 9:
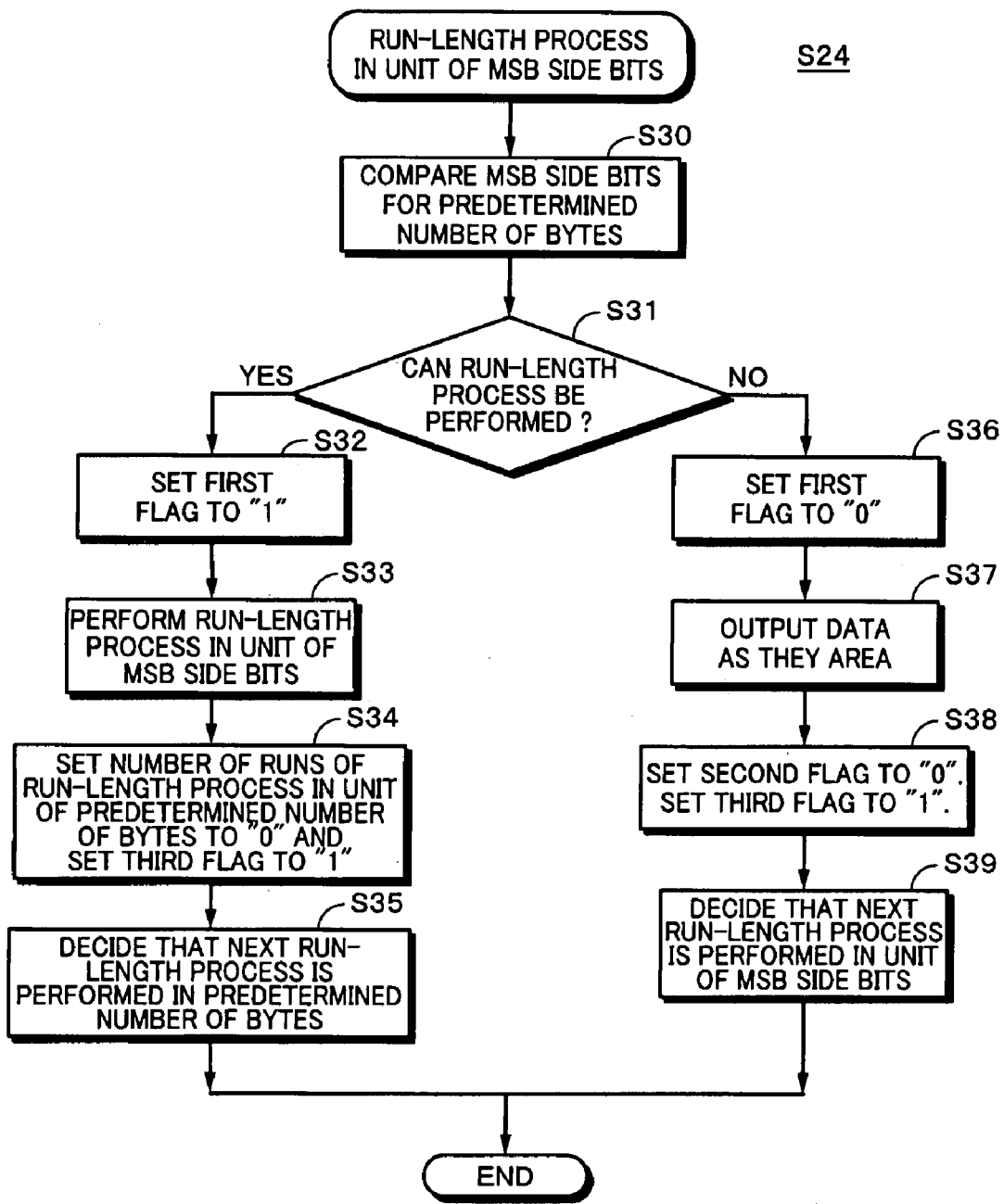
FIG. 9 is a flow chart showing an example of the encoding process according to the first embodiment of the present invention.

FIG. 9 is a flow chart showing an example of the run-length process in the unit of MSB side bits at step S24 shown in FIG. 8. At step S30, a bit sequence for a predetermined number of bytes composed of a predetermined number of sequences of MSB side bits is compared in the unit of MSB side bits. At step S31, it is determined whether or not the run-length process can be performed for the bit sequence of the predetermined number of bytes in the unit of MSB side bits on the basis of the compared result. In other words, when the bit sequence of the predetermined number of bytes is composed of a predetermined number of repetitions of the MSB side bits, it is determined that the run-length process be able to be performed in the unit of MSB side bits.

When the determined result at step S31 denotes that the run-length process can be performed in the unit of MSB side bits, the flow advances to step S32. At step S32, the value of the first flag is set to "1". Thereafter, the flow advances to step S33. At step S33, the run-length process is performed in the unit of MSB side bits. As the result of the run-length process, the level of the run-length is output. The level of the run-length that has been output is stored in the memory or register (not shown).

Thereafter, the flow advances to step S34. At step S34, the number of runs of the run-length process in the unit of a predetermined number of bytes performed by the second stage run-length process section 18 is set to "0, which is the initial value, and the value of the third flag is set to "1". Thereafter, the flow advances to step S35. At step S35, it is decided that the next run-length process is performed in the unit of a predetermined number of bytes. For example, the value of the fourth flag is set to "1". Thereafter, the flow returns to step S20 shown in FIG. 8.

In contrast, when the determined result at step S31 denotes that the run-length process is not able to be performed in the unit of MSB side bits, the flow advances to step S36. At step S36, the value of the first flag is set to "0". At the next step, S37, the bit sequence for the predetermined number of bytes that has been read is output as it is. The output bit sequence is stored for example in the memory or register (not shown).

At the next step, S38, the value of the second flag is set to "0" and the value of the third flag is set to "1". At the next step, S39, it is decided that the next run-length process is performed in the unit of MSB side bits. For example, the value of the fourth flag is set to "0". In other words, when the run-length process is not able to be performed for a bit sequence of a predetermined number of bytes in the unit of MSB side bits, it seems that the likelihood of which the run-length process can be performed in the unit of a predetermined number of bytes is low. Thereafter, the flow returns to step S20 shown in FIG. 8.

Figure 10:
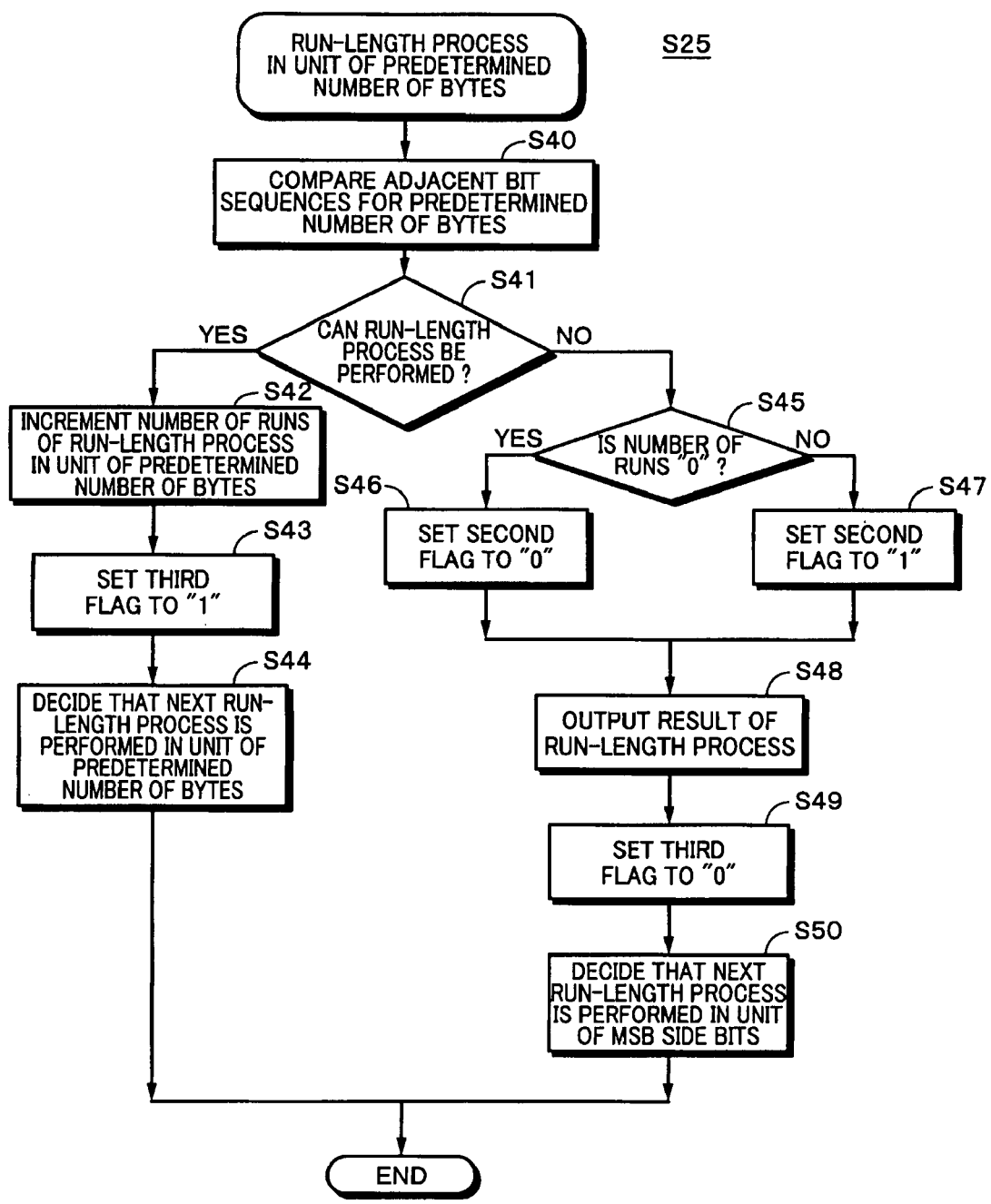
FIG. 10 is a flow chart showing an example of the encoding process according to the first embodiment of the present invention.

FIG. 10 is a flow chart showing an example of the run-length process in the unit of a bit sequence for a predetermined number of bytes of MSB side bits at step S25 shown in FIG. 8. At the first step, S40, a bit sequence for a predetermined number of bytes adjacent to the bit sequence for the predetermined number of bytes that has been read is read from the MSB side data memory 16 and these bit sequences are compared.

It is determined whether or not the run-length process can be performed in the unit of a predetermined number of bytes based on the compared result at step S40. In other words, when the bit sequence for the predetermined number of bytes that has been immediately previously read matches the bit sequence for the predetermined number of bytes that have been newly read, it is determined that the run-length process be able to be performed in the unit of a predetermined number of bytes. When the determined result denotes that the run-length process can be performed in the unit of a predetermined number of bytes, the flow advances to step S42.

At step S42, the run-length process is performed in the unit of a predetermined number of bytes. The run-length process is performed by comparing a bit sequence for a predetermined number of bytes that has been immediately previously read (this bit sequence is referred to as a reference bit sequence) with a bit sequence for a predetermined number of bytes that has been newly read (this bit sequence is referred to as a comparison bit sequence). When they match, the number of runs is incremented for example by 1.

The run length process is repeated until a bit sequence different from the reference bit sequence occurs in the comparison bit sequence. For example, when the comparison bit sequence matches the reference bit sequence, the predetermined number of bytes after the comparison bit sequence is read as a new comparison bit sequence from the MSB side data memory 16. It is determined whether or not the new comparison bit sequence matches the reference bit sequence. When they match, the number of runs is incremented by 1. A predetermined number of bytes after the comparison bit sequence is read as a new comparison bit sequence and the new comparison bit sequence is compared with the reference bit sequence.

Instead, in the run-length process at step S42, the run-length process is repeated until the number of runs reaches a predetermined limit value while a bit sequence different from the comparison bit sequence occurs in the reference bit sequence and the number of runs is incremented. As was described with reference to FIG. 5, the limit value of the number of runs is based on the size of the second region assigned to the output data on the MSB side. When for example four bits have been assigned to the second region, the limit value of the number of runs becomes "16" where value "0000" is 1. However, the limit value of the number of runs is not limited to "16".

After the run-length process has been completed at step S42, the flow advances to step S43. At step S43, the value of the third flag is set to "1". At step S44, it is decided that the next run-length process is performed in the unit of a predetermined number of bytes. For example, the value of the fourth flag is set to "1". After the process has been completed at step S44, the flow returns to step S20 shown in FIG. 8.

In contrast, when the determined result at step S41 denotes that the run-length process is not able to be performed. In other words, when the determined result denotes that the bit sequence for a predetermined number of bytes that has been immediately previously read does not match the bit sequence for a predetermined number of bytes that has been newly read, the flow advances to step S45. At step S45, it is determined whether or not the number of runs of the run-length process in the unit of a predetermined number of bytes performed by the second stage run-length process section 18 is "0".

When the determined result at step S45 denotes that the number of runs be "0", the flow advances to step S46. At step S46, the value of the second flag is set to "0". In contrast, when the determined result at step S45 denotes that the number of runs is equal to or larger than "1" and is not "0", the flow advances to step S47. At step S47, the value of the second flag is set to "1".

When the second flag has been set to a predetermined value at step S46 or step S47, the flow advances to step S48. At step S48, the result of the run-length process is output. In this example, as described with reference to FIG. 5, the output is controlled based on the value of the second flag that has been set at step S46 and step S47. In other words, when the value of the second flag has been set to "0" at step S46, data are not output. When the value of the second flag has been set to "1" at step S47, the number of runs that has been stored is output.

When the result of the run-length process has been output at step S47, the flow advances to step S49. At step S49, the value of the third flag is set to "0". At step S50, it is decided that the next run-length process is performed in the unit of MSB side bits. For example, the value of the fourth flag is set to "0". After the process has been completed at step S50, the flow returns to step S20.

1-1-1-4. Specific Example of Encoding Process

Next, with reference to FIG. 11A to FIG. 11D, a specific example of the encoding process for MSB side bits in the processes shown in FIG. 6 to FIG. 10 will be described. It is assumed that the number of quantizer bits of picture data is 10 bits and pixel data has a data length of 10 bits. In other words, the data length of MSB side bits is two bits.

FIG. 11A shows an example of MSB side bits separated at step S1 shown in FIG. 6. The MSB side bits composed of two bits are separated for each pixel and arranged corresponding to pixels arranged for example horizontally and rightwardly in each line on the screen starting from the upper left corner and stored in the MSB side data memory 16. In the example shown in FIG. 11A, the MSB side bits of the first 16 pixels are all "00". The MSB side bits of the 17-th pixel to the 20-th pixel are a repetition of "01". The MSB side bits from 21-st pixel to the 24-th pixel are bit sequences of "11", "01", "01", and "01", respectively.

Since the value of the third flag has been initially set to "1", the flow advances from step S21 to step S22 shown in FIG. 8. At step S21, a bit sequence for a predetermined number of bytes is read from the MSB side data memory 16. In this example, since a predetermined number of bytes is one byte, as represented by bit sequence (a) "00000000" shown in FIG. 11B, which is MSB side bits for four pixels, is read from the MSB side data memory 16.

At step S23, it is determined whether the next run-length process is performed in the unit of MSB side bits or the next run-length process is performed in the unit of a predetermined number of bytes on the basis of for example the fourth flag. As was described above, in the initial state, the run-length process is performed in the unit of MSB side bits, the flow advances to step S24 (step S30 shown in FIG. 9). At step S24, bit sequence (a) for a predetermined number of bytes of MSB side bits for four pixels is compared in the unit of MSB side bits.

In other words, as exemplified in FIG. 11C, bit sequence (a) excluding MSB side bits A is compared with MSB side bits A in the unit of two bits and it is determined whether or not they match.

Since bit sequence (a) is a repetition of which bit sequence "00", of MSB side bits is repeated four times, it is determined that the run-length process be able to be performed (at step S31). At step S32, the first flag is set to "1". At the next step, S33, the run-length process is performed for bit sequence (a) in the unit of MSB side bits. Bit sequence "00" of MSB side bits that is repeated is output as the level of the run-length and the first flag is output.

At step S32 and step S33, output data 100A (first flag) and output data 101B (level of run-length) shown in FIG. 11D are decided. As described above, the number of repetitions in the run-length process in the unit of MSB side bits depends on the number of quantizer bits of pixel data. Thus, it is not necessary to output the number of repetitions.

Next, the number of runs of the run-length process in a predetermined number of bytes is set to "0", which is the initial value, and the value of the third flag is set to "1" (at step S34). It is decided that the next run-length process is performed in the unit of a predetermined number of bytes (at step S35). Thereafter, the flow returns to step S20 shown in FIG. 8. At this point, the value of the first flag is "1", the value of the third flag is "1", and the number of runs is "0".

At step S20 shown in FIG. 8, since the process has not been completed for one frame, the flow advances to step S21. As described above, since the value of the third flag has been set to "1" at step S34 shown in FIG. 9, the flow advances to step S22. At step S22, bit sequence (b) "00000000" for a predetermined number of bytes, adjacent to bit sequence (a), is read. At the next step, S23, as described above, since it has been decided at step S35 shown in FIG. 35 that the next run-length process is performed in the unit of a predetermined number of bytes, the flow advances to step S25 (at step S40 shown in FIG. 10).

At step S40 shown in FIG. 10, bit sequence (a) that has been immediately previously read is compared with bit sequence (b) that has been newly read. Since bit sequence (a) matches bit sequence (b), it is determined that the run-length process be able to be performed (at step S41). At step S42, the run-length process is performed in the unit of one byte. Thereafter, the number of runs is incremented. Since bit sequence (a) matches bit sequence (b), the number of runs is incremented and becomes "1".

When bit sequence (a) matches bit sequence (b), bit sequence (c) "00000000" adjacent to bit sequence (b) is compared again with bit sequence (a). In the example shown in FIG. 11B, since bit sequence (c) matches bit sequence (a), the number of runs is again incremented and becomes "2". When bit sequence (a) matches bit sequence (c), bit sequence (d) "00000000" adjacent to bit sequence (c) is compared again with bit sequence (a). In the example shown in FIG. 11B, since bit sequence (d) matches bit sequence (a), the number of runs is again incremented and becomes "3".

When bit sequence (a) matches bit sequence (d), bit sequence (e) "10101010" adjacent to bit sequence (d) is compared again with bit sequence (a). In this example shown in FIG. 11B, since bit sequence (e) does not match bit sequence (a), the run-length process is completed. The number of runs is held.

After the run-length process has been completed, the flow advances to step S43. At step S43, the value of the third flag is set to "1". At the next step, S35, it is decided that the next run-length process is performed in the unit of a predetermined number of bytes. Thereafter, the flow returns to step S20. At this point, the value of the first flag is "1", the value of the third flag is "1", and the number of runs is "3".

Since the process has not been completed for one frame at step S20 shown in FIG. 8, the flow advances to step S21. As was described above, since the value of the third flag has been set to "1" at step S34 shown in FIG. 9, the flow advances to step S22. At step S22, bit sequence (e) "10101010" for one byte, adjacent to bit sequence (d) for which the run-length process has been performed in the unit of a predetermined number of bytes, is read from the MSB side data memory 16. At the next step, S23, since it has been decided at step S35 shown in FIG. 9 that the next run-length process is performed in the unit of a predetermined number of bytes, the flow advances to step S25 (step S40 shown in FIG. 10).

At step S40 shown in FIG. 10, bit sequence (d) that has been immediately previously read is compared with bit sequence (e) that has been newly read. Since bit sequence (d) does not match bit sequence (e), it is determined that the run-length process be not able to be performed (at step S41). Thereafter, the flow advances to step S45. At step S45, it is determined whether or not the number of runs is "0". Since the number of runs at step S42 is "3", the flow advances to step S47. At step S47, the value of the second flag is set to "1". At the next step, S48, the result of the run-length process is output. The result of the run-length process that is output at this point is "3" ("0011" in four-bit binary notation) as the number of runs and "1", as the value of the second flag. In other words, at step S48, output data 102A (second flag) that are output in FIG. 11D and output data 103 (number of runs) are decided.

At step S32 and step S48, the process in the unit of the data structure of MSB side bits shown in FIG. 5 has been completed. As a result, bit sequence (a) to bit sequence (d) shown in FIG. 11B have been encoded. In this example, a bit sequence of 32 bits of all "0" has been encoded into bit sequence "11000011".

At the next step, S49, the value of the third flag is set to "0". At the next step, S50, it is decided that the next run-length process is performed in the unit of MSB side bits.

Thereafter, the flow returns to step S20. Since the process has not been completed for one frame, the flow returns to step S21. Since the value of the third flag has been set to "0" at step S49, new data are not read and the flow advances to step S23. Since it has been decided at step S50 that the next process is performed in the unit of MSB side bits, the flow advances from step S23 to step S24 (step S30 shown in FIG. 9).

At step S30 shown in FIG. 9, a bit sequence for a predetermined number of bytes that has been read is compared in the unit of MSB side bits. At this point, since bit sequence (e) "10101010" has been read at step S22, bit sequence (e) is processed. Bit sequence (e) is compared with MSB side bits B "10" shown in FIG. 11C. In this example, since bit sequence B on the MSB side is repeated four times, it is determined that the run-length process be able to be performed (at step S31).

At step S32, the value of the first flag is set to "1". At the next step, S33, the run-length process is performed for bit sequence (e) in the unit of MSB side bits. Bit sequence "10" of MSB side bits that has been repeated is output as the level of the run-length and the first flag is output.

At step S32 and step S33, output data 100B (first flag) and output data 101B (level of run-length) shown in FIG. 11D are decided.

Thereafter, the number of runs of the run-length process in the unit of a predetermined number of bytes is set to "0", which is the initial value, the value of the third flag is set to "1" (at step S34), and it is decided that the next run-length process is performed in the unit of a predetermined number of bytes (at step S35). Thereafter, the flow returns to step S20 shown in FIG. 8. At this point, the value of the first flag is "1", the value of the second flag is "1", the value of the third flag is "1", and the number of runs is "0".

At step S20 shown in FIG. 8, since the process has not been completed for one frame, the flow advances to step S21. As described above, since the value of the first flag has been set to "1" at step S34 shown in FIG. 9, the flow advances to step S22. At step S22, bit sequence (f) "11010101", for a predetermined number of bytes, adjacent to bit sequence (e), is read from the MSB side data memory 16. At the next step, S23, since it has been decided at step S35 shown in FIG. 9 that the next run-length process is performed in the unit of a predetermined number of bytes, the flow advances to step S25 (step S40 shown in FIG. 10).

At step S40 shown in FIG. 10, bit sequence (e) that has been immediately previously read is compared with bit sequence (f) that has been newly read, since bit sequence (e) does not match bit sequence (f), it is determined that the run-length process be not able to be performed (at step S41). Thereafter, the flow advances to step S45. At step S45, it is determined whether or not the number of runs is "0". As was described above, at this point, since the number of urns is "0", the flow advances to step S46. At step S46, the value of the second flag is set to "0". At the next step, S48, the result of the run-length process is output. The result of the run-length process that is output at this point is "0" as the number of runs and "0" as the value of the second flag.

As was described with reference to FIG. 5, when the value of the second flag is "0", since the number of runs is not output, the flow advances to step S48. At step S48, the output data 102B (second flag) shown in FIG. 11D is decided. In addition, since the number of runs is not output, it is decided that the second region shown in FIG. 5 is not assigned. At step S48, the process in the unit of the data structure on the MSB side shown in FIG. 5 has been completed and the encoding process for bit sequence (e) has been completed. Bit sequence "101010101" of eight bits has been encoded into bit sequence "0110" of four bits.

At the next step, S49, the value of the third flag is set to "0". At the next step, S50, it is decided that the next run-length process is performed in the unit of MSB side bits.

Thereafter, the flow returns to step S20 shown in FIG. 8. At step S20, since the process has not been completed for one frame, the flow advances to step S21. Since the value of the third flag has been set to "0" at step S49, the flow advances to step S23. Since it has been decided at step S50 that the next run-length process is performed in the unit of MSB side bits, the flow advances to step S24 (step S30 shown in FIG. 9).

At step S30 shown in FIG. 9, a bit sequence for a predetermined number of bits that has been read is compared in the unit of MSB side bits. At this point, since bit sequence (f) "11010101" has been read at step S22, bit sequence (f) is processed. Bit sequence (f) is compared with MSB side bits C "10" shown in FIG. 11C. Since bit sequence (f) is not a repetition of MSB side bits "11", it is determined that the run-length process be not able to be performed (at step S31). Thereafter, the flow advances to step S36. At step S36, the value of the first flag is set to "0". At step S37, bit sequence (f) is output as it is. At step S38, the value of the second flag is set to "0" and the value of the third flag is set to "1".

At step S36 to step S38, output data 102C (second flag), output data 100C (first flag), and output data 104 (bit sequence (f)) shown in FIG. 11D are decided. At this point, the process in the unit of the data structure on the MSB side shown in FIG. 5 has been completed and the encoding process for bit sequence (f) has been completed. In this case, since the run-length process has not been performed in the unit of MSB side bits, the run-length process has not been performed in the unit of a predetermined number of bytes, and the encoding process has not been performed for MSB side bits, the first flag and second flag are added to the bit sequence "11010101" of eight bits, resulting in bit sequence "0011010101" of 10 bits.

At the next step, S39, since the run-length process is not able to be performed for a bit sequence for a predetermined number of bytes in the unit of MSB side bits, it seems that the likelihood of which the run-length process can be performed in the unit of a predetermined number of bytes is low. Thus, it is decided that the next run-length process is performed in the unit of MSB side bits.

Thereafter, the flow returns to step S20 shown in FIG. 8. At step S20, since the process has not been completed for one frame, the flow advances to step S21. As described above, since the value of the third flag has been set to "1" at step S38 shown in FIG. 9, the flow advances to step S22. At step S22, bit sequence (g) "1010110110" for a predetermined number of bytes, adjacent to bit sequence (f), is read from the MSB side data memory 16. At the next step, S23, as was described above, since it has been decided at step S39 shown in FIG. 9 that the next run-length process is performed in the unit of MSB side bits, the flow advances to step S24 (step S30 shown in FIG. 9).

At step S30 shown in FIG. 9, a bit sequence for a predetermined number of bytes that has been read is compared in the unit of MSB side bits. At this point, since bit sequence (g) "10101010" has been read at step S22, bit sequence (g) is processed. Bit sequence (g) is compared with bit sequence "10" of the MSB side bits at the beginning. In this example, since bit sequence "10" of MSB side bits is repeated four times, it is determined that the run-length process be able to be performed (at step S31). At step S32, the value of the first flag is set to "1". At the next step, S33, the run-length process is performed for bit sequence (g) in the unit of MSB side bits. Bit sequence "10" of MSB side bits that is repeated is output as the level of the run-length and the first flag is output.

Thereafter, the number of runs of the run-length process in the unit of a predetermined number of bytes is set to "0", which is the initial value, the value of the first flag is set to "1" (at step S34), and it is decided that the next run-length process is performed in the unit of a predetermined number of bytes (at step S35). Thereafter, the flow returns to step S20 shown in FIG. 8.

The foregoing process is successively performed for all pixel data of one frame.

Since the run-length process for MSB side bits is performed in two stages in the unit of a predetermined number of bytes and in the unit of MSB side bits, it can be expected that high compression rate can be obtained.

In addition, since the encoding process is performed unidirectionally in lines without reference to pixels that are present on adjacent lines and that have been processed, the encoding process can be performed at high speed.

The run-length process is performed in the unit of MSB side bits only when all bit sequences of a predetermined number of MSB side bits are repeated. At this point, since the number of runs is not output because of information about the number of quantizer bits of pixel data, the compression rate can be further increased. In addition, when all bit sequence of MSB side bits is not repeated in a predetermined number of MSB side bits, a predetermined number of MSB side bits is output as it is. Thus, the run-length process can be performed at high speed.

1-1-1-5. Output Format

Figure 12:
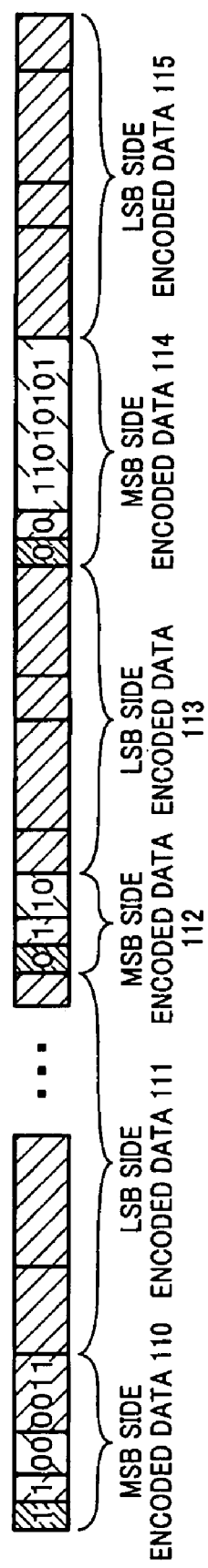
FIG. 12 is a schematic diagram showing an example of an output format of output data obtained by the encoding process for LSB side bits and MSB side bits according to the first embodiment of the present invention.

FIG. 12 shows an example of an output format of output data obtained by the encoding process for LSB side bits and MSB side bits. The example shown in FIG. 12 corresponds to the data output shown in FIG. 11D. As described above, according to this embodiment of the present invention, LSB side bits and MSB side bits that have been encoded are interleaved and output. The unit of interleaving can be decided based on a data structure in which MSB side bits can be decoded in the unit of a predetermined number of bytes. The decoding process will be described later.

As the unit of MSB side bits having the structure shown in FIG. 5, encoded data of MSB side bits and encoded data of LSB side bits are alternately placed. In this case, although LSB side bits have been encoded in the unit of a pixel, MSB side bits have been encoded by the run-length process in the unit of MSB side bits for a plurality of pixels. Thus, encoded data of MSB side bits are followed by encoded data of LSB side bits corresponding to MSB side bits.

In the example shown in FIG. 12, MSB side encoded data 110 placed at the beginning correspond to the output data 100A, 101A, 102A, and 103 shown in FIG. 11D. With reference to FIG. 11A and FIG. 11B, the MSB side encoded data 110 are MSB side bits that have been encoded for 16 pixels. Thus, the MSB side encoded data 110 are followed by LSB side encoded data 111 of which LSB side bits have been encoded for the corresponding 16 pixels.

The LSB side encoded data 111 are followed by MSB side encoded data 112 that correspond to the output data 100B, 101B, and 102B shown in FIG. 11D. With reference to FIG. 11A and FIG. 11B, the MSB side encoded data 112 are MSB side bits that have been encoded for four pixels. Thus, the MSB side encoded data 112 are followed by LSB side encoded data 113 of which LSB side bits have been encoded for the corresponding four pixels.

Likewise, the LSB side encoded data 113 are followed by MSB side encoded data 114 that correspond to the output data 100C and 103 and the second flag whose value is "1". With reference to FIG. 11A and FIG. 11B, the MSB side encoded data 114 correspond to the MSB side bits for four pixels. Thus, the MSB side encoded data 114 are followed by LSB side encoded data 115 of which LSB side bits have been encoded for the corresponding four pixels.

Thus, according to this embodiment, encoded data of MSB side bits and encoded data of LSB side bits are interleaved and output. The output data are stored for example in a file. Instead, the output data may be output as stream data to a predetermined transmission path. Since MSB side bits and LSB side bits are interleaved in the unit of a plurality of pixels, the receiving side can start decoding data before all data have been received.

1-1-2. First Modification of First Embodiment (First Different Output Format)

Next, a first modification of the first embodiment of the present invention will be described. In the first modification of the first embodiment, the format of output data is different from that of the first embodiment. Thus, the structure of the encoding apparatus is partly changed from that of the first embodiment. In other words, in the first embodiment of the present invention, MSB side bits and LSB side bits are interleaved and output. In contrast, in the first modification of the first embodiment, output data of one output system are separated into LSB side bits and MSB side bits.

Figure 13:
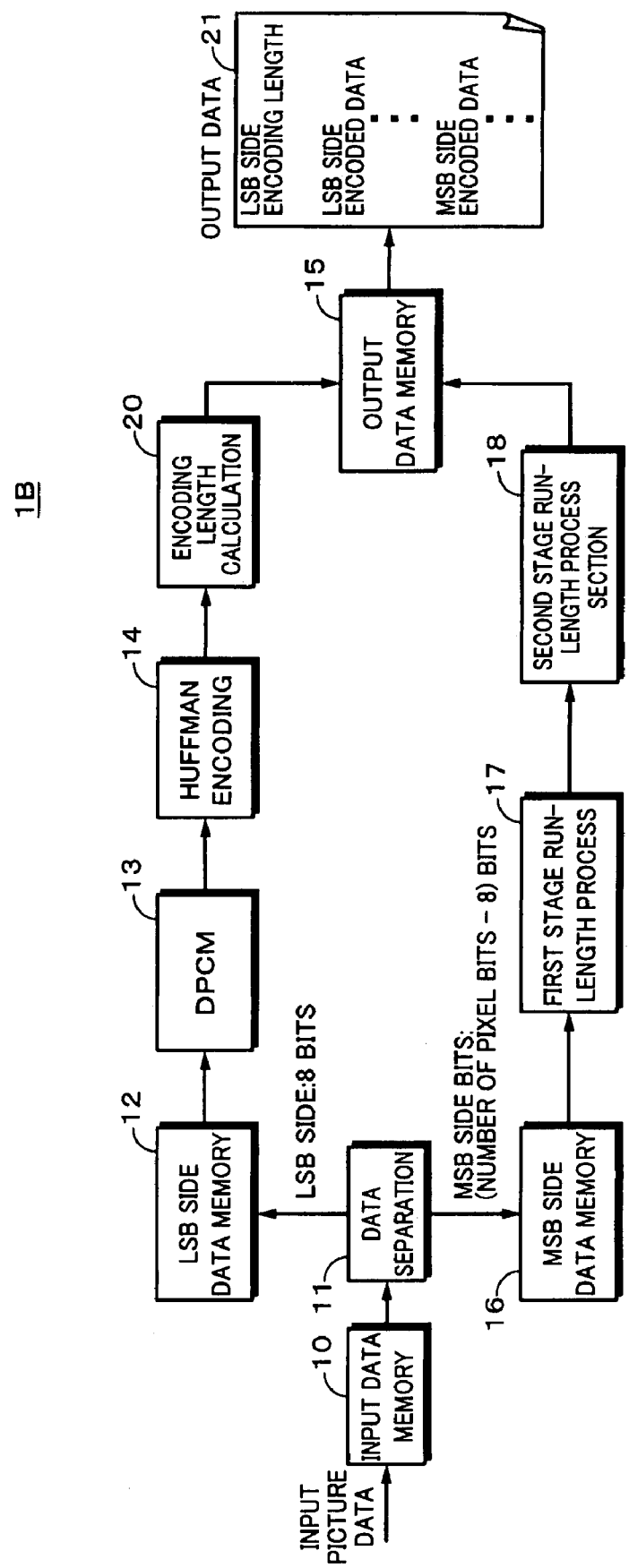
FIG. 13 is a functional block diagram showing an example of a function of an example of an encoding apparatus according to a first modification of the first embodiment of the present invention.

FIG. 13 is a functional block diagram showing an example of a function of an example of an encoding apparatus 1B according to the first modification of the first embodiment. In FIG. 13, similar portions to those in FIG. 1 will be denoted by similar reference numerals and their description will be omitted.

In the structure shown in FIG. 13, LSB side bit encoding processes of a DPCM section 13 and a Huffman encoding section 14 and MSB side bit encoding processes of a first stage run-length process section 17 and a second stage run-length process section 18 are the same as those of the first embodiment.

As shown in FIG. 13, in the encoding apparatus 1B according to the first modification of the first embodiment, a encoding length calculation section 20 is added to the LSB side bit encoding section of the encoding apparatus 1A of the first embodiment shown in FIG. 1. The encoding length calculation section 20 cumulates a code length of encoded data that have been encoded with a variable length code by the Huffman encoding section 13 corresponding to an encoding delimitation. The cumulated LSB side bit encoded data length information is stored in an output data memory 15. Output data that are read from the output data memory 15 are stored for example in an output file 21.

When output data are stored for example in a file, pixel data that have been encoded are stored in one file are one encoding delimitation. For pixel data stored in one file, the code amount of encoded data of which LSB side bits have been encoded is cumulated. Instead, encoded pixel data for one frame may be an encoding delimitation. Instead, encoded pixel data for one line or a plurality of frames may be an encoding delimitation. Instead, a predetermined divided portion of a screen may be an encoding delimitation.

Figure 14:
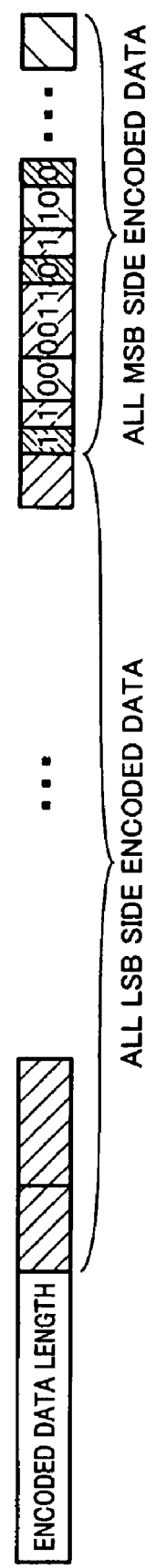
FIG. 14 is a schematic diagram showing an example of an output format of which MSB side bits and LSB side bits are encoded and output according to the first modification of the first embodiment of the present invention.

FIG. 14 shows an example of an output format in the case that MSB side bits and LSB side bits are encoded and output according to the first modification of first embodiment of the present invention. At the beginning, encoded data length information is placed in the output data. The data length of the encoded data length information is fixed and for example a predetermined number of bytes. The encoded data length information is followed by LSB side encoded data of which LSB side bits have been encoded. At this point, all LSB side encoded data for pixels corresponding to the encoding delimitation are collectively placed. The LSB side encoded data are followed by MSB side encoded data of which all MSB side bits for pixels corresponding to the encoding delimitation have been encoded and collected.

When the encoded data length information at the beginning of the output data is fixed length data, the MSB side encoded data starts after the end of the encoded data length information.

In this example, the LSB side encoded data are placed nearly at the front of the output data, whereas the MSB side encoded data are placed nearly at the end of the output data. Instead, the MSB side encoded data may be placed nearly at the beginning of the output data, whereas the LSB side encoded data may be placed nearly at the end of the output data. In this case, the encoding length calculation section 20 is disposed downstream of the second stage run-length process section 18 so that the code length of the MSB side encoded data is cumulated, the encoded data length information of the cumulated MSB side bits is placed at the beginning of the output data, and the encoded data length information is followed by the MSB side encoded data and then the LSB side encoded data.

1-1-3. Second Modification of First Embodiment (Second Different Output Format)

Next, a second modification of the first embodiment of the present invention will be described. In the second modification of the first embodiment, LSB side encoded data and MSB side encoded data that are output as a single stream according to the first modification of the first embodiment are independently output.

Figure 15:
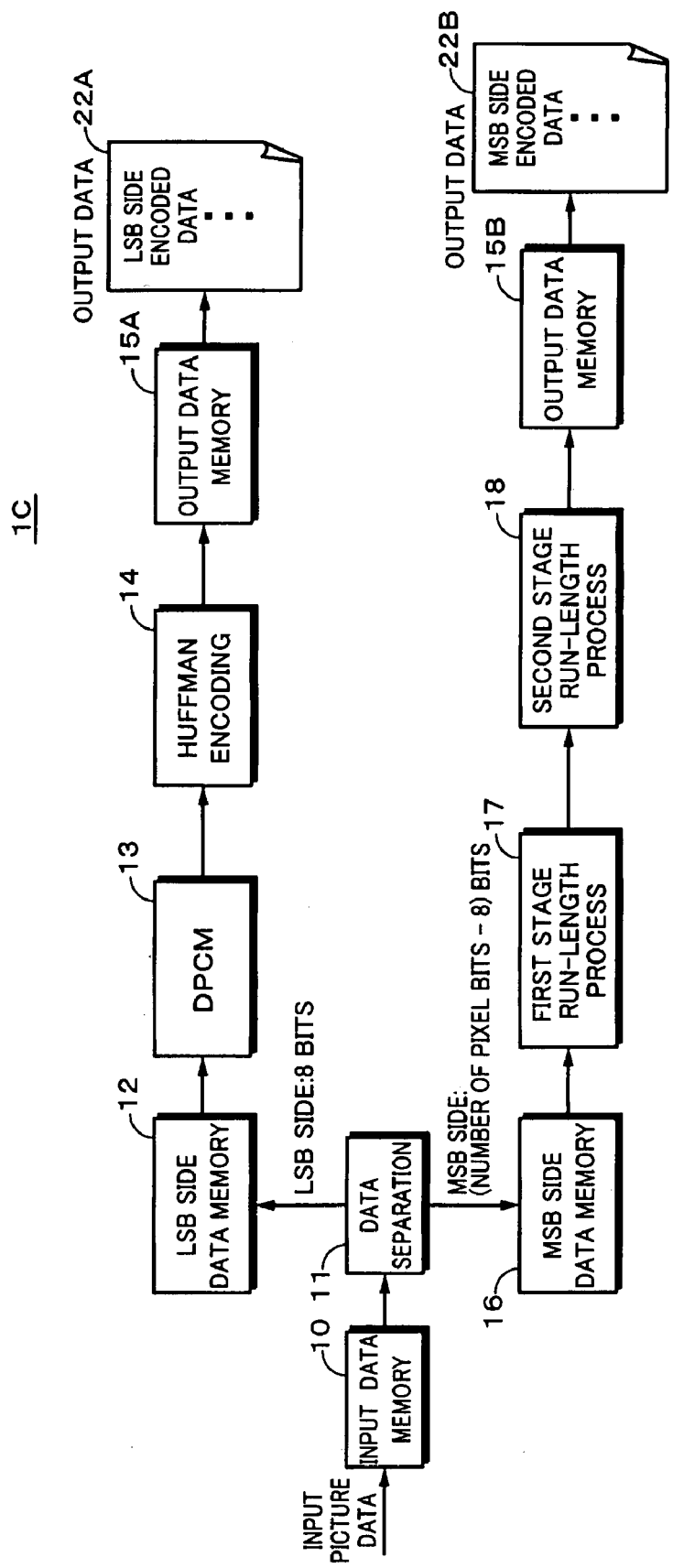
FIG. 15 is a functional block diagram showing an example of a function of an example of an encoding apparatus according to a second modification of the first embodiment of the present invention.

FIG. 15 is a functional block diagram showing an example of a function of an example of an encoding apparatus 1C according to the second modification of the first embodiment of the present invention. In FIG. 15, similar sections to those in FIG. 1 will be denoted by similar reference numerals and their description will be omitted.

In the structure shown in FIG. 15, LSB side bit encoding processes of a DPCM section 13 and a Huffman encoding section 14 and MSB side bit encoding processes of a first stage run-length process section 17 and a second stage run-length process section 18 are the same as those of the first embodiment.

As shown in FIG. 15, the encoding apparatus 1C according to the second modification of the first embodiment has output data memory 15A and 15B on the LSB side and the MSB side, respectively. An output of the Huffman encoding section 14 as an LSB side bit encoded output is stored in the output data memory 15A. An output of the second stage run-length process section 18 as an MSB side bit encoded output is stored in the output data memory 15B.

The LSB side bit encoded output and the MSB side bit encoded output are independently read from the output data memory 15A and the output data memory 15B, respectively. As exemplified in FIG. 16, they are output as data of two systems of output data 22A and output data 22B. The output data 22A and the output data 22B are stored for example in different files.

1-1-4. Third Modification of First Embodiment (Different Encoding Unit)

Next, a third modification of the first embodiment of the present invention will be described. In the first embodiment, a predetermined number of bytes is one byte and the run-length process for MSB side bits is performed in the unit of one byte. In contrast, in the third modification of the first embodiment, a predetermined number of bytes is two bytes and the run-length process for MSB side bits is performed in the unit of two bytes. In other words, the run-length process in the unit of MSB side bits is performed for a bit sequence composed of MSB side bits for two bytes and the run-length process in the unit of a predetermined number of bytes is performed in the unit of two bytes.

In the third embodiment of the first embodiment, the encoding apparatus 1A (see FIG. 1) according to the first embodiment can be applied as it is. In addition, the encoding process described with reference to the flow charts shown in FIG. 6 to FIG. 10 can be basically applied as it is. Thus, to prevent redundancy, their detailed description will be omitted. In addition, since the encoding process for LSB side bits is performed according to DPCM and Huffman encoding processes in the same manner as described in the first embodiment, their description will be also omitted. In the following description, a predetermined number of bytes is two bytes.

FIG. 17 shows an outline of processes of a data separation section 11 and a first stage run-length process section 17 according to the third modification of the first embodiment in the case that the numbers of quantizer bits of pixel data are nine bits, 10 bits, 11 bits, and 12 bits. Like the first embodiment, the data separation section 11 separates pixel data into eight LSB side bits and the remaining MSB side bits excluding the eight LSB side bits for each pixel and forms MSB side bits and LSB side bits. The first stage run-length process section 17 performs the run-length process by comparing a bit sequence of a predetermined number of bytes (in this example, two bytes) of MSB side bits stored in an MSB side data memory 16 in the unit of the number of bits of MSB side bits.

In other words, when data of one pixel are composed of nine bits, a data sequence of a predetermined number of bytes composed of MSB side bits of adjacent 16 pixels is processed by the first stage run-length process section 17. When the number of quantizer bits of pixel data is 10 bits, a data sequence of a predetermined number of bytes composed of MSB side bits of adjacent eight pixels is processed by the first stage run-length process section 17. When the numbers of quantizer bits of pixel data are 11 bits and 12 bits, a data sequence of a predetermined number of bytes composed of MSB side bits of adjacent four pixels is processed by the first stage run-length process section 17.

Like the case of which the number of quantizer bits is 10 bits, when an integer multiple of the number of stuffing bits is not a predetermined number of bytes, a predetermined number of stuffing bits are used.

In the case of which the number of quantizer bits of pixel data is 10 bits and one pixel has a data length of 10 bits, a bit sequence of a predetermined number of bytes composed of MSB side bits, which are two bites, of adjacent eight pixels is compared in the unit of two bits corresponding to MSB side bits. When the compared result denotes that the bit sequence of the predetermined number of bytes is a repetition of MSB side bits, the bit sequence of the repeated MSB side bits is output as the level of the run-length.

Likewise, when the number of quantizer bits of pixel data is nine bits and one pixel has a data length of nine bits, a bit sequence of a predetermined number of bytes composed of MSB side bits of adjacent 16 pixels is compared in the unit of one bit corresponding to MSB side bits. When the number of quantizer bits of pixel data is 12 bits and one pixel has a data length of 12 bits, a data sequence of a predetermined number of bytes composed of MSB side bits of adjacent four pixels is compared in the unit of four bits corresponding to MSB side bits.

When the number of quantizer bits of pixel data is 11 bits and one pixel has a data length of 11 bits, since the data length of MSB side bits is three bits, five sequences of MSB side bits can be placed in the predetermined number of bytes. When one stuffing bit is added to each of the sequences of three MSB side bits, a bit sequence of 16 bits composed of MSB side bits including stuffing bits of adjacent four pixels is compared in the unit of four bits or three bits corresponding to MSB side bits. On the other hand, when five sequences of three MSB side bits are placed in a predetermined number of bytes, a bit sequence of 15 bits composed of three MSB side bits of adjacent five pixels is compared in the unit of three bits corresponding to MSB side bits.

In the same manner as the first embodiment, the first stage run-length process section 17 sets the first flag, which denotes whether or not MSB side bits of a predetermined number of adjacent sequences is composed of a repetition of the same bit sequence in a predetermined number of bytes.

The second stage run-length process section 18 performs the run-length process in the unit of a predetermined number of bytes, namely two bytes. More specifically, the second stage run-length process section 18 determines whether or not data stored in the MSB side data memory 16 are a repetition of the same bit sequence in the unit of a bit sequence of a predetermined number of bytes and counts the number of repetitions. The counted value of the number of repetitions is output as the number of runs in the unit of a predetermined number of bytes from the second stage run-length process section 18. When the sequence of 16 bits is not a repetition of the same bit sequence, the number of runs in the unit of a predetermined number of bytes-is not output.

The second stage run-length process section 18 sets the second flag, which denotes whether or not a bit sequence of a predetermined number of bytes, namely two bytes, composed of a predetermined number of sequences of MSB side bits is repeated.

Figure 18:
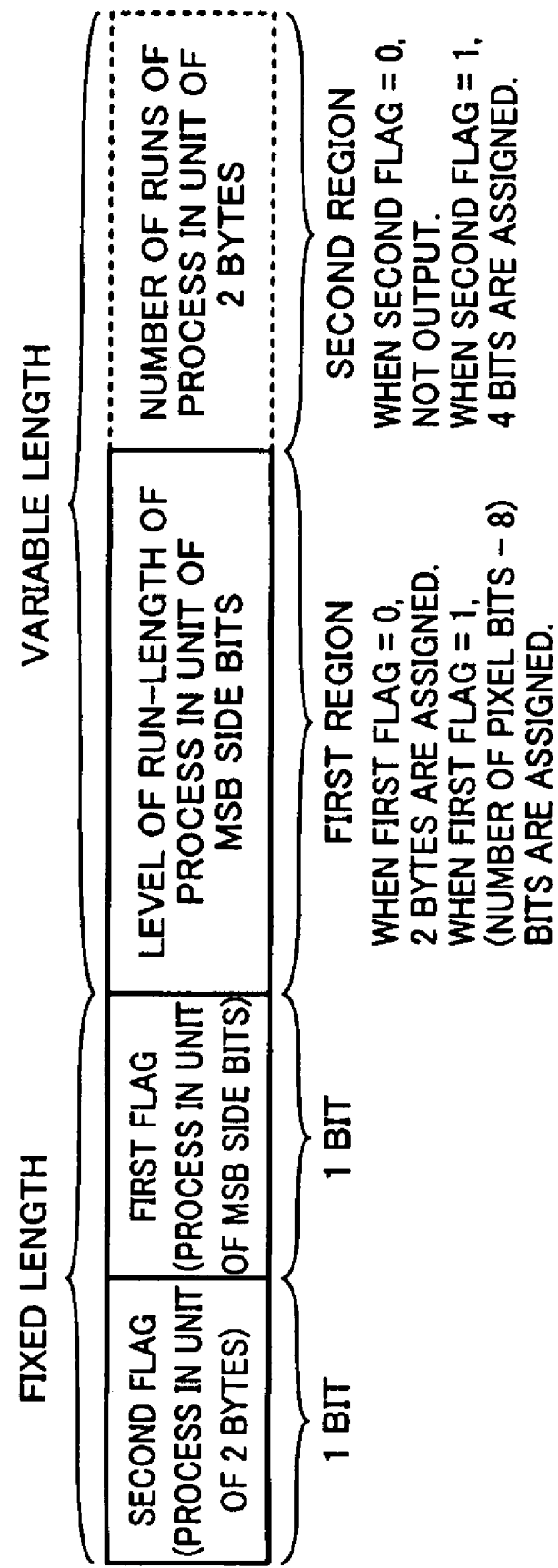
FIG. 18 is a schematic diagram showing the structure of an example of output data on the MSB side according to the third modification of the first embodiment of the present invention.

FIG. 18 shows the structure of an example of output data on the MSB side based on outputs of the first stage run-length process section 17 and the second stage run-length process section 18 according to the third modification of the first embodiment. The structure of the output data is basically the same as that of the first embodiment described with reference to FIG. 5. In other words, in the output data, the first flag and the second flag of one bit each are placed. The output data are composed of a fixed length portion and a variable length portion preceded by the fixed length portion. In the variable length portion, a first region for data based on a processed result of the first stage run-length process section 17 and a second region for data based on a processed result of the second stage run-length process section 18 are placed.

In the first region of the variable length portion, data that are placed are decided based on the value of the first flag. When the first flag denotes that the run-length process has been performed in the unit of-a bit sequence of MSB side bits, the data length is assigned to the first region corresponding to the number of MSB side bits and the level of the run-length is placed. In contrast, when the first flag denotes that the run-length process has not been processed in the unit of a bit sequence of MSB side bits, the size of a predetermined number of bytes is assigned to the first region.

The second region is a region in which the number of runs in the unit of a predetermined number of bytes based on the processed result of the second stage run-length process section 18 is placed. It is decided whether or not the second region is assigned based on the value of the second flag. In other words, when the second flag denotes that a bit sequence of a predetermined number of bytes is repeated, the size of the predetermined number of bites is assigned to the second region. The number of repetitions (the number of runs) as the result of the run-length process of the second stage run-length process section 18 is placed in the second region. In contrast, when the second flag denotes that a bit sequence of a predetermined number of bytes is not repeated, the second region is not assigned.

FIG. 19A to FIG. 19D show an outline of the encoding process for MSB side bits in the unit of a predetermined number of bytes in the case that the predetermined number of bytes is two bytes according to the third modification of the first embodiment. In this example, it is assumed that the number of quantizer bits of pixel data is 10 bits and one pixel has a data length of 10 bits. FIG. 19A shows an example of MSB side bits separated by the data separation section 11. MSB side bits composed of two bits separated for each pixel are successively arranged corresponding to pixels arranged for example horizontally and rightwardly in each line on the screen starting from the upper left corner and stored in the MSB side data memory 16. The run-length process is performed in the unit of a predetermine number of bytes, namely two bytes, of MSB side bits of eight pixels.

For example, bit sequence (A) "0000000000000000" of a predetermined number of bytes exemplified in FIG. 19B is a repetition of which bit sequence "00" of MSB side bits at the beginning is repeated eight times. In addition, bit sequence (A) matches bit sequence (B) "0000000000000000" of a predetermined number of bytes adjacent to bit sequence (A). The run-length process is performed for bit sequence (A) with bit sequence "00" of MSB side bits D at the beginning in the unit of MSB side bits. By comparing bit sequence (B) adjacent to bit sequence (A) with bit sequence (A), the run-length process is performed in the unit of a predetermined number of bytes (see FIG. 19C). As the results of the run-length process in the unit of MSB side bits and the run-length process in the unit of a predetermined number of bytes, the first flag and the second flag are set. In addition, in this example, the level of the run-length of the run-length process in the unit of MSB side bits and the number of runs of the run-length process in the unit of a predetermined number of bytes are output (see FIG. 19D).

Since bit sequence (C) "1010101011010101" of a predetermined number of bytes shown in FIG. 19B is not a repetition of bit sequence "10" of MSB side bits E at the beginning, the run-length process is not performed in the unit of MSB side bits. Thus, bit sequence (A) is not compared with the adjacent bit sequence of a predetermined number of bytes in the unit of a predetermined number of bytes (see step S30, step S31, and step S36 to step S39 in the flow chart shown in FIG. 9). As a result, the first flag and the second flag are set and bit sequence (C) of a predetermined number of bytes is output as it is (see FIG. 19D).

According to the third modification of the first embodiment, the run-length process is performed for MSB side bits with a bit sequence of two bytes. Thus, in the first embodiment, the run-length process is performed for MSB side bits with a bit sequence of one byte. In contrast, in the third modification of the first embodiment, since the run-length process is performed for MSB side bits with a bit sequence of two bytes, when MSB side bits of pixel data are highly repetitive, the third modification of the first embodiment can be suitably used. For example, when the encoding system according to the third modification of the first embodiment is applied to a relatively flat picture of for example an animation, high compression rate and high speed encoding can be expected.

When the number of quantizer bits of pixel data is larger than eight bits and equal to or smaller than 12 bits, the run-length process for MSB side bits with a bit sequence of one byte according to the first embodiment of the present invention can be expected to have high compression rate. In other words, when the number of quantizer bits of pixel data is equal to or larger than 13 bits and smaller than 16 bits, since the level of the run-length of the run-length process in the unit of MSB side bits becomes five bits or more, only one sequence of MSB side bits can be placed in a predetermined number of bytes (one byte). As a result, the run-length process for a predetermined number of bytes in the unit of MSB side bits is not satisfied.

In contrast, in the third modification of the first embodiment, since the run-length process is performed for MSB side bits with a bit sequence of two bytes, even if the number of quantizer bits of pixel data is equal to or larger than 13 bits and smaller than 16 bits, high compression rate can be expected. In other words, even if the number of quantizer bits of pixel data is equal to or larger than 13 bit and smaller than 16 bits, since at least two sequences of MSB side bits can be placed in a predetermined number of bytes (two bytes), the run-length process can be effectively performed in the unit of MSB side bits. Thus, the third modification of the first embodiment is suitable for the encoding process for picture data having high resolution with respect to gradation of pixels of which the number of quantizer bits of pixel data is for example, 13 bits, 14 bits, or 15 bits.

In the third modification of the first embodiment, any of the output format of the first embodiment of which MSB side encoded data and LSB side encoded data are interleaved as described with reference to FIG. 12, the output format of the first modification of the first embodiment of which one output sequence is separated into LSB side bits and MSB side bits as described with reference to FIG. 13 and FIG. 14, and the output format of the second modification of the first embodiment of which LSB side encoded data and MSB side encoded data are independently output as described with reference to FIG. 15 and FIG. 16 can be applied.

In the third embodiment of the first embodiment, the run-length process for MSB side bits is performed with a bit sequence of two bytes. Instead, the run-length process for MSB side bits may be performed with a bit sequence of three bytes or more.

Figure 20:
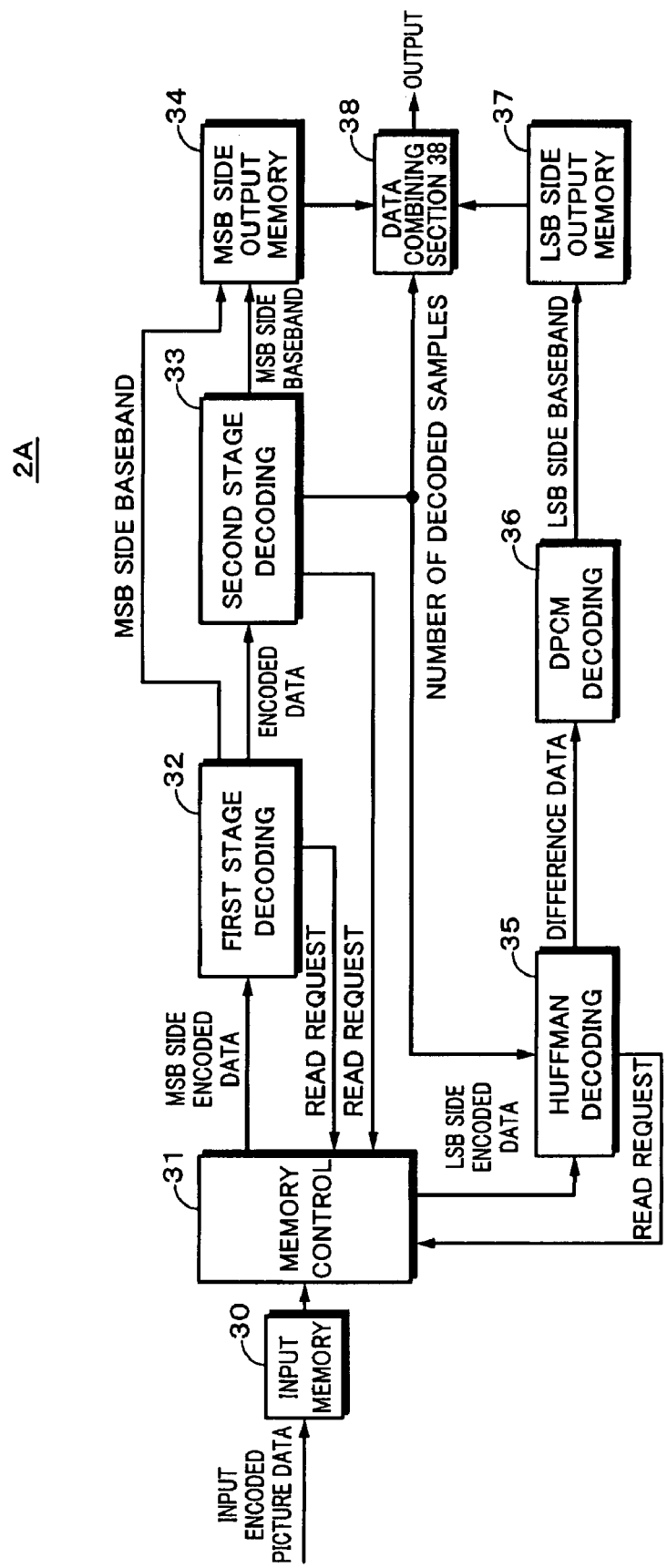
FIG. 20 is a functional block diagram showing a function of an decoding apparatus that performs decoding process according to the first embodiment of the present invention.

1-2. Decoding Process According to First Embodiment of Present Invention 1-2-1-1. Decoding Apparatus Next, an example of a decoding process according to a first embodiment of the present invention corresponding to the encoding process of which encoded LSB side bits and encoded MSB side bits are interleaved and output will be described. FIG. 20 is a functional block diagram showing an example of a function of a decoding apparatus 2A according to the first embodiment of the present invention.

As will be described later, the overall operation of each of the decoding apparatus 2A shown in FIG. 1, a decoding apparatus 2B (described later), and a decoding apparatus 2C (described later) are controlled by a CPU (not shown) according to a predetermined program. Each section shown in FIG. 20 may be accomplished by a memory (not shown) and a program that is executed on the CPU. Instead, each section may be composed of an independent hardware component and the operation of the hardware component may be controlled by the CPU.

Encoded data of which MSB side encoded data and LSB side encoded data have been interleaved in a predetermined manner by the encoding apparatus 1A is stored in an input memory 30. It is assumed that the original number of quantizer bits of pixel data that have been encoded by the encoding apparatus 1A has been set to the decoding apparatus 2A. In the following description, a predetermined byte is one byte. Data that are read from the input memory 30 are controlled by a memory control section 31.

First of all, a decoding process for MSB side encoded data will be described. A first stage decoding section 32 decodes data for which the run-length process has been performed in the unit of MSB side bits. A second stage decoding section 33 decodes data for which the run-length process has been performed in the unit of a predetermined number of bytes for example one byte. The first stage decoding section 32 and the second stage decoding section 33 send a data read request to the memory control section 31 and read the first flag and the second flag from the memory control section 31.

The first stage decoding section 32 sends a data read request to the memory control section 31 to read MSB side bits or the next predetermined number of bytes based on the value of the first flag. When the first stage decoding section 32 has sent the data read request for MSB side bits, the memory control section 31 repeatedly outputs the MSB side bits corresponding to the data read request the number of times corresponding to the number of quantizer bits of the original pixel data. When the first stage decoding section 32 has sent the data read request for the next predetermined number of bytes, the memory control section 31 outputs the requested predetermined number of bytes corresponding to the data read request. The output data are supplied to the second stage decoding section 33.

The second stage decoding section 33 sends a data read request to the memory control section 31 to read the number of runs of the run-length process in the unit of a predetermined number of bytes or does not send a data read request to the memory control section 31 on the basis of the second flag. When the second stage decoding section 33 has sent the data read request for the number of runs of the run-length process in the unit of a predetermined number of bytes, the memory control section 31 repeatedly outputs data for a predetermined number of bytes supplied from the first stage decoding section 32 the number of times corresponding to the number of runs. When the second stage decoding section 33 has not sent a data read request to the memory control section 31, the memory control section 31 outputs data of a predetermined number of bytes supplied from the first stage decoding section 32 as they are.

An output of the second stage decoding section 33 is baseband MSB side bits. The baseband MSB side bits are stored in an MSB side output memory 34 in a predetermined manner.

The second stage decoding section 33 counts the number of samples (number of pixels) that have been decoded. The counted number of decoded samples is supplied to a Huffman decoding section 35 and a data combining section 38.

Next, a decoding process for LSB side encoded data will be described. The Huffman decoding section 35 sends a data read request to the memory control section 31 to read LSB side encoded data corresponding to the number of decoded samples supplied from the second stage decoding section 33. Corresponding to the request, the Huffman decoding section 35 reads LSB side encoded data from the memory control section 31.

The Huffman decoding section 35 has a predetermined Huffman table corresponding to the Huffman table of the encoding apparatus 1A. The Huffman decoding section 35 decodes Huffman code of LSB side encoded data that have been read with reference to the Huffman table. The decoded data have a fixed data length, which is eight bits, for each pixel. An output of the Huffman decoding section 35 is supplied to a -DPCM decoding section 36. The DPCM decoding section 36 decodes DPCM encoded data by adding the supplied data of eight bits and data of eight bits that have been immediately previously processed.

An output of the DPCM decoding section 36 is baseband LSB side bits. The baseband LSB side bits are stored in an LSB side output memory 37.

The data combining section 38 reads baseband MSB side bits and baseband LSB side bits from the MSB side output memory 34 and the LSB side output memory 37 based on the number of decoded samples supplied from the second stage decoding section 33 and combines data as pixel data of one pixel. For example, when MSB side bits and LSB side bits supplied from the second stage decoding section 33 have been stored in the MSB side output memory 34 and the LSB side output memory 37 for the number of decoded samples supplied from the second stage decoding section 33, the data combining section 38 connects MSB side bits and corresponding LSB side bits, forms data of one pixel, and outputs the pixel data.

1-2-1-2. Decoding Process

Figure 21:
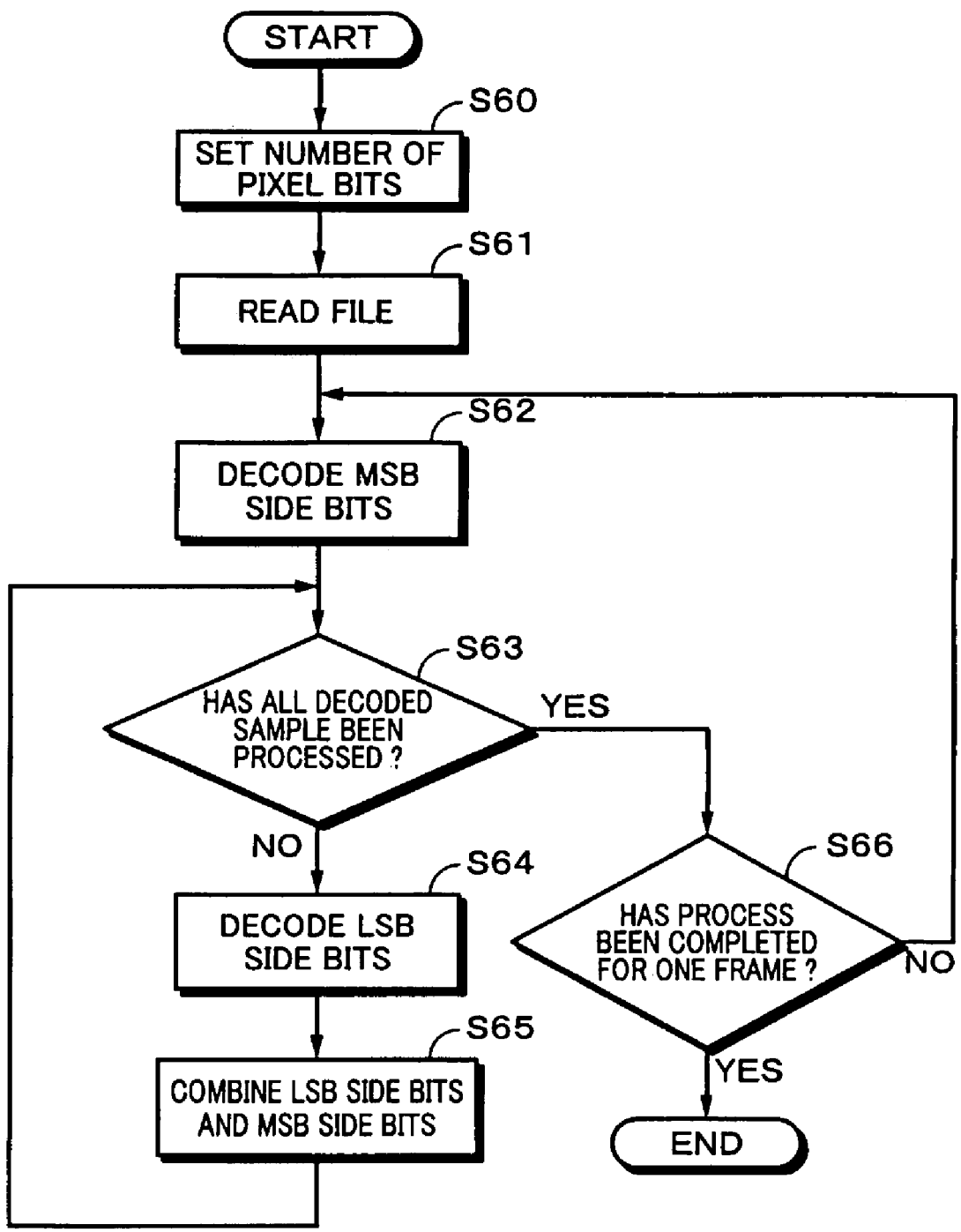
FIG. 21 is a flow chart showing an example of the decoding process of the decoding apparatus according to the first embodiment of the present invention.
Figure 22:
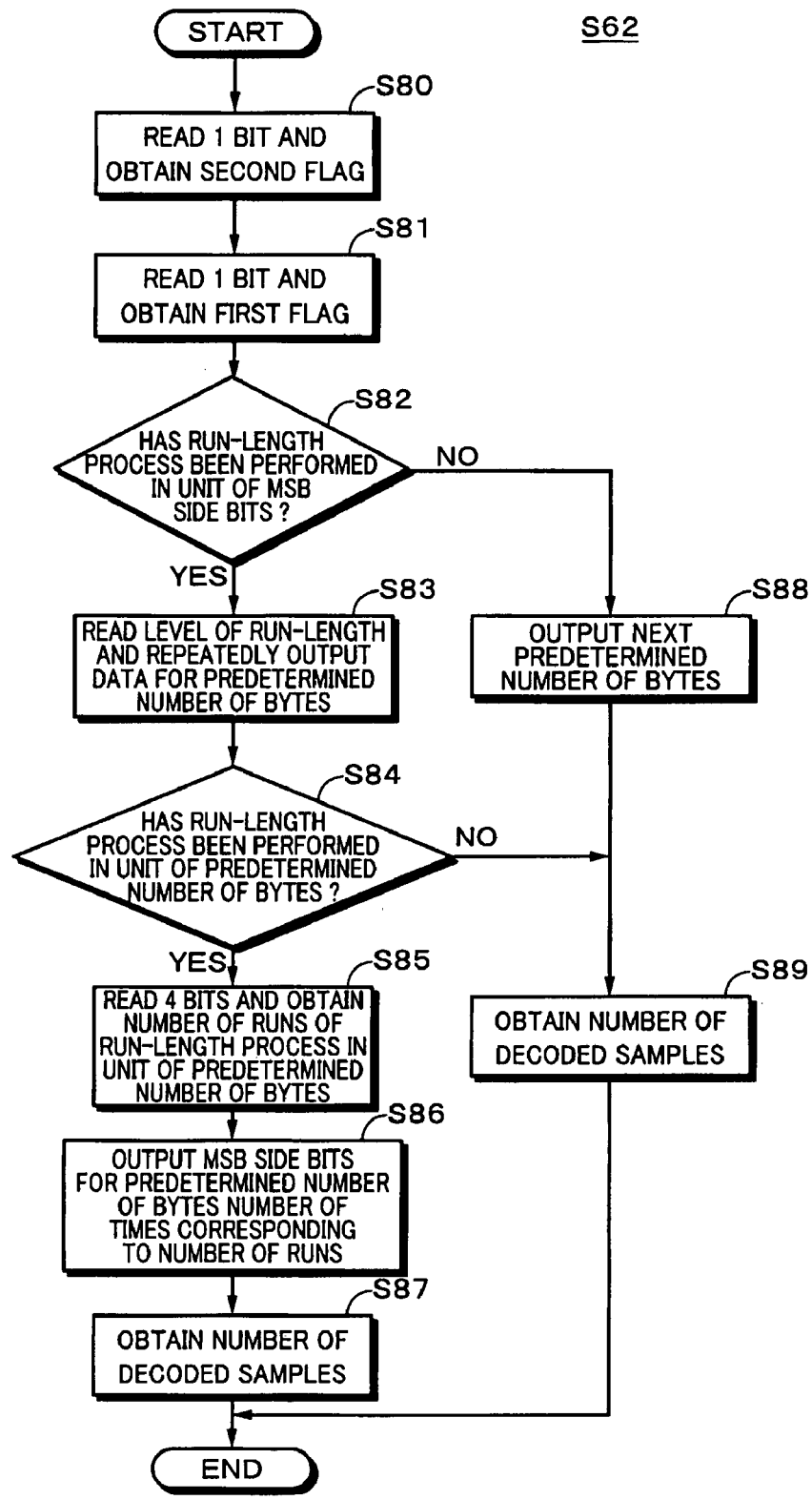
FIG. 22 is a flow chart showing an example of the decoding process of the decoding apparatus according to the first embodiment of the present invention.

FIG. 21 to FIG. 22 are flow charts showing an example of the decoding process of the decoding apparatus 2A according to the first embodiment of the present invention. Each step of the flow charts shown in FIG. 21 to FIG. 23 can be controlled by the CPU (not shown) according to a predetermined program. Instead, each section that composes the decoding apparatus 2A exemplified in FIG. 20 may be interlocked to execute each step.

FIG. 21 is a flow chart showing the overall flow of the decoding method according to the first embodiment of the present invention. In this example, it is assumed that the encoding apparatus 1A has encoded for pixel data of one frame and the decoding apparatus 2A performs the decoding process for the encoded data for one frame.

First of all, at step S60, the number of bits of pixel data of baseband picture data that the encoding apparatus 1A encodes is set. At the next step, S61, a file that contains encoded data that have been encoded by the encoding apparatus 1A is read. The encoded data that are read from the file are stored in the input memory 30. The encoded data may be supplied for example as stream data and stored in the input memory 30, not supplied with a file.

At the next step, S62, the first stage decoding section 32 and the second stage decoding section 33 perform the decoding processes for the MSB side encoded data. The decoded baseband MSB side bits are stored in the MSB side output memory 34. The second stage decoding section 33 outputs the number of decoded samples. The number of decoded samples is supplied to the Huffman decoding section 35 and the data combining section 38.

At the next step, S64, it is determined whether or not the combining process for LSB side bits and MSB side bits has been performed for the number of decoded samples. When the determined result denotes that the combining process has been performed for the number of decoded samples, the flow advances to step S66. At step S66, it is determined whether or not the process has been completed for data of one frame. When the determined result denotes that the process has been completed for data of one frame, the decoding process is completed. In contrast, when the determined result denotes that the process has not been performed for data of one frame, the flow returns to step S62.

When the determined result denotes that the combining process has not been completed for the number of decoded samples, the flow advances to step S64. At step S64, the Huffman decoding section 35 and the DPCM decoding section 36 decode the LSB side encoded data. The decoded baseband LSB side bits are stored in the LSB side output memory 37.

After LSB side bits for one pixel have been decoded, the flow advances to step S65. At step S65, the data combining section 38 combines MSB side bits for one pixel decoded at step S62 and corresponding LSB side bits for one pixel decoded at step S64 and restores pixel data for one pixel. After pixel data for one pixel have been combined, the flow returns to step S63.

FIG. 22 is a flow chart showing in detail an example of the decoding process for MSB side encoded data at step S62 shown in FIG. 21. With reference to the data structure of output data on the MSB side described with reference to FIG. 5, at the first step, S80, one bit is read from the beginning of the output data and the second flag is obtained by the second stage decoding section 33. At step S81, the next one bit is read and the first flag is obtained by the first stage decoding section 32.

At the next step, S82, the first stage decoding section 32 determines whether or not the run-length process has been performed in the unit of. MSB side bits on the basis of the value of the first flag. When the value of the first flag is "1", the determined results denotes that the run-length process has been performed in the unit of MSB side bits. In this case, the flow advances to step S83. At step S83, the first stage decoding section 32 reads the next two bits of the first flag, namely, the level of the run-length, and repeatedly outputs the value of two bits for a predetermined number of bytes.

When the value of the first flag is "0", the determined result denotes that the run-length process has not been performed in the unit of MSB side bits. In this case, the flow advances to step S88. At step S88, a predetermined number of bytes, namely one byte (=eight bits), preceded by the first flag is read and output. Thereafter, the flow advances to step S89.

At the next step, S84, the second stage decoding section 33 determines whether or not the run-length process has been performed in the unit of a predetermined number of bytes based on the value of the second flag that has been obtained. When the value of the second flag is "1", the determined result denotes that the run-length process has been performed in the unit of a predetermined number of bytes. In this case, the flow advances to step S85. At step S85, four bits preceded by the first flag are read and the number of runs of the run-length process in the unit of a predetermined number of bytes is obtained.

In contrast, when the determined result at step S84 denotes that the run-length process has been performed in the unit of a predetermined number of bytes, the flow advances to step S89. At step S89, the number of decoded samples is obtained.

At the next step, S86, the second stage decoding section 33 repeatedly outputs data for a predetermined number of bytes that are output from the first stage decoding section 32 at step S83 the number of times corresponding to the number of runs obtained at step S85. Thereafter, the flow advances to step S87. At step S87, the number of decoded samples is obtained.

Figure 23:
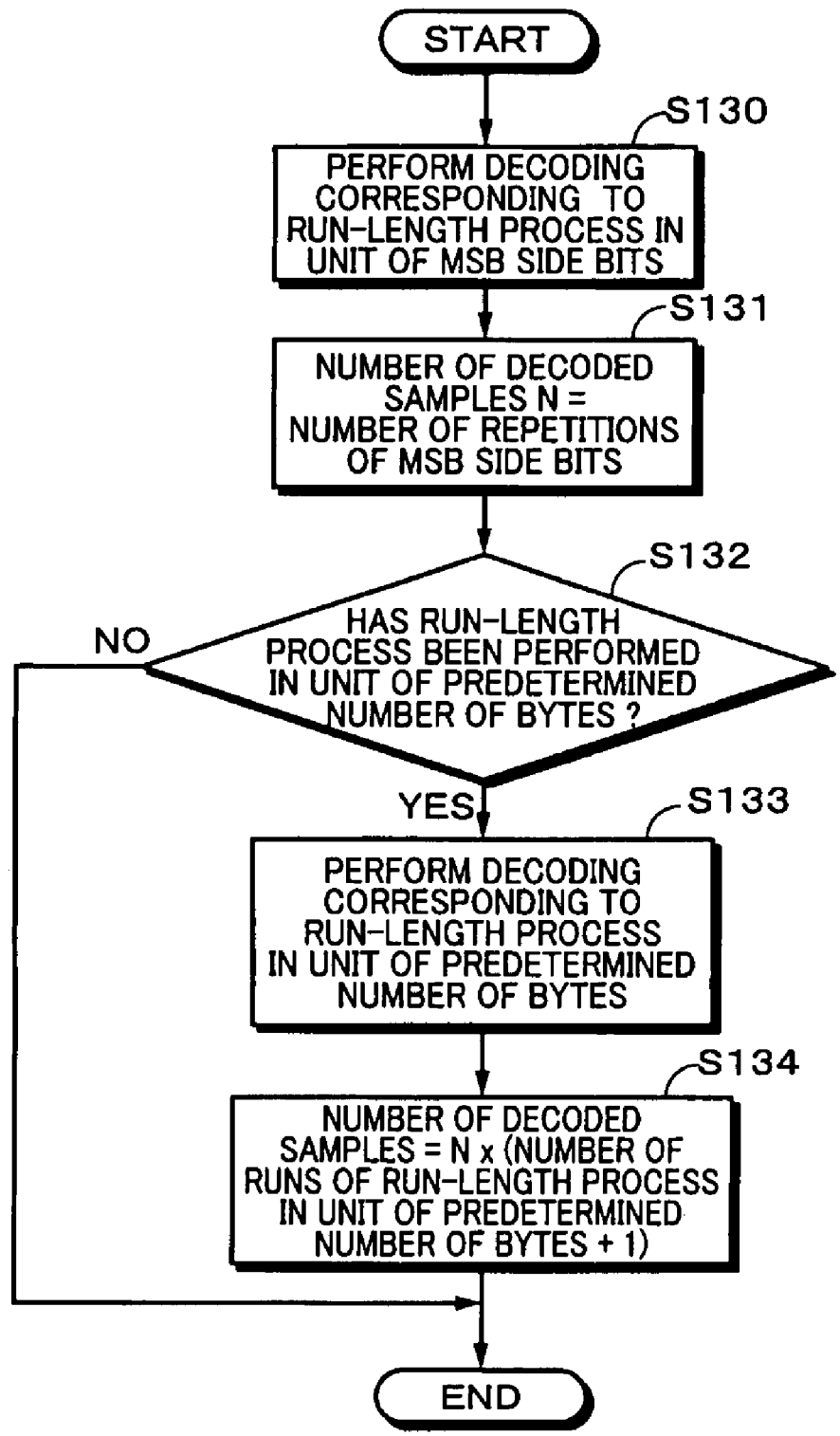
FIG. 23 is a flow chart showing an example of the decoding process of the decoding apparatus according to the first embodiment of the present invention.

FIG. 23 is a flow chart conceptually showing an example of a process of obtaining the number of decoded samples at step S87 and step S89. In other words, as shown in the flow chart of FIG. 23, data for which the run-length process has been performed in the unit of MSB side bits are decoded (at step S130) and the number of repetitions of MSB side bits is obtained on the basis of the number of quantizer bits of pixel data. The number of repetitions of MSB side bits is the number of decoded samples N (at step S131).

When the number of quantizer bits of pixel data is 10 bits and the run-length process is performed in the unit of one byte, if the run-length process is performed on the unit of MSB side bits, the number of decoded samples N as decoded data for the run-length process in the unit of MSB side bits becomes four.

When the run-length process has not been performed in the unit of a predetermined number of bytes (at step S132), the number of decoded samples N is output. In contrast, when the run-length process has been performed in the unit of a predetermined number of bytes, encoded data for the run-length process in the unit of a predetermined number of bytes are decoded on the basis of the number of runs (at step S133). At this point, the number of decoded samples is obtained by the following formula (1) based on the number of runs and the number of decoded samples N.

Number of decoded samples=$N\times$(number of runs of run-length process in unit of predetermined number of bytes+1)　　　(1)

FIG. 24 is a flow chart showing in detail an example of the decoding process for LSB side encoded data at step S64 of the flow chart shown in FIG. 21. First of all, the Huffman decoding section 35 sends a data read request to the memory control section 31 to read LSB side encoded data on the basis of the number of decoded samples supplied from the second stage decoding section 33. Corresponding to this data read request, the LSB side encoded data are read from the input memory 30 and supplied to the Huffman decoding section 35.

At this point, LSB side encoded data corresponding to MSB side bits for which the decoding process for MSB side encoded data described with reference to FIG. 21 and FIG. 22 has been completed are read from the input memory 30. More specifically, as described with reference to FIG. 12, in the encoding apparatus 1A according to the first embodiment, MSB side encoded data are placed at the beginning of the output data. The MSB side encoded data are followed by the corresponding LSB side encoded data. The LSB side encoded data are followed by the next MSB side encoded data. The MSB side encoded data are followed by the corresponding LSB side encoded data. Thus, corresponding to the data read request from the Huffman decoding section 35, the memory control section 31 starts reading data from LSB side encoded data preceded by MSB side encoded data that have been immediately previously read.

The Huffman decoding section 35 references a predetermined Huffman table and decodes Huffman code of the supplied LSB side encoded data. The Huffman decoding section 35 outputs the decoded data in the unit of a predetermined number of bytes and supplies the decoded data to the DPCM decoding section 36.

For example, the memory control section 31 reads data from the input memory 30 in the unit of one bit to a predetermined number of bits and supplies the data to the Huffman decoding section 35. The Huffman decoding section 35 decodes the data by successively comparing the supplied data with the Huffman table. When the data length of the bit sequence that has been decoded becomes a predetermined number of bytes, Huffman code of the LSB side encoded data has been decoded for one pixel. The decoded data are output.

When the DPCM decoding section 36 has determined that supplied data of a predetermined number of bytes be data at the beginning of the frame (at step S71), the DPCM decoding section 36 outputs the data as baseband LSB side bits of which LSB side encoded data have been decoded (at step S73) and stores them to a memory (not shown). When the DPCM decoding section 36 has determined that supplied data of a predetermined number of bytes be not data at the beginning of the frame, the DPCM decoding section 36 decodes the DPCM encoded data (at step S72). For example, the supplied data are stored in the memory and the data are added to data of a predetermined number of bytes that have been immediately previously stored in the memory. The added result is output as baseband LSB side bits of which LSB side encoded data have been decoded.

1-2-1-3. Specific Example of Decoding Process

Next, with reference to the flow charts shown in FIG. 21 to FIG. 24 and with reference to FIG. 25A to FIG. 25D and FIG. 30A to FIG. 30C, a specific example of the decoding process according to the first embodiment of the present invention will be described. In this example, it is assumed that the number of quantizer bits of pixel data is 10 bits, a predetermined number of bytes is one byte, and data have been encoded in the unit of one byte.

First of all, the decoding process for MSB side encoded data of bit sequence "11000011", as exemplified in FIG. 25A will be described. In the bit sequence shown in FIG. 25A, the run-length process has been performed in the unit of MSB side bits and the run-length process has been performed in the unit of predetermined number of bytes.

First of all, at step S80 of the flow chart shown in FIG. 22, one bit is read from the beginning of the bit sequence and thereby the second flag is obtained. In the example shown in FIG. 25A, the value of the second flag is "1", which denotes that the run-length process has been performed in the unit of a predetermined number of bytes, namely one byte (decoding procedure (1) shown in FIG. 25B). Thereafter, at step S81, the next one bit is read and thereby the first flag is obtained. In the example shown in FIG. 25A, the value of the first flag is "1", which denotes that the run-length process has been performed in the unit of MSB side bits (decoding procedure (2) shown in FIG. 25B).

Since the value of the first flag is "1", the determined result at step S82 denotes that the run-length process has been performed in the unit of MSB side bits. At step S83, a bit sequence of two bits, which represents the level of run-length, preceded by the first flag is repeatedly read for the length of which the bit sequences of the level of the run-length becomes one byte. In the example shown in FIG. 25A, since the bit sequence that represents the level of the run-length is "00", bit sequence "00" is repeated four times. As a result, bit sequence "00000000" is output (decoding procedure (3) shown in FIG. 25B).

Since the value of the second flag is "1", the determined result at step S84 shown in FIG. 22 denotes that the run-length process has been performed in the unit of a predetermined number of bytes. At step S85, a bit sequence of four bits that represents the number of runs of the run-length is read after the bit sequence of two bits, which represents the level of the run-length. In the example shown in FIG. 25A, since the bit sequence that represents the number of runs is "0011", the number of runs is "3". Thus, bit sequence "00000000", which has been immediately previously output, is repeatedly output three times (decoding procedure (4) shown in FIG. 25B).

After decoding procedure (1) to decoding procedure (4) have been completed, the process in the unit of the data structure of output data on the MSB side shown in FIG. 5 has been completed. At this point, since the number of decoded samples is obtained (at step S87 shown in FIG. 22), the LSB side encoded data are decoded based on the number of decoded samples.

When the LSB side encoded data have been decoded and baseband LSB side bits have stored in the LSB side output memory 37, the data combining section 38 performs the combining process for MSB side bits and LSB side bits. The combining process is performed whenever LSB side bits for one pixel have been decoded as described with reference to the flow chart shown in FIG. 21.

Next, with reference to FIG. 26A, FIG. 26B, and FIG. 26C, the combining process for MSB side bits and LSB side bits will be described. FIG. 26A shows an example of encoded data supplied to the decoding apparatus 2A. MSB side encoded data (1) placed at the beginning of the encoded data correspond to MSB side encoded data shown in FIG. 25A.

In the process described with reference to FIG. 25A and FIG. 25B, since the run-length process has been performed in the unit of MSB side bits, bit sequence "00" of MSB side bits of MSB side encoded data is repeated four times. In addition, since the run-length process has been performed in the unit of a predetermined number of bytes, bit sequence "00000000" is repeated three times. As a result, bit sequence "000000000000000000000000" is obtained (see the left-side sequence shown in FIG. 26B). This bit sequence is stored in the MSB side output memory 34. As was described with reference to the flow chart shown in FIG. 23, the number of decoded samples becomes (number of decoded samples in unit of MSB side bits, N)×(number of runs of run-length process in unit of predetermined number of bytes+1)=4×(3+1)=16.

On the other hand, LSB side encoded data are stored in the LSB side output memory 37 whenever LSB side bits for example for one pixel have been decoded (see the right-side sequence shown in FIG. 26B).

The data combining section 38 connects a predetermined number, namely two bits, of MSB side bits of a bit sequence stored in the MSB side output memory 34 and corresponding LSB side bits for one pixel, namely eight bits, for the number of decoded samples stored in the LSB side output memory 37, combines MSB side bits and LSB side bits, and obtains pixel data for the number of decoded samples (see FIG. 26C).

In other words, in the example shown in FIG. 26A, bit sequences of two bits are successively taken from the beginning of bit sequence "000000000000000000000000" of decoded MSB side bits shown as the left-side sequence shown in FIG. 26B. 16 two-bit sequences "00", "00", . . . , "00" are connected to LSB side bits of corresponding pixels. As a result, original pixel data whose number of quantizer bits is 10 bits are obtained. In the example shown in FIG. 26A, FIG. 26B, and FIG. 26C, pixels data of 16 samples, namely 16 pixels, are obtained.

The combining process of the data combining section 38 may be performed after LSB side bits for the number of decoded samples have been stored in the LSB side output memory 37.

Next, the decoding process for MSB side encoded data of bit sequence "0110", as exemplified in FIG. 27A will be described. In the bit sequence shown in FIG. 27A, although the run-length process has been performed in the unit of MSB side bits, the run-length process has not been performed in the unit of a predetermined number of bytes.

At step S80 in the flow chart of FIG. 22, one bit is read from the beginning of the bit sequence and thereby the second flag is obtained. In the example shown in FIG. 27A, since the value of the second flag is "0", it denotes that the run-length process has not been performed in the unit of a predetermined number of bytes (decoding procedure (1) shown in FIG. 27B). At step S81, the next one bit is read and thereby the first flag is obtained. In the example shown in FIG. 27A, since the value of the first flag is "1", it denotes that the run-length process has been performed in the unit of MSB side bits (decoding procedure (2) shown in FIG. 27B).

Since the value of the first flag is "1", the determined result at step S82 shown in FIG. 22 denotes that the run-length process has been performed in the unit of MSB side bits. At the next step, S83, a bit sequence of two bits, which represents the level of the run-length, preceded by the first flag is read. The bit sequence is repeatedly read until the length of the bit sequences representing the level of the run-length becomes one byte. In the example shown in FIG. 27A, since the bit sequence that represents the level of the run-length is "10", bit sequence "10" is repeated four times. As a result, bit sequence "10101010" is output (decoding procedure (3) shown in FIG. 27B).

Since the value of the second flag is "0", the determined result at step S84 denotes that the run-length process has not been performed in the unit of a predetermined number of bytes. Thereafter, the flow advances to step S89. In the bit sequence shown in FIG. 27A, after decoding procedure (1) to decoding procedure (3) have been completed, the process in the unit of the data structure of output data on the MSB side has been completed. At this point, since the number of decoded samples is obtained, the LSB side encoded data are decoded on the basis of the number of decoded samples.

When baseband LSB side bits of which the LSB side encoded data have been decoded are stored in the LSB side output memory 37, the data combining section 38 performs the combining process for MSB side bits and LSB side bits for each of LSB side bits of one pixel.

The combining process for MSB side bits and LSB side bits is performed nearly in the same manner as the process described with reference to FIG. 26. In other words, in the process described with reference to FIG. 27B, from MSB side encoded data (2) shown in FIG. FIG. 28A, bit sequence "10" of MSB side bits is repeated four times since the run-length process has been performed in the unit of MSB side bits. As a result, bit sequence "10101010", is obtained (see the left-side sequence shown in FIG. 28B). This bit sequence is stored in the MSB side output memory 34. The number of decoded samples is obtained as (number of decoded samples in unit of MSB side bits, N)×(number of runs of run-length process in unit of predetermined number of bytes+1)=4×(0+1)=4.

On the other hand, LSB side encoded data are stored in the LSB side output memory 37 whenever LSB side bits for example for one pixel have been decoded (see the right-side sequence shown in FIG. 28B).

The data combining section 38 connects a predetermined number, namely two bits, of MSB side bits of a bit sequence stored in the MSB side output memory 34 and corresponding LSB side bits for one pixel, namely eight bits, for the number of decoded samples stored in the LSB side output memory 37, combines MSB side bits and LSB side bits, and obtains pixel data for the number of decoded samples (see FIG. 28C).

In other words, in the example shown in FIG. 28A, FIG. 28B, and FIG. 28C, bit sequences of two bits are successively taken from the beginning of bit sequence "10101010" of MSB side bits. The taken four two-bit sequences "10", "10", "10" and "10" are connected to LSB side bits of corresponding pixels. As a result, the original pixel data whose number of quantizer bits is 10 bits are obtained. In the example shown in FIG. 28A, FIG. 28B, and FIG. 28C, pixel data for four samples, namely four pixels, are obtained.

Next, the decoding process for MSB side encoded data of bit sequence "0011010101" as exemplified in FIG. 29A will be described. In the bit sequence shown in FIG. 29A, the run-length process has not been performed in the unit of MSB side bits and the run-length process has not been performed in the unit of a predetermined number of bytes.

At step S80 shown in FIG. 22, one bit is read from the beginning of the bit sequence and thereby the second flag is obtained. Since the value of the second flag is "0", it denotes that the run-length process has not been performed in the unit of a predetermined number of bytes (decoding procedure (1) shown in FIG. 29B). At step S81, the next one bit is read and thereby the first flag is obtained. Since the value of the first flag is "0", it denotes that the run-length process has not been performed in the unit of MSB side bits.

Since the value of the second flag is "0", the determined result at step S82 denotes that the run-length process has not been performed in the unit of MSB side bits. Thereafter, the flow advances to step S88. At step S88, bit sequence "11010101" preceded by the first flag is output for a predetermined number of bytes, namely one byte (decoding procedure (3) shown in FIG. 29B).

After decoding procedure (1) to decoding procedure (3) have been completed, the process in the unit of the data structure of output data on the MSB side shown in FIG. 5 has been completed. At this point, since the number of decoded samples is obtained, the LSB side encoded data are decoded based on the number of decoded samples.

The combining process of the data combining section 38 for decoded MSB side bits and LSB side bits is nearly the same as that described with reference to FIG. 26A to FIG. 26C and FIG. 28A to FIG. 28C. In other words, as exemplified in FIG. 30A, bit sequence "11010101" of a predetermined number of bytes, namely one bytes, preceded by the first flag is obtained from MSB side encoded data (3) shown in FIG. 30A by the process described with reference to FIG. 29B (see the left-side sequence shown in FIG. 30B). The bit sequence is stored in the MSB side output memory 34.

In this example, since the run-length process has not been performed in the unit of a predetermined number of bytes, the determined result at step S132 of the flow chart shown in FIG. 23 denotes that "4" as the number of repetitions for the MSB side bits is the number of decoded samples N.

On the other hand, the LSB side encoded data are stored in the LSB side output memory 37 whenever LSB side bits for example for one pixel have been decoded (see the right-side sequence shown in FIG. 30B)

The data combining section 38 connects a predetermined number, namely two bits, of MSB side bits of a bit sequence stored in the MSB side output memory 34 and corresponding LSB side bits for one pixel, namely eight bits, for the number of decoded samples stored in the LSB side output memory 37, combines, MSB side bits and LSB side bits, and obtains pixel data for the number of decoded samples (see FIG. 30C).

In other words, in this example shown in FIG. 30A, bit sequences of two bits are successively taken from the beginning of bit sequence "11010101" of MSB side bits. The taken bit sequences of two bits "11", "01", "01", and "01" are connected to LSB side bits of corresponding pixels. As a result, pixel data whose number of quantizer bits is 10 bits are obtained. In the example shown in FIG. 30A, FIG. 30B, and FIG. 30C, pixel data of four samples, namely four pixels, are obtained.

Figure 31:
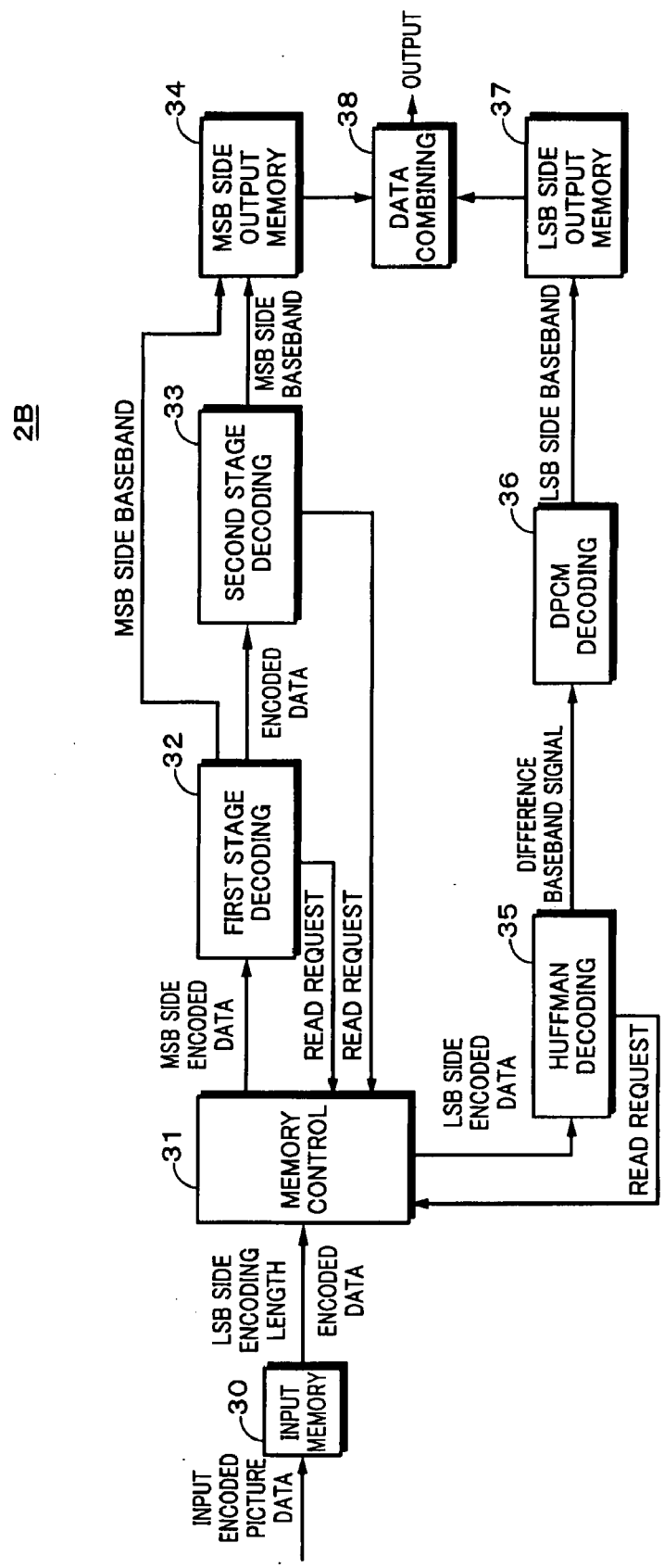
FIG. 31 is a functional block diagram showing an example of a function of a decoding apparatus that performs a decoding process according to the first modification of the first embodiment of the present invention.

1-2-2. Decoding Process According to First Modification of First Embodiment 1-2-2-1. Decoding Apparatus Next, an example of a decoding process according to a first modification of the first embodiment of the present invention corresponding to the encoding process of which one output system is separated into encoded LSB side bits and encoded MSB side bits will be described. FIG. 31 is a functional block diagram showing an example of a function of a decoding apparatus 2B that performs a decoding process according to the first modification of the first embodiment. In FIG. 31, similar sections to those in FIG. 20 will be denoted by similar reference numerals and their detail description will be omitted. In addition, it is assumed that the original number of quantizer bits of pixel data that have been encoded by the encoding apparatus 1B has been set to the decoding apparatus 2B. In the following description, a predetermined number of bytes is one byte.

Encoded data having the output format as exemplified in FIG. 14 are stored in an input memory 30. A memory control section 31 reads encoded data length information at the beginning of the encoded data from the input memory 30. The memory control section 31 reads encoded data from the input memory 30 on the basis of the encoded data length information.

In other words, when a Huffman decoding section 35 sends a data read request to the memory control section 31 to read data, the memory control section 31 is controlled to read a bit sequence immediately after the encoded data length information with reference to FIG. 14. When a first stage decoding section 32 or a second stage decoding section 33 sends a data read request to the memory control section 31 to read data, the memory control section 31 is controlled to read a bit sequence on the basis of the position represented by the encoded data length information.

In the decoding process for LSB side encoded data, corresponding to the data read request received from the Huffman decoding section 35, the memory control section 31 reads data immediately after the encoded data length information to the position represented by the encoded data length information in the unit of one bit to a predetermined number of bits and supplies the data to the Huffman decoding section 35. The Huffman decoding section 35 successively compares the supplied data with the Huffman table and decodes Huffman code of the data. When the data length of the decoded bit sequence becomes eight bits, the bit sequence is supplied to a DPCM decoding section 36. The DPCM decoding section 36 decodes DPCM code of the data by adding the supplied eight-bit data and eight-bit data that have been immediately previously processed and outputs baseband LSB side bits. The baseband LSB side bits are stored in an LSB side output memory 37.

In the decoding process for MSB side encoded data, the first stage decoding section 32 and the second stage decoding section 33 send a data read request to the memory control section 31 to read data. Corresponding to the data read request, the memory control section 31 reads data from the input memory 30 on the basis of the position represented by the encoded data length information and supplies the data to the first stage decoding section 32 or the second stage decoding section 33. The first stage decoding section 32 performs a decoding process corresponding to the run-length process in the unit of MSB side bits on the basis of the first flag contained in the supplied data. The second stage decoding section 33 performs a decoding process corresponding to the run-length process in the unit of predetermined number of bytes on the basis of the first flag contained in the supplied data and outputs baseband MSB side bits. The baseband MSB side bits are stored in the MSB side output memory 34.

The data combining section 38 reads baseband MSB side bits and baseband LSB side bits from the MSB side output memory 34 and the LSB side output memory 37, respectively, and combines data so that pixel data of one pixel are formed. The pixel data for one pixel of which MSB side bits and LSB side bits have been combined are output.

1-2-2-2. Decoding Process

Figure 32:
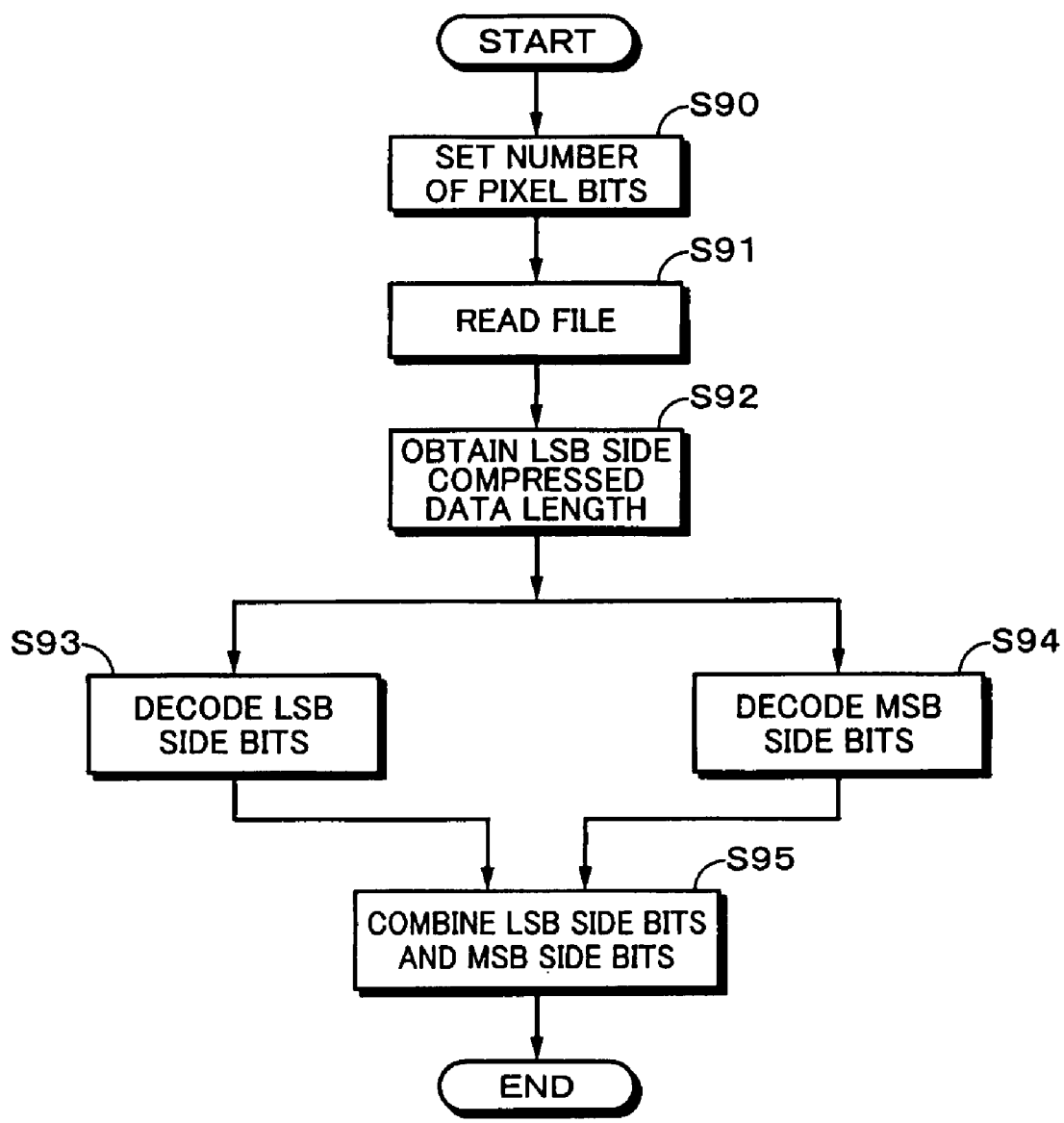
FIG. 32 is a flow chart showing an example of the decoding process of the decoding apparatus according to the first modification of the first embodiment of the present invention.
Figure 33:
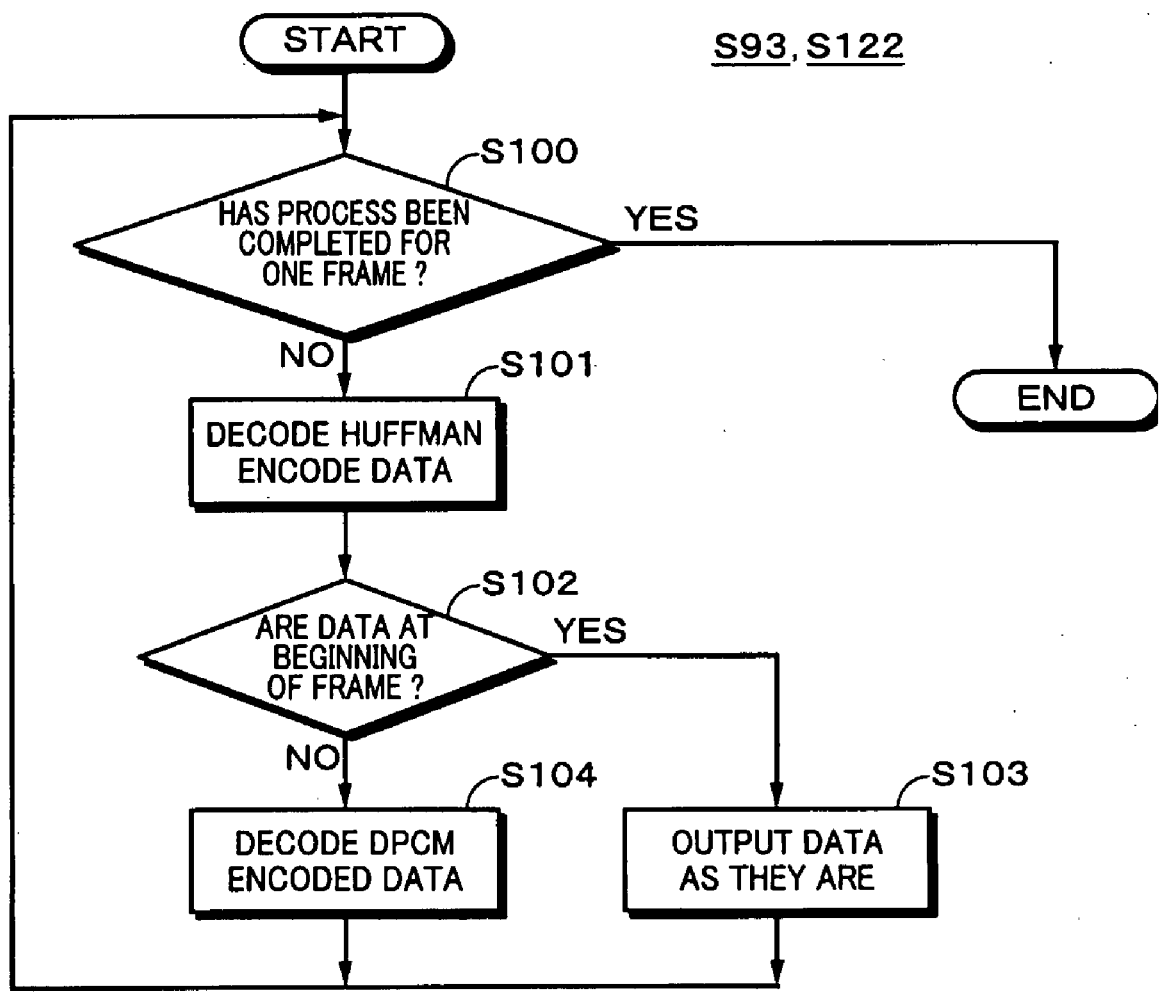
FIG. 33 is a flow chart showing an example of the decoding process of the decoding apparatus according to the first modification of the first embodiment of the present invention.
Figure 34:
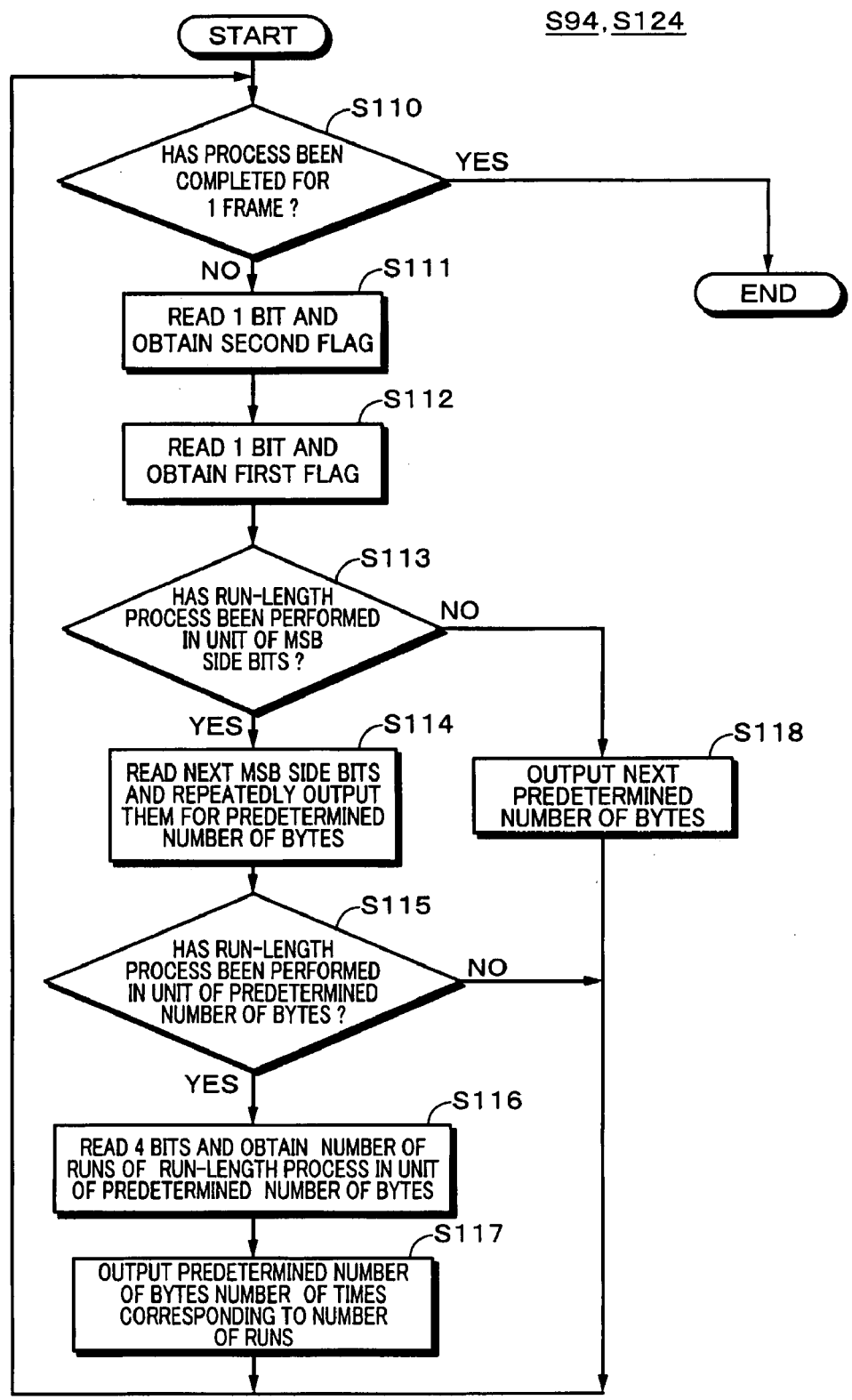
FIG. 34 is a flow chart showing an example of the decoding process of the decoding apparatus according to the first modification of the first embodiment of the present invention.

FIG. 32 to FIG. 34 are flow charts showing an example of the decoding process of the decoding apparatus 2B according to the first modification of the first embodiment. Each step of the flow charts shown in FIG. 32 to FIG. 34 can be controlled by the CPU (not shown) according to a predetermined program. Instead, each section that composes the decoding apparatus 2B exemplified in FIG. 31 may be interlocked to execute each step.

FIG. 32 is a flow chart showing an overall flow of a decoding method according to the first modification of the first embodiment. In this example, it is assumed that the encoding apparatus 1B has encoded pixel data for one frame and the encoding apparatus 1B performs a decoding process for encoded data for one frame.

First of all, at step S90, the number of bits of pixel data of baseband picture data that the encoding apparatus 1B encodes is set. At the next step, S91, a file of encoded data that have been encoded by the encoding apparatus 1B is read. The encoded data read from the file is stored in the input memory 30. The encoded data may be supplied for example as stream data and stored in the input memory 30, not supplied with a file.

At the next step, S92, the memory control section 31 obtains LSB side encoded data length information. For example, the memory control section 31 reads a predetermined number of bytes at the beginning of data from the input memory 30 and obtains the LSB side encoded data length information. At step 93 and step S94, the LSB side encoded data and MSB side encoded data are decoded.

In other words, at step S93, the Huffman decoding section 35 sends a data read request to the memory control section 31 to read data. Corresponding to this request, the memory control section 31 reads the encoded data immediately after the encoded data length information to the position represented by the encoded data length information from the input memory 30. The read data are decoded by the Huffman decoding section 35 and the DPCM decoding section 36 and stored as baseband LSB side bits in the LSB side output memory 37.

At step S94, the first stage decoding section 32 and the second stage decoding section 33 send a data read request to the memory control section 31 to read data. Corresponding to the data read request, the memory control section 31 reads the encoded data stored in the input memory 30, starting from the poison represented by the encoded data length information. The first stage decoding section 32 and the second stage decoding section 33 decode the MSB side encoded data based on the read data. The decoded baseband MSB side bits are stored in the MSB side output memory 34.

After decoding processes for LSB side encoded data and MSB side encoded data for one frame have been completed at step S93 and step S94, respectively, the flow advances to step S95. At step S95, the data combining section 38 combines the baseband LSB side bits decoded at step S93 and baseband MSB side bits decoded at step S94 and restores pixel data for one frame.

FIG. 33 is a flow chart showing in detail an example of the decoding process for LSB side encoded data at step S93 of the flow chart shown in FIG. 32. The process of the flow chart shown in FIG. 33 is repeated until the decoding process for LSB side encoded data has been completed for LSB side encoded data of pixels of one frame (at step S100).

At step S101, the Huffman decoding section 35 sends a data read request to the memory control section 31 to LSB side encoded data from the input memory 30. Corresponding to this data read request, the memory control section 31 reads data immediately after the encoded data length information at the beginning of the encoded data stored in the input memory 30 to the position represented by the encoded data length information in the unit of one bit to a predetermined number of bits and supplies the data to the Huffman decoding section 35. The Huffman decoding section 35 successively compares the supplied data with the Huffman table and decodes the data. When the data length of the decoded bit sequence becomes the predetermined number of bytes, the Huffman code decoding process for the LSB side encoded data of one pixel is completed. As a result, the data are output.

When the DPCM decoding section 36 has determined that the supplied data of a predetermined number of bytes be data at the beginning of the frame (at step S102), the DPCM decoding section 36 outputs the data as baseband LSB side bits of which the LSB side encoded data have been decoded (at step S103) and stores the data in a memory (not shown). In contrast, when the DPCM decoding section 36 has determined at step S102 that the supplied data for a predetermined number of bytes be not data at the beginning of the frame, the DPCM decoding section 36 decodes the data as DPCM encoded data (at step S104). For example, the DPCM decoding section 36 stores the supplied data in the memory and adds the data and the data of a predetermined number of bytes that has been immediately previously processed and stored in the memory. The added result is output as baseband LSB side bits of which the LSB side encoded data have been decoded.

Thereafter, the flow returns from step S103 or step S104 to step S100. The process is repeated until the decoding process has been completed for data of one frame.

FIG. 34 is a flow chart showing in detail an example of the decoding process for MSB side encoded data at step S94 in the flow chart shown in FIG. 32. The process shown in the flow chart of FIG. 34 is repeated until the decoding process for MSB side encoded data has been completed for pixels of one frame (at step S110).

At step Sill of the first cycle of the process, one bit is read from the position represented by the-encoded data length information in the encoded data stored in the input memory 30 and the second flag is obtained by the second stage decoding section 33. At step S112, the next one bit is read and the first flag is obtained by the first stage decoding section 32.

At step Sill in other than the first cycle, the next bit preceded by one bit that has been immediately previously read is read.

At the next step, S113, the first stage decoding section 32 determines whether or not the run-length process has been performed in the unit of MSB side bits based on the value of the obtained first flag. When the value of the first flag is "1", the determined result denotes that the run-length process has been performed in the unit of MSB side bits. In this case, the flow advances to step S114. At step S114, the first stage decoding section 32 reads two bits preceded by the first flag, namely the level of the run-length. The value of two bits is repeatedly output for a predetermined number of bytes.

In contrast, when the value of the first flag is "0", the determined result denotes that the run-length process has not been performed in the unit of MSB side bits. In this case, the flow advances to step S118. At step S118, a predetermined number of bytes, namely one byte (=eight bits), preceded by the first flag is read and output. Thereafter, the flow returns to step S110.

At the next step, S115, the second stage decoding section 33 determines whether or not the run-length process has been performed in the unit of a predetermined number of bytes on the basis of the value of the obtained second flag. When the value of the second flag is "1", the determined result denotes that the run-length process has been performed in the unit of a predetermined number of bytes. In this case, the flow advances to step S116. At step S116, four bits preceded by the first flag are read and the number of runs of the run-length process in the unit of a predetermined number of bytes is obtained.

In contrast, when the determined result at step S115 denotes that the run-length process has not been performed in the unit of a predetermined number of bytes, the flow returns to step S110.

At the next step, S117, the second stage decoding section 33 repeatedly outputs data of the predetermined number of bytes that are output from the first stage decoding section 32 at step S114 the number of times corresponding to the number of runs obtained at step S116.

1-2-2-3. Specific Example of Decoding Process

With reference to the flow charts shown in FIG. 32 to 34 and with reference to FIG. 35A and FIG. 35B and FIG. 36A, FIG. 36B, and FIG. 36C, a specific example of the decoding process according to the first modification of the first embodiment will be described. In this example, it is assumed that the number of quantizer bits of pixel data is 10 bits, a predetermined number of bytes is one byte, and data have been encoded in the unit of one byte.

The decoding process for MSB side encoded data of bit sequence "1100001101100011010101 . . . " exemplified in FIG. 35A will be described.

First of all, at step S111 of the flow chart shown in FIG. 34, one bit is read from the beginning of the bit sequence and thereby the second flag is obtained. Since the value of the second flag is "1", it denotes that the run-length process has been performed in the unit of a predetermined number of bytes (decoding procedure (1) shown in FIG. 35B). At the next step, S112, the next one bit is read and thereby the first flag is obtained. Since the value of the first flag is "1", it denotes that the run-length process has been performed in the unit of MSB side bits (decoding procedure (2) shown in FIG. 35B).

Since the value of the first flag is "1", the determined result at step S113 denotes that the run-length process has been performed in the unit of MSB side bits on the basis of the value of the first flag. Thereafter, a bit sequence of two bits, which represents the level of the run-length, preceded by the first flag is read and bit sequence "00" of two bits is repeated four times (at step S114). As a result, data sequence "00000000" of a predetermined number of bytes (one byte) is output (decoding procedure (3) shown in FIG. 35B).

The determined result at step S115 denotes that the run-length process has been performed in the unit of a predetermined number of bytes on the basis of the value of the second flag. At step S116, bit sequence "0011" of four bits, which represents the number of runs of the run-length, preceded by the bit sequence of two bits, which represents the level of the run-length, is read. The bit sequence denotes that the number of runs is "3". Thus, bit sequence "00000000", which has been immediately previously output, is repeated three times and output (decoding procedure (4) shown in FIG. 35B).

Thereafter, the flow returns to step S110. Since the process has not been completed for one frame, the flow advances to step S111. A step S111, the next one bit of bit sequence "0011" of four bits, which represents the number of runs of the run-length, is read and thereby the second flag is obtained. In the example shown in FIG. 35A, since the value of the second flag is "0", it denotes that the run-length process has not be performed in the unit of a predetermined number of bytes (decoding procedure (5) shown in FIG. 35B). At the next step, S112, the next one bit is read and thereby the first flag is obtained. Since the value of the first flag is "1", it denotes that the run-length process has been performed in the unit of MSB side bits (decoding procedure (6) shown in FIG. 35B).

The determined result at step S113 denotes that the run-length process has been performed in the unit of MSB side bits on the basis of the value of the first flag. Thus, a bit sequence of two bits, which represents the level of the run-length, preceded by the first flag is read and bit sequence "10" of two bits is repeated four times (at step S114) and data sequence "10101010" of a predetermined number of bytes (one byte) is output (decoding procedure (7) shown in FIG. 35B).

Since the value of the second flag is "0", the determined result at step S115 denotes that the run-length process has been performed in the unit of a predetermined number of bytes. In this case, the flow returns to step S110.

Since the process has not been completed for one frame, the flow advances from step S110 to step S111. At step S111, the next one bit of bit sequence "10" of two bits, which represents the level of the run-length, is read and thereby the second flag is obtained. In the example shown in FIG. 35A, since the value of the obtained second flag is "0", it denotes that the run-length process has not been performed in the unit of a predetermined number of bytes (decoding procedure (8) shown in FIG. 35B). At the next step, S112, the next one bit is read and thereby the first flag is obtained. Since the value of the first flag is "0", it denotes that the run-length process has not been performed in the unit of MSB side bits (decoding procedure (9) shown in FIG. 35B).

The determined result at step S113 denotes that the run-length process has not been performed in the unit of MSB side bits on the basis of the value of the first flag. In this case, the flow advances to step S118. At step S118, a predetermined number of bytes, namely one byte, preceded by the first flag that has been immediately previously read is read and bit sequence "11010101" of one byte is output.

The process is repeated for pixels of one frame, for example until the last bit of the encoded data that have been read for example from a file and stored in the input memory 30 has been read.

Next, with reference to FIG. 36A, FIG. 36B, and FIG. 36C, a combining process for MSB side bits and LSB side bits performed by the data combining section 38 will be described. FIG. 36A shows baseband LSB side bits stored in the LSB side output memory 37. LSB side bits of pixels each of which is composed of a predetermined number of bytes, namely one byte (=eight bits), are successively arranged corresponding to pixels arranged for example horizontally and rightwardly in each line on the screen starting from the upper left corner. FIG. 36B shows baseband MSB side bits stored in the MSB side output memory 34. For example, MSB side bits of two bits per pixel are arranged in the same order as LSB side bits.

When baseband LSB side bits and baseband MSB side bits for one frame have been stored in the LSB side output memory 37 and the MSB side output memory 34, the data combining section 38 reads these data from the LSB side output memory 37 and the MSB side output memory 34 and starts combining these data. For example, the data combining section 38 reads data of eight bits from the LSB side output memory 37, reads data of two bits from the MSB side output memory 34, and connects a bit sequence of the eight bits and a bit sequence of the two bits. As a result, they are decoded as pixel data whose number of quantizer bits is 10 bits.

After pixel data for one pixel have been obtained, data of eight bits are read from the LSB side output memory 37 and data of two bits are read from the MSB side output memory 34. A bit sequence of the eight bits and a bit sequence of the two bits are connected. As a result, they are decoded as the next pixel data whose number of quantizer bits is 10 bits. The data combining section 38 repeatedly reads data from the LSB side output memory 37 and the data combining section 38 and combines these data for pixels of one frame. As a result, decoded pixel data are obtained (see FIG. 36C).

The decoding apparatus 2B may perform the decoding process for LSB side encoded data and the decoding process for MSB side encoded data in parallel. Instead, the decoding process for LSB side encoded data and decoding process for MSB side encoded data may be performed such that after one decoding process has been completed, the other decoding process is performed.

In the foregoing example, the combining process for LSB side bits and MSB side bits performed by the data combining section 38 is performed after the decoding process for LSB side encoded data and the decoding process for MSB side encoded data have been completed. Instead, after baseband LSB side bits and baseband MSB side bits that can be combined are decoded in the decoding process for LSB side encoded data and the decoding process for MSB side encoded data, the data combining section 38 can perform the data combining process for LSB side bits and MSB side bits.

1-2-3. Decoding Process According to Second Modification of First Embodiment

Figure 37:
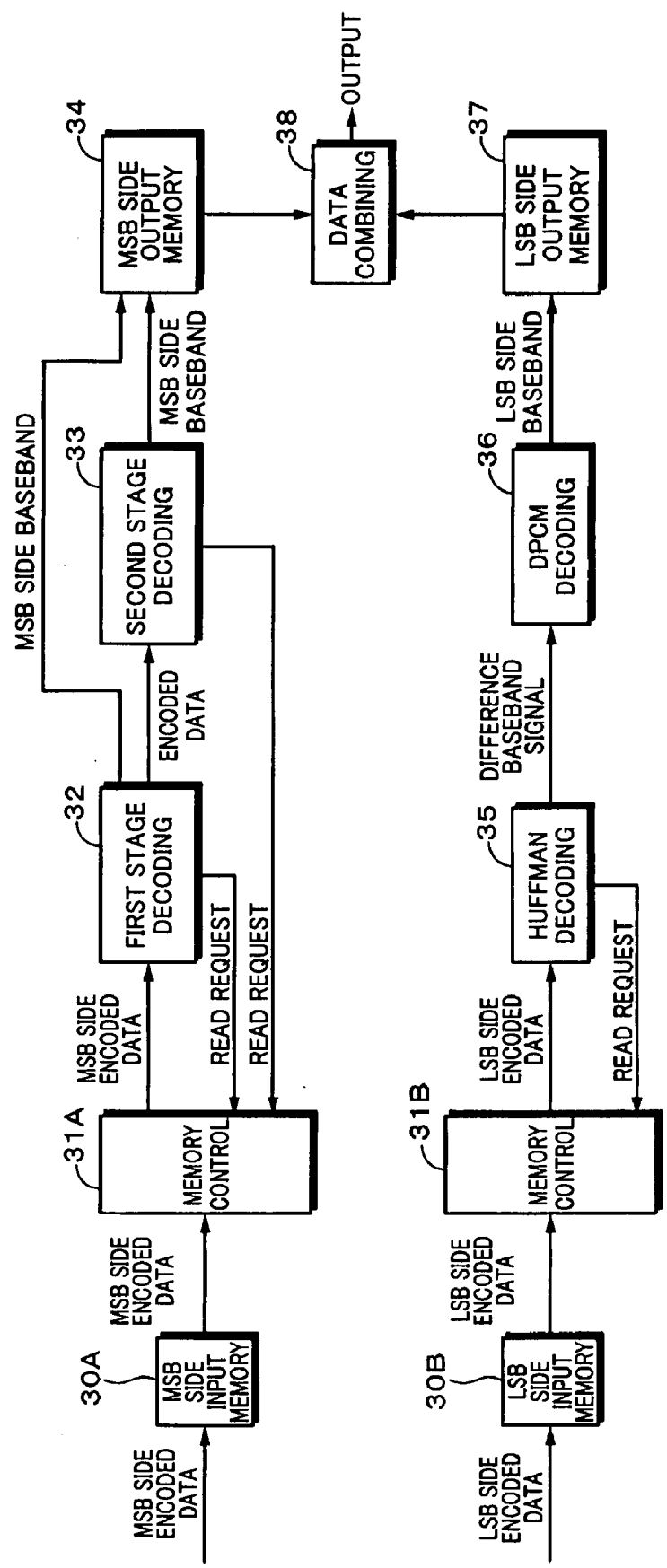
FIG. 37 is a functional block diagram showing an example of a function of an example of a decoding apparatus that performs a decoding process according to the second modification of the first embodiment of the present invention.

Next, an example of a decoding process according to a second modification of the first embodiment of the present invention corresponding to the encoding process in which encoded LSB side bits and encoded MSB side bits are independently output will be described. FIG. 37 is a functional block diagram showing an example of a function of a decoding apparatus 2C that performs a decoding process according to the second modification of the first embodiment. In FIG. 37, similar sections to those in FIG. 20 will be denoted by similar reference numerals and their description will be omitted. In addition, it is assumed that the number of quantizer bits of original pixel data that the encoding apparatus 1C encodes has been set to the decoding apparatus 2C and a predetermined number of bytes is one byte.

The decoding apparatus 2C shown in FIG. 37 has two input systems corresponding to MSB side encoded data and LSB side encoded data, two input data memories of an MSB side input memory 30A and an LSB side input memory 30B, and memory control sections 31A and 31B that control the MSB side input memory 30A and the LSB side input memory 300B.

Figure 16:
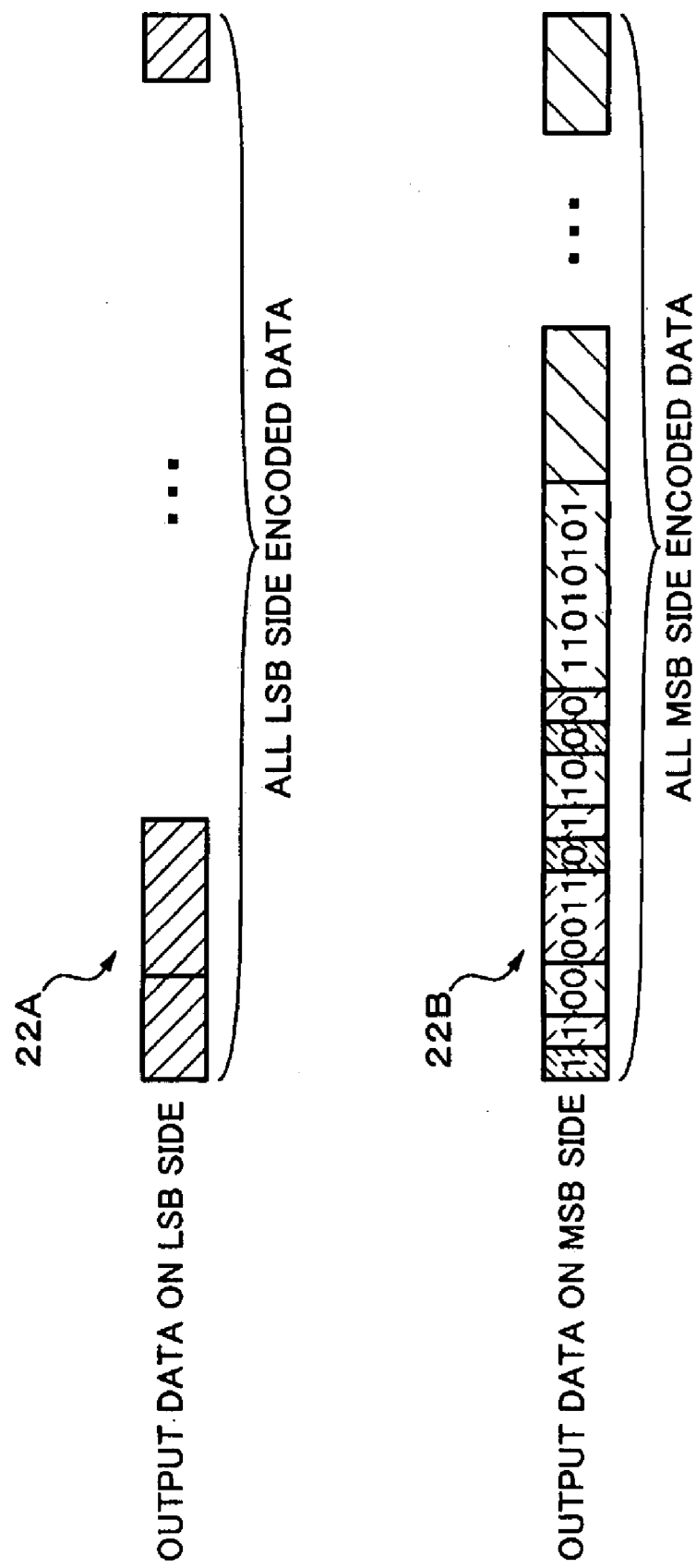
FIG. 16 is a schematic diagram showing an example of an output format of which MSB side bits and LSB side bits are encoded according to the second modification of the first embodiment of the present invention.

With reference to the output format shown in FIG. 16, output data on the MSB side 22B (MSB side encoded data) are stored in the MSB side input memory 30A. The memory control section 31A reads data from the MSB side input memory 30A in a predetermined manner corresponding to a data read request for output data on the MSB side 22B stored in the MSB side input memory 30A from a first stage decoding section 32 and a second stage decoding section 33. The read data are supplied to the first stage decoding section 32 and/or the second stage decoding section 33.

On the other hand, output data on the LSB side 22A (LSB side encoded data) are stored in the LSB side input memory 30B. The memory control section 31B reads data in a predetermined manner from the input memory 30 corresponding to a read request for LSB side bits output data 22A stored in the LSB side input memory 30B from a Huffman decoding section 35. The read data are supplied to the Huffman decoding section 35.

The other processes in the structure shown in FIG. 37, namely decoding processes for MSB side encoded data by the first stage decoding section 32 and the second stage decoding section 33, decoding processes for LSB side encoded data by the Huffman decoding section 35 and the DPCM decoding section 36, and an combining process for MSB side bits and LSB side bits by the data combining section 38 are the same as those of the first modification of the first embodiment. To prevent redundancy, their detail description will be omitted.

Figure 38:
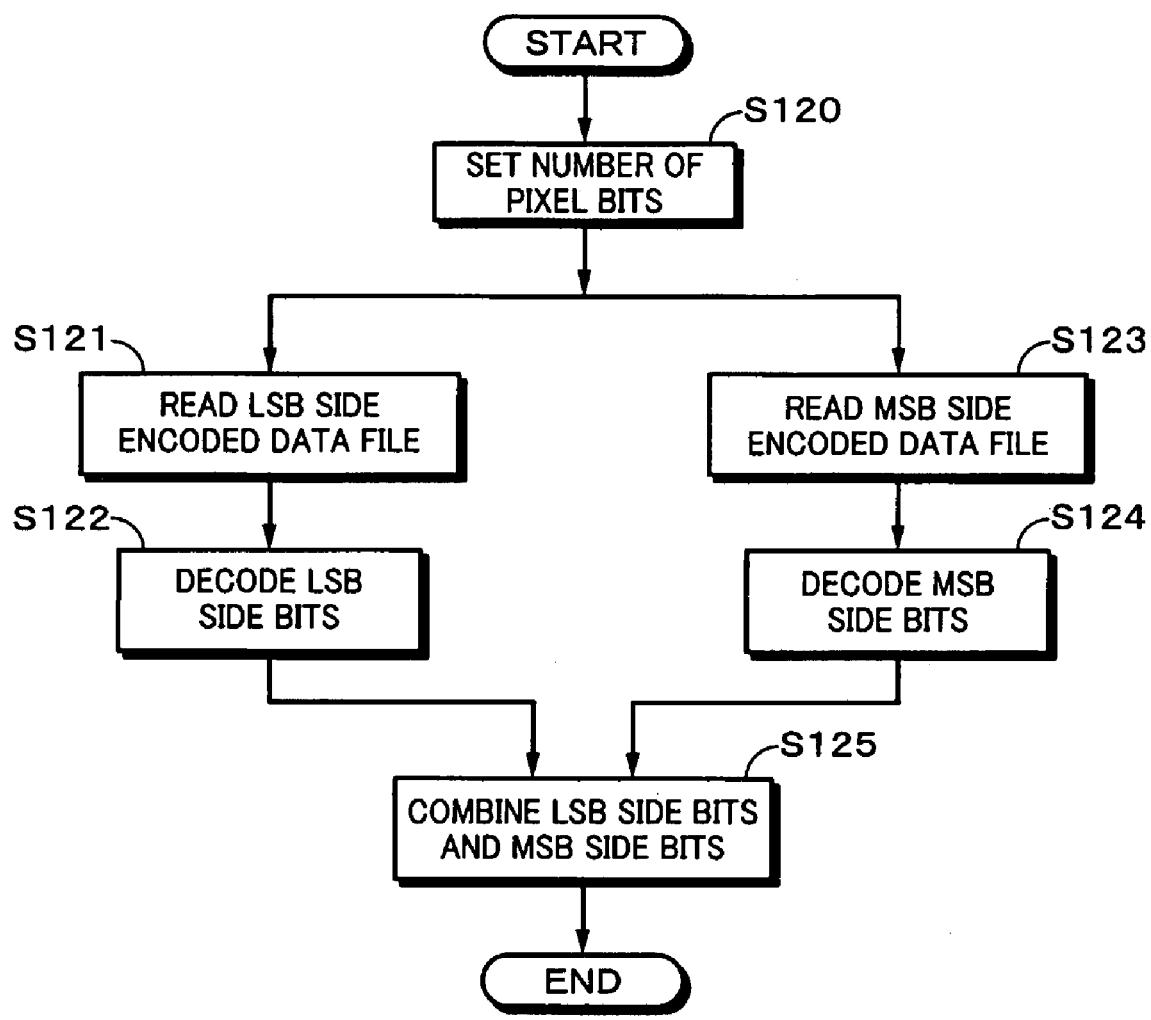
FIG. 38 is a flow chart showing an overall flow of an example of the decoding process of the decoding apparatus according to the second modification of the first embodiment of the present invention.

In a flow chart shown in FIG. 38 for an overall flow of the decoding process performed by the decoding apparatus 2C, at step S120, the number of quantizer bits for pixel data of baseband picture data that the encoding apparatus 1C encodes is set.

At step S121, a file of LSB side encoded data is read. The read LSB side encoded data are stored in the LSB side input memory 30B. At step S122, the memory control section 31B reads LSB side encoded data from the LSB side input memory 30B corresponding to a data read request from the Huffman decoding section 35. The Huffman decoding section 35 decodes the LSB side encoded data. Baseband LSB side bits of which the LSB side encoded data have been decoded are stored in the LSB side output memory 37.

On the other hand, at step S123, a file of MSB side encoded data is read. The read MSB side encoded data are stored in the MSB side input memory 30A. At step S124, the memory control section 31A reads MSB side encoded data from the MSB side input memory 30A corresponding to a data read request from the first stage decoding section 32 and/or the second stage decoding section 33. The first stage decoding section 32 and/or the second stage decoding section 33 decodes the read MSB side encoded data. Baseband MSB side bits of which MSB side encoded data have been decoded are stored in the MSB side output memory 34.

After the decoding process for LSB side encoded data and the decoding process for MSB side encoded data have been completed for one frame, the flow advances from step S122 and step S124 to step S125. At step S125, the data combining section 38 combines the baseband LSB side bits decoded at step S122 and the baseband MSB side bits that have been decoded at step S124. As a result, pixel data for one frame have been decoded.

Since the process shown in the flow chart of FIG. 33 and FIG. 34 according to the first modification of the first embodiment can be applied to the decoding process for LSB side encoded data at step S122 in the flow chart shown in FIG. 38, to prevent redundancy, the description for the process will be omitted. In addition, since the process described with reference to FIG. 36 according to the first modification of the first embodiment can be applied to the data combining process of the data combining section 38, to prevent redundancy, the description for the combining process will be omitted.

1-2-4. Decoding Process According to Third Modification of First Embodiment

Next, an example of a decoding process according to a third modification of the first embodiment of the present invention corresponding to the encoding process in which the run-length process for MSB side bits is performed in the unit of a predetermined number of bytes, which is two bytes will be described. In the third modification of the first embodiment, the decoding apparatus 2A (see FIG. 20) corresponding to the encoding apparatus 1A according to the first embodiment can be used as it is. In addition, the decoding process described with reference to the flow charts shown in FIG. 21 to FIG. 24 can be basically used as it is. Thus, to prevent redundancy, their description will be omitted.

The decoding process for LSB side encoded data according to the third modification of the first embodiment is the same as the decoding process for LSB side encoded data of which LSB side bits of a bit sequence of one byte have been encoded data. Thus, the description of the decoding process will be omitted.

FIG. 39A and FIG. 39B show an example of decoding procedures of the decoding process according to the third modification of the first embodiment. With reference to FIG. 39A and FIG. 39B and with reference to the flow charts shown in FIG. 21 to 24, the decoding process according to the third modification of the first embodiment will be described.

In this example, as the output format of encoded data, MSB side encoded data and LSB side encoded data have been interleaved as was described with reference to FIG. 12 in the first embodiment. In the following description, a predetermined number of bytes is two bytes.

Next, the decoding process for MSB side encoded data of bit sequence "11000001" exemplified in FIG. 39A will be described. In the bit sequence shown in FIG. 39, the run-length process has been performed in the unit of MSB side bits and the run-length process has been performed in the unit of a predetermined number of bytes, namely two bytes.

First of all, at step S80 in the flow chart shown in FIG. 22, one bit is read from the beginning of the bit sequence and thereby the second flag is obtained. In the example shown in FIG. 39A, since the value of the second flag is "1", it denotes that the run-length process has been performed in the unit of a predetermined number of bytes, namely two bytes (decoding procedure (1) shown in FIG. 39B). At step S81, the next one bit is read and thereby the first flag is obtained. In the example shown in FIG. 39A, since the value of the first flag is "1", it denotes that the run-length process has been performed in the unit of MSB side bits (decoding procedure (2) shown in FIG. 39B).

Since the value of the first flag is "1", the determined result at step S82 denotes that the run-length process has been performed in the unit of MSB side bits. In this case, the flow advances to step S83 shown in FIG. 22. At step S83, a bit sequence of two bits, which represents the level of the run-length, preceded by the first flag is read. The bit sequence, which represents the level of the run-length, is repeated for the length of the predetermined number of bytes. In the example shown in FIG. 39A, since the bit sequence that represents the level of the run-length is "00", bit sequence "00" is repeated eight times. As a result, bit sequence "0000000000000000" is output (decoding procedure (3) shown in FIG. 39B).

In addition, since the value of the second flag is "1", the determined result at step S84 shown in FIG. 22 denotes that the run-length process has been performed in the unit of a predetermined number of bytes. In this case, the flow advances to step S85. At step S85, a bit sequence of four bits, which represents the number of runs of the run-length, preceded by the bit sequence of two bits, which represents the level of the run-length, is read. In the example shown in FIG. 39A, since the bit sequence that represents the number of runs is "0001", the number of runs is "1". Thus, bit sequence "0000000000000", which has been immediately previously output, is repeated once and output (decoding procedure (4) shown in FIG. 39B).

After decoding procedure (1) to decoding procedure (4) have been completed, the process in the unit of the data structure of output data on the MSB side has been completed. At this point, since the number of decoded samples is obtained (at step S87 shown in FIG. 22), the LSB side encoded data are decoded on the basis of the number of decoded samples.

The number of decoded samples can be obtained according to the foregoing formula (1).

Number of decoded samples=number of repetitions of
MSB side bits (number of decoded samples)
$N \times$(number of runs of run-length process in unit
of predetermined number of bytes+1)=8×(1+1)=
16

When LSB side encoded data have been decoded and baseband LSB side bits have been stored in the LSB side output memory 37, the data combining section 38 performs the combining process for MSB side bits and LSB side bits. As was described with reference to the flow chart shown in FIG. 21, the combining process is performed whenever LSB side bits for one pixel have been decoded.

Next, the decoding process for MSB side encoded data of bit sequence "001010101011010101" as exemplified in FIG. 40A will be described. In the bit sequence shown in FIG. 40A, the run-length process has not be performed in the unit of MSB side bits and the run-length process has not been performed in the unit of a predetermined number of bytes.

At step S80 in the flow chart shown in FIG. 22, one bit is read from the beginning of the bit sequence and thereby the second flag is obtained. Since the value of the second flag is "0", it denotes that the run-length process has not been performed in the unit of a predetermined number of bytes (decoding procedure (1) shown in FIG. 40B). At step S81, the next one bit is read and thereby the first flag is obtained. Since the value of the first flag is "0", it denotes that the run-length process has not been performed in the unit of MSB side bits.

Since the value of the first flag is "0", the determined result at step S82 denotes that the run-length process has not been performed in the unit of MSB side bits. In this case, the flow advances to step S88. At step S88, bit sequence "1010101011010101" of a predetermined number of bytes preceded by the first flag is output (decoding procedure (3) shown in FIG. 40B).

After decoding procedure (1) to decoding procedure (3) have been completed, the process in the unit of the data structure of output data on the MSB side shown in FIG. 18 has been completed. At this point, since the number of decoded samples is obtained, the LSB side encoded data are decoded on the basis of the number of decoded samples. In this example, since the run-length process has not been performed in the unit of a predetermined number of bytes, the determined result at step S132 in the flow chart shown in FIG. 23 denotes that "8" as the number of repetitions of MSB side bits is the number of decoded samples N.

When LSB side encoded data have been decoded and baseband LSB side bits have been stored in the LSB side output memory 37, the data combining section 38 performs the combining process for MSB side bits and LSB side bits. The combining process is performed whenever LSB side bits for one pixels has been decoded as was described with reference to the flow chart shown in FIG. 21.

In the decoding process according to the third modification of the first embodiment, any of the output format of the first embodiment of which MSB side encoded data and LSB side encoded data are interleaved as described with reference to FIG. 12 and the output format of the first modification of the first embodiment of which one output sequence is separated into LSB side bits and MSB side bits as described with reference to FIG. 14 can be applied. In this case, the decoding apparatus 2B shown in FIG. 31 is used for the decoding process and the decoding process based on the flow charts shown in FIG. 32 to 34 is performed.

Likewise, in the decoding process according to the third modification of the first embodiment, the output format of the second modification of the first embodiment of which LSB side encoded data and MSB side encoded data are independently output as described with reference to FIG. 16 can be applied. In this case, the decoding apparatus 2C shown in FIG. 37 is used for the decoding process and the decoding process based on the flow charts shown in FIG. 38, FIG. 33, and FIG. 34 is performed.

When the encoding process is performed in the unit of three bytes or a data length larger then three bytes, the decoding process according to the third modification of the first embodiment can be applied.

2. Second Embodiment of Present Invention

Next, a second embodiment of the present invention will be described. According to the second embodiment, the position of the second flag, which denotes whether or not a bit sequence of a predetermined number of bytes is repeated, is changed in output data and only when the second flag is necessary, it is added. When it is not necessary to perform a determination based on the second flag, since it is omitted, a higher compression rate than that of the first embodiment and foregoing modifications can be accomplished.

Since the encoding apparatuses 1A, 1B, and 1C and the decoding apparatuses 2A, 2B, and 2C can be applied to the second embodiment, a first modification of the second embodiment (that will be described later), a second modification of the second embodiment (that will be described later), and a third modification of the second embodiment (that will be described later) as they are, their detail description will be omitted.

In other words, the second embodiment of the present invention corresponds to the foregoing first embodiment. The encoding process according to the second embodiment can be performed by the encoding apparatus 1A described with reference to FIG. 1. Encoded output data are formed by interleaving MSB side encoded data of which MSB side bits have been encoded and LSB side encoded data of which LSB side bits have been encoded.

2-1. Encoding Process According to Second Embodiment
2-1-1-2. Data Structure FIG. 41 shows the structure of an example of output data on the MSB side according to the second embodiment of the present invention. As exemplified in FIG. 41, output data on the MSB side according to the second embodiment are composed of a fixed length portion and a variable length portion preceded by the fixed length portion. The fixed length portion has a data length of one bit. A first flag is placed in the fixed length portion.

On the other hand, the variable length portion has a first region and a second region. The variable length portion starts with the first region in which the level of run-length of a run-length process in the unit of MSB side bits is placed. The first region is followed by the second region in which a second flag and the number of runs of the run-length process in the unit of one byte are placed.

Data placed in the first region are decided on the basis of the value of the first flag. A data length is assigned to the first region. In other words, when the value of the first flag is "1", the data length is assigned in the first region on the basis of the number of MSB side bits and the level of the run-length is placed. In contrast, when the value of the first flag is "0", a bit sequence of one byte that has not been encoded is placed in the first region, namely the run-length process has not been performed in the unit of MSB side bits and the run-length process has not been performed in the unit of a predetermined number of bytes.

The first region is followed by the second flag. According to the second embodiment, whether or not the second flag is assigned depends on the value of the first flag. In other words, when the value of the first flag is "0", which denotes that the run-length process has not been performed in the unit of MSB side bits, the second flag is not output. In contrast, when the value of the first flag is "1", one bit is assigned to the second flag.

The second region is a region in which the number of runs in the unit of a byte based on the processed result of the second stage run-length process section 18 is placed. Whether or not the second region is assigned is based on the value of the second flag. In other words, when the value of the second flag is "1", a predetermined number of bits are assigned to the second region and the number of repetitions as the result of the run-length process performed by the second stage run-length process section 18 is stored. In contrast, when the value of the second flag is "0", the second region is not assigned.

2-1-1-3. Encoding Process

Next, a encoding process according to the second embodiment will be described. The encoding process according to the second embodiment is basically the same as that according to the first embodiment described with reference to the flow charts shown in FIG. 6 to FIG. 10. In the following description, when necessary, the flow charts shown in FIG. 6 to FIG. 10 will be referenced.

In other words, basically, as was described with reference to FIG. 6, pixel data are separated into eight LSB side bits and the remaining MSB side bits excluding the eight LSB side bits (at step S1). The separated LSB side bits are encoded (at step S2). The separated MSB side bits are encoded (at step S3). The encoded LSB side bits and the encoded MSB side bits are interleaved and output (at step S4).

The encoding process for the LSB side bits at step S2 is performed by the DPCM section 13. The DPCM section 13 performs the DPCM process for LSB side bits stored in the LSB side data memory 12 in the unit of one byte and outputs difference data (at step S10). At step S11, the Huffman encoding section 14 performs the encoding process for the difference data with Huffman code.

Figure 42:
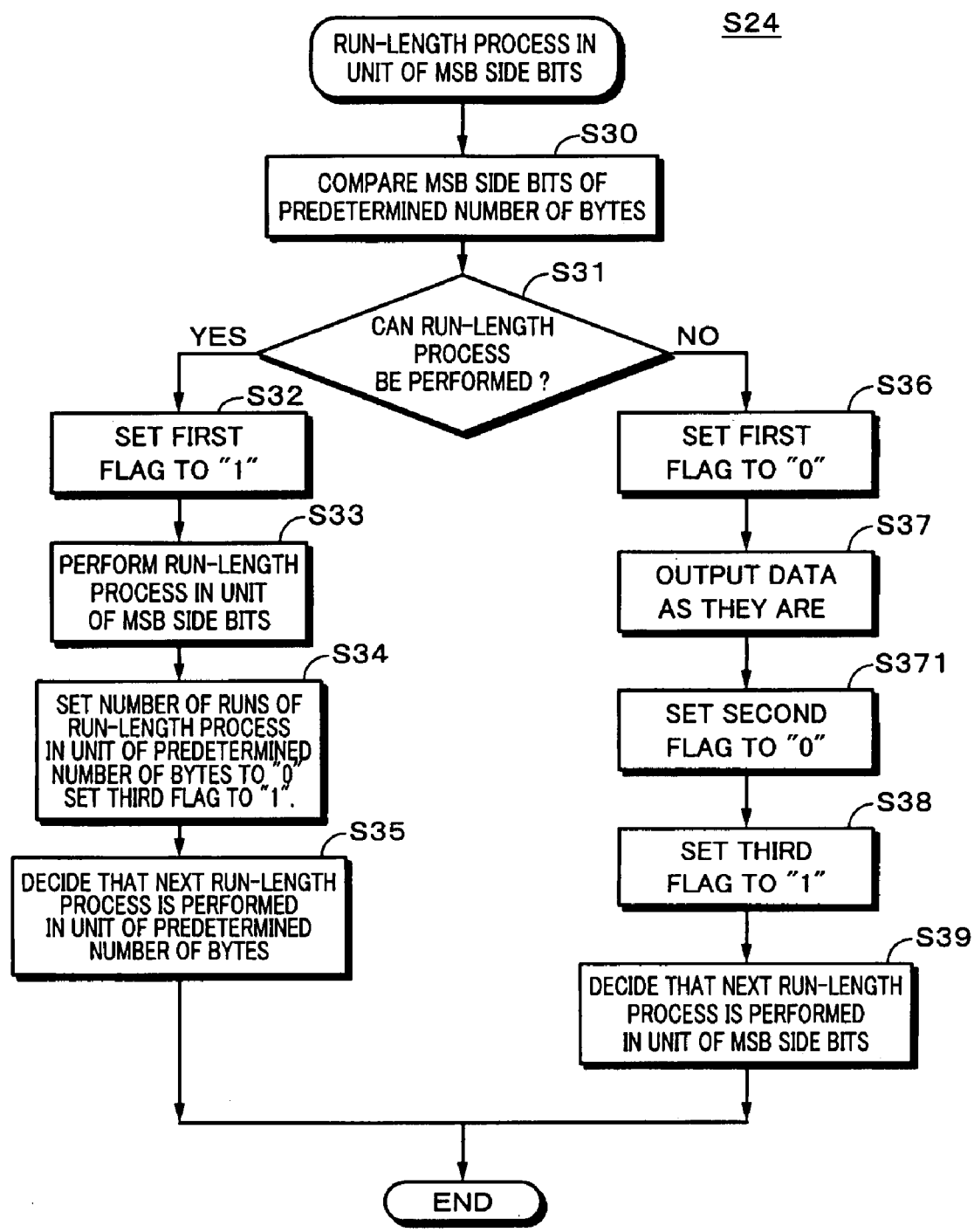
FIG. 42 is a flow chart showing an example of a encoding process for MSB side bits according to the second embodiment of the present invention.

The encoding process for MSB side bits at step S3 differs between the first embodiment and the second embodiment in the following point. FIG. 42 is a flow chart showing an example of the encoding process for MSB side bits according to the second embodiment. In the process shown in FIG. 42, when the determined result at step S31 denotes that the run-length process is not able to be performed in the unit of MSB side bits, the flow advances to step S371. At step S371, the value of the second flag is set to "0". Thus, the process of the second embodiment is different from the process of the first embodiment shown in FIG. 9 in step S371.

In other words, at step S30, a bit sequence of a predetermined number of bytes composed of a predetermined number of bit sequences of MSB side bits is compared in the unit of MSB side bits. At step S31, it is determined whether or not the run-length process can be performed for the bit sequence of the predetermined number of bytes in the unit of MSB side bits based on the compared result. When the determined result denotes that the run-length process can be performed, the flow advances to step S32. Since the rest of the process after step S32 is the same as the process of the first embodiment shown in FIG. 9, the description of the rest of the process will be omitted.

In contrast, when the determined result denotes that the run-length process is not able to be performed for the bit sequence of the predetermined number of bytes in the unit of MSB side bits, the flow advances to step S36. At step S36, the value of the first flag is set to "0". At the next step, S37, the bit sequence of the predetermined number of bytes that has been read is output as it is. The output bit sequence is stored as it is in a memory or a register (not shown).

At the next step, S371, the value of the second flag is set to "0". Since the value of the second flag is set to "0", it denotes that the run-length process has not been performed in the unit of a predetermined number of bytes and the second flag and the second region are not output in the output data. Since the second flag is not output, the second embodiment is more advantageous than the first embodiment with respect to compression rate.

When the value of the second flag has been set to "0" at step S371, the flow advances to step S38. At step S38, the value of the third flag is set to "1". At the next step, S39, it is decided that the next run-length process is performed in the unit of MSB side bits.

2-1-1-4. Specific Example of Encoding Process

Next, with reference to FIG. 43A, 43B, 43C, and 43D, a specific example of the encoding process for MSB side bits according to the second embodiment will be described. In this example, it is assumed that the number of quantizer bits of pixel data is 10 bits, one pixel has a data length of 10 bits, and the data length of MSB side bits is two bits.

FIG. 43A shows an example of MSB side bits separated at step S1 shown in FIG. 6. MSB side bits of two bits are separated for each pixel. They are arranged in the display order and stored in the MSB side data memory 16. The structure of the bit sequence is the same as that shown in FIG. 11A. Portions described in the first embodiment with reference to FIG. 6 to FIG. 8, FIG. 10, and FIG. 11A to FIG. 11D of the first embodiment will be omitted in the following description.

First, the flow advances from step S21 to step S22 shown in FIG. 8. At step S22, bit sequence (a) of a predetermined number of bytes (in this example, one byte) is read from the MSB side data memory 16. At the next step, S23, the run-length process is performed in the unit of for example MSB side bits. Thereafter, the flow advances to step S24 (at step S30 shown in FIG. 42). At step S24, bit sequence (a) of the predetermined number of bytes that has been read is compared in the unit of MSB side bits and it is determined that the run-length process be able to be performed for bit sequence (a) (at step S31). At step S32, the value of the first flag is set to "1".

At the next step, S33, the run-length process is performed for bit sequence (a) in the unit of MSB side bits. Bit sequence "00", which represents the level of the run-length, is output. In addition, the first flag is output. The number of runs of the run-length process in the unit of a predetermined number of bytes is set to "0" and the value of the third flag is set to "1" (at step S34). It is decided that the next run-length process is performed in the unit of a predetermined number of bytes (at step S35). Thereafter, the flow returns to step S20.

Thereafter, the flow advances from step S20 to step S21. At step S21, the flow advances to step S22 based on the value of the third flag. At step S22, bit sequence (b) "00000000" for the next predetermined number of bytes adjacent to bit sequence (a) is read from the MSB side data memory 16. Since it has been decided that the next run-length process is performed in the unit of a predetermined number of bytes, the flow advances from step S23 to step S25 (step S40 shown in FIG. 10).

The determined result as step S41 shown in FIG. 10 denotes that the run-length process can be performed on the basis of the compared result at step S40 of bit sequence (b) that has been immediately previously read and bit sequence (b) that has been newly read. At step S42, the run-length process is performed in the unit of a predetermined number of bytes and the number of runs is incremented. The bit sequences are repeatedly compared for a predetermined number of bytes until they do not match. Whenever the bit sequences match, the number of runs is incremented. In the example shown in FIG. 43A, bit sequence (a) matches bit sequences (b) to (d). When bit sequence (a) is compared with bit sequence (e), since they do not match, the process is completed and the number of runs becomes "3".

After the run-length process has been completed, the flow advances to step S43. At step S43, the value of the third flag is set to "1". At the next step S44, it is decided that the next run-length process is performed in the unit of a predetermined number of bytes. Thereafter, the flow returns to step S20.

Thereafter, the flow advances from step S20 to step S21. At step S21, the flow advances to step S22 based on the value of the third flag. At step S22, bit sequence (e) "10101010" of the next predetermined number of bytes is read from the MSB side data memory 16. Since it has been decided that the next run-length process is performed in the unit of a predetermined number of bytes, the flow advances from step S23 to step S25 (step S40 shown in FIG. 10).

At step S40 shown in FIG. 10, bit sequence (d) that has been immediately previously read is compared with bit sequence (d) that has been newly read. The determined result denotes that the run-length process is not able to be performed based on the compared result (at step S41). In this case, the flow advances to step S45. At step S45, it is determined whether or not the number of runs is "0". Since the number of runs is "3", the flow advances to step S47. At step S47, the value of the second flag is set to "1". At the next step, S48, the result of the run-length process is output. The output result of the run-length process is "3" ("0011" in four-bit binary notation) as the number of runs and "1" as the value of the second flag. In other words, at step S48, output data 102A' (second flag) and output data 103' (number of runs) shown in FIG. 43D have been decided.

After step S32 and step S48, the encoding process for bit sequence (a) to bit sequence (d) shown in FIG. 43B have been encoded. As exemplified in FIG. 43D, the encoded data are output in the order of output data 102A' of the first flag, output data 100A' of the level of the run-length, output data 101A' of the second flag, and output data 103' of the number of runs of the run-length process in the unit of one byte. In this example, a bit sequence of 32 bits of all 0's has been encoded into bit sequence "10010011" of eight bits.

At the next step, S49, the value of the third flag is set to "0". At the next step, S50, it is decided that the next run-length process is performed in the unit of MSB side bits. Thereafter, the flow returns to step S20.

Thereafter, the flow advances from step S20 to step S21. Since the value of the third flag has been set to "0", new data are not read. Thereafter the flow advances to step S23. Since it has been decided that the next run-length process is performed in the unit of MSB side bits, the flow advances from step S23 to step S24 (step S30 shown in FIG. 42).

At step S30 shown in FIG. 42, bit sequence (e) "10101010" of a predetermined number of bytes that has been read is compared in the unit of MSB side bits. The determined result at step S31 denotes that the run-length process can be performed. In this case, the flow advances to step S32. At step S32, the value of the first flag is set to "1". At the next step, S33, the run-length process is performed for bit sequence (e) in the unit of MSB side bits. Bit sequence "10" of MSB side bits that are repeated is output as the level of the run-length and the first flag is output. After step S32 and step S3, output data 100B' (first flag) and output data 101B' (level of run-length) shown in FIG. 43D have been decided.

Thereafter, the number of runs of the run-length process in the unit of a predetermined number of bytes is set to "0" and the value of the third flag is set to "1" (at step S34). In addition, it is decided that the next run-length process is performed in the unit of a predetermined number of bytes (at step S35). Thereafter, the flow returns to step S20.

Thereafter, the flow advances from step S20 to step S21. At step S21, the flow further advances to step S22 based on the value of the third flag. At step S22, bit sequence (f) "11010101" of the next predetermined number of bytes adjacent to bit sequence (e) is read from the MSB side data memory 16. At the next step, S23, since it has been decided at step S35 shown in FIG. 42 that the next run-length process is performed in the unit of a predetermined number of bytes, the flow advances to step S25 (step S40 shown in FIG. 10).

At step S40 shown in FIG. 10, bit sequence (e) that has been immediately previously read is compared with bit sequence (f) that has been newly read. The determined result at step S1 denotes that the run-length process is not able to be performed on the basis of the compared result. Thereafter, the flow advances to step S45. At step S45, it is determined whether or not the number of runs is "0". Since the number of runs is "0", the flow advances to step S46. At step S46, the value of the second flag is set to "0". At the next step, S48, the result of the run-length process is output. The output result of the run-length process is "2" as the number of runs and "0" as the value of the second flag.

As was described with reference to FIG. 41, when the value of the second flag is "0", since the number of runs is not output, at step S48, output data 102B (second flag) shown in FIG. 43D are decided. In addition, since the number of runs is not output, it is decided that the second region shown in FIG. 41 is not assigned.

After step S48, the encoding process for bit sequence (e) has been completed. As exemplified in FIG. 43D, the encoded data are output in the order of output data 102B' of the first flag, output data 100B' of the level of the run-length, and output data 101B' of the second flag. Bit sequence "10101010" of eight bits has been encoded into bit sequence "1100" of four bits.

At the next step, S49, the value of the third flag is set to "0". At the next step, S50, it is decided that the next run-length process is performed in the unit of MSB side bits. Thereafter, the flow returns to step S20.

Thereafter, the flow advances from step S20 to step S21. Thereafter, the flow advances to step S23 based on the value of the third flag. Since it has been decided at step S50 that the next run-length process is performed in the MSB side bits, the flow advances to step S24 (step S30 shown in FIG. 42).

At step S30 shown in FIG. 42, since bit sequence (f) "11010101" of one byte has been read, bit sequence (f) is compared with bit sequence (c) "11" of MSB side bits shown in FIG. 43C. The determined result at step S31 denotes that the run-length process is not able to be performed on the basis of the compared result. In this case, the flow advances to step S36. At step S36, the value of the first flag is set to "0". At step S37, bit sequence (f) is output as it is. At step S371, the value of the second flag is set to "0".

After step S36, step S37, and step S371, output data 100C (first flag) and output data 104 (bit sequence (f)) shown in FIG. 43D have been decided. In addition, since the value of the first flag has been set to "0" at step S36, the second flag is not output as described for the data structure shown in FIG. 41.

At this point, the process in the unit of the data structure on the MSB side shown in FIG. 41 has been completed. Thus, the encoding process for bit sequence (f) has been completed. In this case, the run-length process is not performed in the unit of MSB side bits. In addition, the run-length process is not performed in the unit of a predetermined number of bytes. Thus, since MSB side bits have not been encoded, the first flag has been added to bit sequence "11010101" of eight bits, resulting in bit sequence "011010101" of nine bits. The data length in the case that the run-length process is not performed in the unit of MSB side bits and the run-length process is not performed in the unit of a predetermined number of bytes is shorter than the data length in the case of the first embodiment by one bit.

At the next step, S38, the value of the third flag is set to "1". At the next step, S39, it is decided that the next run-length process is performed in the unit of MSB side bits. In other words, when the run-length process is not able to be performed for a bit sequence of one byte, it seems that the likelihood of which the run-length process can be performed in the unit of a predetermined number of bytes is low.

Thereafter, the flow returns to step S20 shown in FIG. 8. At step S20, since the process has not been completed for one frame, the flow advances to step S21. The process is repeated in the same manner.

2-1-1-5. Output Format

Figure 44:
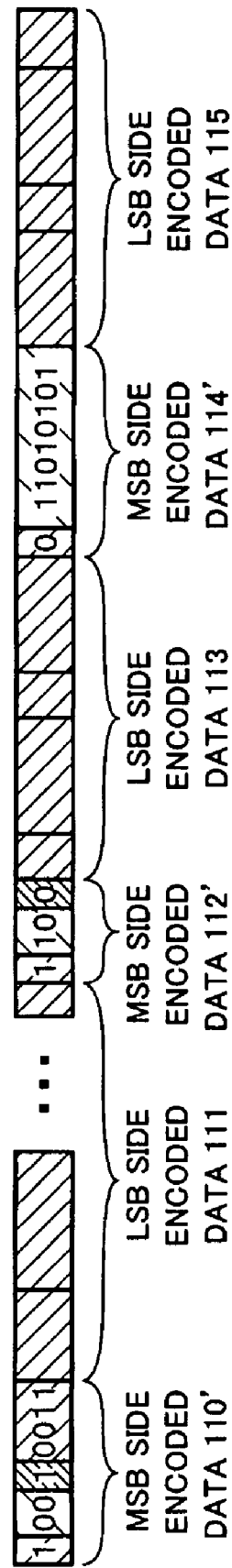
FIG. 44 is a schematic diagram showing an example of an output format of output data obtained by the encoding process for LSB side bits and MSB side bits according to the second embodiment of the present invention.

FIG. 44 shows an example of an output format of output data obtained in the encoding process for LSB side bits and MSB side bits according to the second embodiment. The example shown in FIG. 44 corresponds to the data output shown in FIG. 43D. As was described above, according to the second embodiment of the present invention, encoded LSB side bits and encoded MSB side bits are interleaved and output. The unit of interleaving can be decided on the basis of a data structure that allows MSB side bits can be decoded in the unit of a predetermined number of bytes. A decoding process according to the second embodiment will be described later.

For example, in the unit of the structure of MSB side bits shown in FIG. 41, encoded data of MSB side bits and encoded data of LSB side bits are alternately placed. Encoded data of MSB side bits are followed by encoded data of LSB side bits.

When the value of the first flag is "1", at least the first flag, the level of the run-length process in the unit of MSB side bits, and the second flag of the encoded data of MSB side bits are successively output as MSB side encoded data. When the value of the second flag is "1", the number of runs of the run-length process in the unit of a predetermined number of bytes is also output as MSB side encoded data. MSB side encoded data 110' shown in FIG. 44 is an example of which the value of the first flag and the value of the second flag are "1" each, the level of the run-length process in the unit of MSB side bits, and the number of runs of the run-length process in the unit of a predetermined number of bytes are output. MSB side encoded data 112' is an example of which the value of the first flag is "1" and the value of the second flag is "0" and the number of runs of the run-length process in the unit of a predetermined number of bytes is not output.

In contrast, MSB side encoded data 114' is an example of which the value of the first flag is "0" and the first flag and a bit sequence of MSB side bits of a predetermined number of bytes that has not been encoded are output.

2-1-2. First Modification of Second Embodiment (First Different Format)

Next, a first modification of the second embodiment of the present invention will be described. In the first modification of the second embodiment, in the condition of which the position of the second flag, which denotes whether a bit sequence in the unit of a predetermined number of bytes is repeated, is changed in output data and only when the second flag is necessary, it is added, output data of one output system are separated into LSB side encoded data and MSB side encoded data.

In the first modification of the second embodiment, the encoding process can be performed by the encoding apparatus 1B according to the first modification of the first embodiment. In addition, the encoding process performed by the encoding apparatus 1B is the same as the process according to the second embodiment. Thus, to prevent redundancy, detail description for the encoding apparatus and the encoding process will be omitted. In the following description, a predetermined number of bytes is one byte.

In other words, like the first modification of the first embodiment, in the encoding process for LSB side bits performed by the encoding apparatus 1B according to the first modification of the second embodiment, the DPCM section 13 obtains the difference between LSB side bits that have been immediately previously processed and LSB side bits that have been newly processed. The Huffman encoding section 14 performs a encoding process for the difference data with a Huffman table. The encoding length calculation section 20 obtains the code length of encoded data encoded in the encoding process of the Huffman encoding section 14.

As was described with reference to FIG. 6 to FIG. 8, FIG. 10, and FIG. 42 of the second embodiment, the first stage run-length process section 17 and the second stage run-length process section 18 performs the encoding process for MSB side bits by the run-length process in the unit of MSB side bits and the run-length process in the unit of a predetermined number of bytes and sets the first and second flag.

Figure 45:
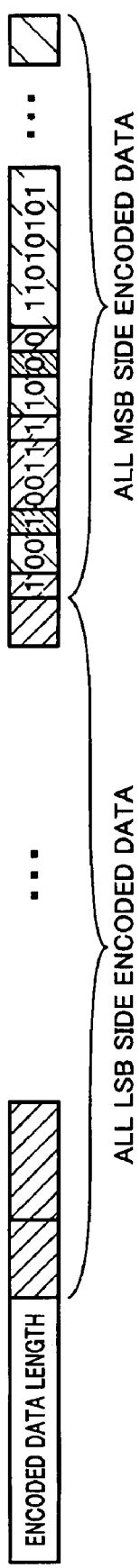
FIG. 45 is a schematic diagram showing an example of an output format of which MSB side bits and LSB side bits are encoded and output according to the first modification of the second embodiment of the present invention.

FIG. 45 shows an example of an output format of which MSB side bits and LSB side bits are encoded and output according to the first modification of the present invention. The arrangement of encoded data length information, LSB side encoded data, and MSB side encoded data of the output format according to the first modification of the second embodiment is the same as that of the first modification of the first embodiment shown in FIG. 14. In other words, encoded data length information is placed at the beginning. The encoded data length information is followed by LSB side encoded data after the encoded data length information to the position represented thereby, followed by MSB side encoded data. In the LSB side encoded data and MSB side encoded data, all data of pixels corresponding to their delimitations are placed.

Like the output format according to the second embodiment described with reference to FIG. 44, when the value of the first flag is "1", as MSB side encoded data, at least the first flag, the level of the run-length process in the unit of MSB side bits, and the second flag are output in the order. When the value of the second flag is "1", the number of runs of the run-length process in the unit of a predetermined number of bytes is also output. When the value of the first flag is "0", the first flag and a bit sequence of MSB side bits of a predetermined number of bytes that has not been encoded is output. This data structure is successively output.

In the first modification of the second embodiment, MSB side encoded data may be followed by LSB side encoded data.

2-1-3. Second Modification of Second Embodiment (Second Different Output Format)

Next, a second modification of the second embodiment of the present invention will be described. According to the second modification of the second embodiment, in the condition of which the position of the second flag, which denotes a bit sequence in the unit of a predetermined number of bytes is repeated, is changed in output data and only when the second flag is necessary, it is added, LSB side encoded data and MSB side encoded data are independently output as output data.

In the second embodiment of the second embodiment, the encoding process can be performed by the encoding apparatus 1C according to the second modification of the first embodiment. In addition, the encoding process performed by the encoding apparatus 1C is the same as the process of the first modification of the second embodiment. Thus, to prevent redundancy, detail description of the encoding apparatus and the encoding process according to the second modification of the second embodiment will be omitted. In the following description, a predetermined number of bytes is one byte.

In other words, according to the second modification of the second embodiment, an encoded output of LSB side bits and a encoded output of MSB side bits are independently read from the output data memory 15A and the output data memory 15B, respectively. As exemplified in FIG. 46, they are output as data of two systems of output data 22A and output data 22B'.

Like the first modification of the second embodiment, as output data 22B' that are MSB side encoded data, when the value of the first flag is "1", at least the first flag, the level of the run-length process in the unit of MSB side bits, and the second flag are successively output. When the value of the second flag is "1", the number of runs of the run-length process in the unit of a predetermined number of bytes is also output. In contrast, when the value of the first flag is "0", the first flag, a bit sequence of MSB side bits of a predetermined number of bytes that has not been encoded are output. This data structure is successively output.

The output data 22A and the output data 22B' are stored in different files.

2-1-4. Third Modification of Second Embodiment (Different Encoding Unit)

Next, a third modification of the second embodiment of the present invention will be described. According to the third modification of the second embodiment, in the condition of which the position of the second flag, which denotes whether a bit sequence of a predetermined number of bytes is repeated, is changed in output data and only when the second flag is necessary, it is added, a predetermined number of bytes is two bytes and the run-length process is performed in the unit of MSB side bits, which is two bytes.

Like the second embodiment, in the third modification of the second embodiment, the encoding apparatus 1A (see FIG. 1) according to the first embodiment can be used as it is. In addition, the encoding process, described with reference to FIG. 6 to FIG. 8 and the flow charts shown in FIG. 10 and FIG. 42, of the second embodiment can be basically applied. Thus, to prevent redundancy, their detail description will be omitted. In addition, the encoding process for LSB side bits is the same as the case of the run-length process for LSB side bits with a bit sequence of one byte described in the first embodiment, the description of the encoding process for LSB side bits will be omitted.

In addition, since the processes of the data separation section 11 and the first stage run-length process section 17 are basically the same as those of the third modification of the first embodiment described with reference to FIG. 17, their detail description will be omitted. In other words, the data separation section 11 separates pixel data into eight LSB side bits and the remaining MSB side bits excluding the eight LSB side bits for each pixel. The first stage run-length process section 17 performs the run-length process by comparing a bit sequence of MSB side bits of a predetermined number of bytes, namely two bytes in the unit of MSB side bits.

Figure 47:
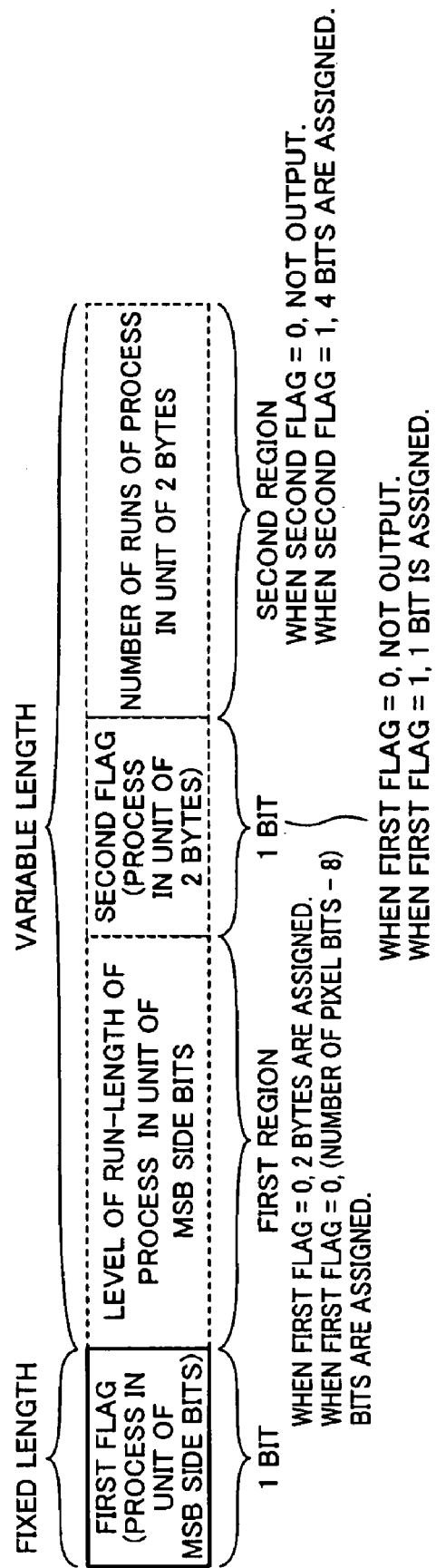
FIG. 47 is a schematic diagram showing the structure of an example of output data on the MSB side according to a third modification of the second embodiment of the present invention.

FIG. 47 shows an example of the data structure of output data on the MSB side according to the third modification of the second embodiment. As shown in FIG. 47, the data structure applicable to the third modification of the second embodiment is basically the same as that applicable to the second modification shown in FIG. 41. In other words, output data are composed of a fixed length portion and a variable length portion preceded by the fixed length portion. The fixed length portion has a data length of one bit. In the fixed length portion, the first flag is placed.

In the variable length portion, there are a first region and a second region preceded by the first region. In the first region, the level of the run-length of the run-length process in the unit of MSB side bits is placed. In the second region, the second flag, which denotes whether or not the run-length process has been performed in the unit of a predetermined number of bytes, namely two bytes, and the number of runs of the run-length process in the unit of a predetermined number of bytes are placed. Instead, in the variable length portion, a bit sequence of a predetermined number of bytes that has not been encoded is placed when the run-length process has not been performed in the unit of MSB side bits and the run-length process has not been performed in the unit of a predetermined number of bytes.

When the value of the first flag is "1", a data length corresponding to the number of MSB side bits is assigned to the first region and the level of the run-length is placed. In contrast, when the value of the first flag is "0", a data length of a predetermined number of bytes is assigned to the first region and a bit sequence of MSB side bits of a predetermined number of bytes is placed.

Like the second embodiment, in the third modification of the second embodiment, the first region is followed by the second flag on the basis of the value of the first flag. In other words, when the value of the first flag is "1", one bit is assigned for the second flag. Thus, the first flag is followed by the second flag. In contrast, when the value of the first flag is "0", the second flag is not output. After the second flag, the second region is assigned on the basis of the value of the second flag. In other words, when the value of the second flag is "1", a predetermined number of bytes are assigned to the second region and the number of runs of the run-length process performed by the second stage run-length process section 18 is placed in the second region. In contrast, when the value of the second flag is "0", the second region is not assigned.

FIG. 48A, FIG. 48B, FIG. 48C, and FIG. 48D show an outline of an example of a encoding process for MSB side bits according to the third modification of the second embodiment. In this example, it is assumed that the number of quantizer bits of pixel data is 10 bits and one pixel has a data length of 10 bits. As exemplified in FIG. 48A, the data separation section 11 separates MSB side bits of two bits of each pixel, rearranges the MSB side bits in the display order, and stores the rearranged MSB side bits in the MSB side data memory 16. The run-length process is performed in the unit of a bit sequence of a predetermined number of bytes of MSB side bits for eight pixels.

For example, bit sequence (A) "0000000000000000" of a predetermined number of bytes exemplified in FIG. 48B is formed by repeating bit sequence "00" of MSB side bits at the beginning eight times. In addition, bit sequence (A) matches bit sequence (B) "0000000000000000" of a predetermined number of bytes adjacent thereto. The run-length process is performed for bit sequence (a) with bit sequence "00" of MSB side bits at the beginning in the unit of MSB side bits and the value of the first flag is set to "1". By comparing bit sequence (B) of a predetermined number of bytes adjacent to bit sequence (A) with bit sequence (A), the run-length process is performed in the unit of a predetermined number of bytes (see FIG. 48C) and the value of the second flag is set to "1".

Since the value of the first flag is "1", two bits are assigned to the first region, the level of the run-length is placed in the first region, and one bit of the second flag is assigned after the first region. Since the value of the second flag is "1", four bits are assigned to the second region and the number of runs of the run-length process in the unit of a predetermined number of bytes is placed in the second region (see FIG. 48D).

Since bit sequence (C) "10101010111010101" of a predetermined number of bytes exemplified in FIG. 48B is not a repetition of bit sequence "10" of MSB side bits at the beginning, the run-length process is not performed in the unit of MSB side bits and the value of the first flag is set to "0". As a result, the adjacent bit sequence of a predetermined number of bytes is not compared in the unit of a predetermined number of bytes (see step S30, step S31, step 36 to step S39, and so forth in the flow chart shown in FIG. 42) and the value of the second flag is set to "0" (see step S371 shown in FIG. 42). Since the value of the first flag is "0", a predetermined number of bytes are assigned to the first region and bit sequence (C) is placed as it is in the first region. In addition, since the value of the second flag is "0", the second region is not output. In addition, since the value of the first flag is "0", the second flag is not output (see FIG. 48D).

Figure 46:
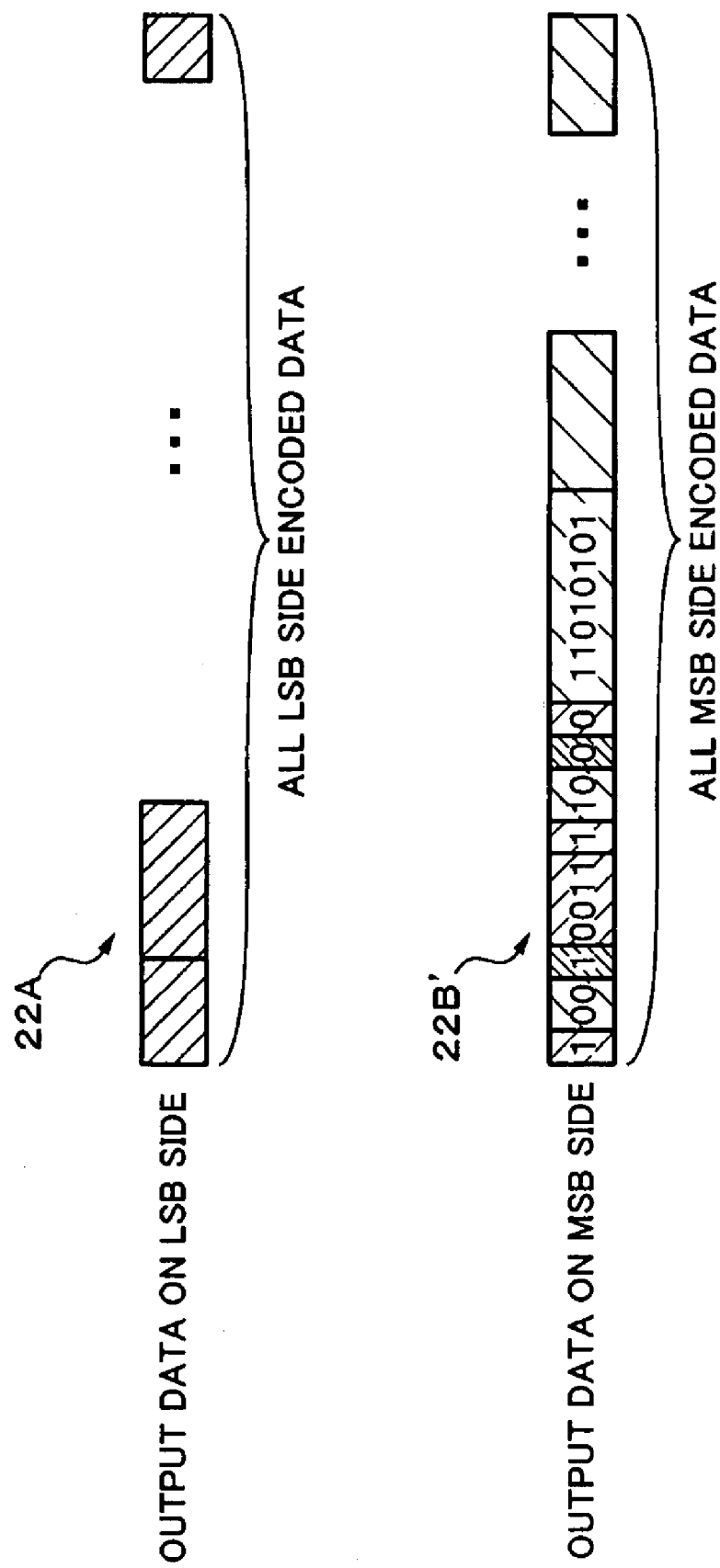
FIG. 46 is a schematic diagram showing an example of an output format of which MSB side bits and LSB side bits are encoded according to a second modification of the second embodiment of the present invention.

In the third modification of the second embodiment, any of the output format of the second embodiment of which MSB side encoded data and LSB side encoded data are interleaved as described with reference to FIG. 44, the output format of the first modification of the second embodiment of which one output sequence is separated into LSB side bits and MSB side bits as described with reference to FIG. 45, and the output format of the second modification of the second embodiment of which LSB side encoded data and MSB side encoded data are independently output as described with reference to FIG. 46 can be applied.

In the third embodiment of the second embodiment, the run-length process for MSB side bits is performed with a bit sequence of two bytes. Instead, the run-length process for MSB side bits may be performed with a bit sequence of three bytes or more.

2-2. Decoding Process According to Second Embodiment

Next, an example of a decoding process according to a second embodiment of the present invention corresponding to the encoding process of which in the condition that the position of the second flag, which denotes whether or not a bit sequence of a predetermined number of bytes is repeated, is changed in output data and only when the second flag is necessary, it is added, LSB side encoded data and MSB side encoded data are interleaved and output will be described.

In the second embodiment, since the decoding apparatus 2A that performs the decoding process according to the first embodiment can be applied as it is, detail description of the decoding apparatus will be omitted.

2-2-1-2. Decoding Process

An overall flow, a decoding process for LSB side encoded data, and a calculation process for the number of decoded samples of the decoding process according to the second embodiment are the same as those of the decoding process according to the first embodiment described with reference to FIG. 21, FIG. 23, and FIG. 24. In the decoding process according to the second embodiment, since the position of the second flag is changed, the decoding process for MSB side encoded data is changed. Next, with reference to the flow charts shown in FIG. 21, FIG. 23, and FIG. 24, the decoding process according to the second embodiment will be described.

In other words, basically, as was described with reference to FIG. 21, at step S60, the number of bits of baseband pixel data that is encoded is set. At the next step, S61, encoded data that have been encoded by the encoding process according to the second embodiment shown in FIG. 6 to FIG. 8, FIG. 10, and FIG. 42 are read for example through a file. At step S62, the decoding process for MSB side encoded data is performed according to a flow chart shown in for example FIG. 49. The flow advances to step S64 through step S63.

At step S64, in the process exemplified in FIG. 24, LSB side encoded data are decoded. At step S65, decoded MSB side bits and decoded LSB side bits are combined. When the determined result at step S63 denotes that the LSB side encoded data have been processed for all decoded samples obtained in the process exemplified in FIG. 23, the flow advances to step S66. At step S66, it is determined whether or not the process has been completed for one frame. When the process has not been completed, the process is repeated from step S62.

FIG. 49 is a flow chart showing an example of the decoding process for MSB side bits according to the second embodiment. In the flow chart shown in FIG. 49, in the decoding process according to the first embodiment described with reference to FIG. 22, the position of the step of obtaining the second flag is changed. In other words, after the value of the first flag is determined, the second flag is obtained.

In other words, in the flow chart shown in FIG. 49, with reference to the data structure of the output data on the MSB side described with reference to FIG. 41, at the first step, S80, one bit is read from the beginning of the output data and the first flag is obtained by the first stage decoding section 32. At the next step, S82, it is determined whether or not the run-length process has been performed in the unit of MSB side bits on the basis of the value of the first flag. When the value of the first flag is "1", the determined result denotes that the run-length process has been performed in the unit of MSB side bits. In this case, the flow advances to step S83. At step S83, the first stage decoding section 32 reads the next two bits of the first flag, namely, the level of the run-length. The value of two bits is repeatedly output for a predetermined number of bytes (in this example, one byte).

When the value of the first flag is "0", the determined result at step S82 denotes that the run-length process has not been performed in the unit of MSB side bits. In this case, the flow advances to step S88. At step S88, a predetermined number of bytes, namely one byte, preceded by the first flag is read and output. Thereafter, the flow advances to step S89. At step S89, the number of decoded samples is obtained.

After the level of the run-length has been output as step S83, the flow advances to the next step, S831. At step S831, the next one bit of the level of the run-length is read and the second flag is obtained by the second stage decoding section 33. At the next step, S84, it is determined whether or not the run-length process has been performed in the unit of a predetermined number of bytes based on the value of the second flag.

When the value of the second flag is "1, the determined result denotes that the run-length process has been performed in the unit of a predetermined number of bytes. In this case, the flow advances to step S85. At step S85, the next four bites of the second flag are read and the number of runs of the run-length process in the unit of a predetermined number of bytes is obtained. At the next step, S86, the second stage decoding section 33 repeatedly outputs data of a predetermined number of bytes that are output from the first stage decoding section 32 at step S83 the number of times corresponding to the number of runs. At the next step, S87, the number of decoded samples is obtained.

2-2-1-3. Specific Example of Decoding Process

Next, with reference to the flow charts shown in FIG. 21, FIG. 23, FIG. 24 and with reference to FIG. 50A to FIG. 55C, a specific example of the decoding process according to the second embodiment will be described. In this example, it is assumed that the number of quantizer bits of pixel data is 10 bits, the predetermined number of bytes is one byte, and the encoding process is performed in the unit of one byte.

Next, the decoding process for MSB side encoded data of bit sequence "10010011" shown in FIG. 50A will be described. In the example shown in FIG. 50A, for the bit sequence shown in FIG. 50A, the run-length process has been performed in the unit of MSB side bits and the run-length process has been performed in the unit of a predetermined number of bytes.

At step S80 in the flow chart shown in FIG. 49, one bit is read from the beginning of the bit sequence and thereby the first flag is obtained. In the example shown in FIG. 50A, since the value of the first flag is "1", it denotes that the run-length process has been performed in the unit of MSB side bits (decoding procedure (1) shown in FIG. 50B). The flow advances to step S83 based on the determination at step S82. At step S83, a bit sequence of two bits that represents the level of the run length, preceded by the first flag, is read. The bit sequence of the level of the run-length is repeatedly output for a predetermined number of bytes. In the example shown in FIG. 50A, since bit sequence that represents the level of the run-length is "00", bit sequence "00" is repeated four times and thereby bit sequence "00000000" is output (decoding procedure (2) shown in FIG. 50B).

When the value of the first flag is "1", the two bits that represent the level of the run-length are followed by one bit of the second flag. At step S831, one bit preceded by the two bits that represent the level of the run-length is read and thereby the second flag is obtained. In the example shown in FIG. 50A, since the value of the second flag is "1", it denotes that the run-length process has been performed in the unit of a predetermined number of bytes (decoding procedure (3) shown in FIG. 50B).

Since the value of the second flag is "1", the determined result at step S84 denotes that the run-length process has been performed in the unit of a predetermined number of bytes. At step S85 shown in FIG. 49, a bit sequence of four bits that represent the number of runs of the run-length process in the unit of a predetermined number of bytes, preceded by the second flag, is read. In the example shown in FIG. 50A, since the bit sequence that represents the number of runs is "0011", it denotes that the number of runs is "3". Bit sequence "00000000" that has been immediately previously output is repeatedly output three times (decoding procedure (4) shown in FIG. 50B).

After decoding procedure (1) to decoding procedure (4) have been completed, the process in the unit of the data structure of output data on the MSB side shown in FIG. 41 has been completed. At this point, since the number of decoded samples is obtained (step S87 shown in FIG. 49), the LSB side encoded data are decoded on the basis of the number of decoded samples.

After LSB side encoded data have been decoded and baseband LSB side bits have been stored in the LSB side output memory 37, the data combining section 38 performs the combining process for MSB side bits and LSB side bits. The combining process is performed whenever LSB side bits have been decoded for one pixel as described in the flow chart shown in FIG. 21.

Next, with reference to FIG. 51A, FIG. 51B, and FIG. 51C, the combining process for MSB side bits and LSB side bits will be described. This combining process is basically the same as the combining process according to the first embodiment described with reference to FIG. 26. MSB side encoded data (1) placed at the beginning of encoded data shown in FIG. 51A is processed as described with reference to FIG.

50B. In other words, encoded data (1) are decoded by repeating bit sequence "00" on the MSB side four times as the decoding process for the run-length process in the unit of MSB side bits and repeating the obtained bit sequence "00000000" three times as the decoding process of the run-length process in the unit of a predetermined number of bytes. As a result, bit sequence "00000000000000000000000000" is obtained (see the left-side sequence shown in FIG. 51B). The obtained bit sequence is stored in the MSB side output memory 34. The number of decoded samples becomes (number of decoded samples in unit of MSB side bits, N)×(number of runs in run-length process in unit of predetermined number of bytes+1)=4×(3+1)=16.

In contrast, LSB side encoded data are stored in the LSB side output memory 37 whenever LSB side bits have been decoded for example for one pixel (see the right-side sequence shown in FIG. 51B).

The data combining section 38 connects bit sequence "00000000000000000000000000000000" in the unit of MSB side bits, namely bit sequence "00" of two bits, stored in the MSB side output memory 34 and corresponding LSB side bits for one pixel, namely eight bits, for the number of decoded samples stored in the LSB side output memory 37, combines MSB side bits and LSB side bits, and obtains pixel data for the number of decoded samples, namely 16 samples (FIG. 51C).

Next, the decoding process for MSB side encoded data of bit sequence "1100" exemplified in FIG. 52A will be described. In the example shown in FIG. 52A, for the bit sequence shown in FIG. 52A, the run-length process has been performed in the unit of MSB side bits and the run-length process has not been performed in the unit of a predetermined number of bytes.

First of all, at step S80 of the flow chart shown in FIG. 49, one bit is read from the beginning of the bit sequence and thereby the first flag is obtained. In the example shown in FIG. 52A, since the value of the first flag is "1", it denotes that the run-length process has been performed in the unit of MSB side bits (decoding procedure (1) shown in FIG. 52B). Since the value of the first flag is "1", the determined result at step S82 denotes that the run-length process has been performed in the unit of MSB side bits. At the next step, S83, a bit sequence of two bits that represents the level of the run-length, preceded by the first flag, is repeatedly read for a length of a predetermined number of bytes. In the example shown in FIG. 52A, since the bit sequence that represents the level of the run-length is "10", bit sequence "10" is repeated four times and thereby bit sequence "10101010" is output (decoding procedure (2) shown in FIG. 52B).

When the value of the first flag is "1", the two bits that represent the level of the run-length are followed by the second flag of one bit. At step S831, one bit preceded by the two bits that represent the level of the run-length is read and thereby the second flag is obtained. In the example shown in FIG. 52A, since the value of the second flag is "0", it denotes that the run-length process has not been performed in the unit of a predetermined number of bytes (decoding procedure (3) shown in FIG. 52B).

Since the value of the second flag is "0", the determined result at the next step, S84, denotes that the run-length process has not been performed in the unit of one byte. In this case, the flow advances to step S89. In the case of the bit sequence shown in FIG. 52A, after decoding procedure (1) to decoding procedure (3) have been completed, the process in the unit of the data structure of output data on the MSB side shown in FIG. 41 has been completed. At this point, since the number of decoded samples is obtained, the LSB side encoded data are decoded based on the number of decoded samples.

After the LSB side encoded data have been decoded and baseband LSB side bits have been stored in the LSB side output memory 37, the data combining section 38 performs the combining process for MSB side bits and LSB side bits for each of LSB side bits of one pixel.

In this case, the combining process for MSB side bits and LSB side bits is nearly the same as that described with reference to FIG. 51. In other words, as exemplified in FIG. 53A, FIG. 53B, and FIG. 53C, MSB side encoded data (2) is processed as described with reference to FIG. 52. In other words, bit sequence "10" of MSB side bits is repeated four times as the decoding process of the run-length process in the unit of MSB side bits. As a result, bit sequence 101010101 is obtained (see the left-side sequence shown in FIG. 53B). This bit sequence is stored in the MSB side output memory 34. The number of decoded samples is obtained as (number of decoded samples in unit of MSB side bits, N)×(number of runs of run-length process in unit of predetermined number of bytes+1)=4×(0+1)=4.

On the other hand, LSB side encoded data are stored in the LSB side output memory 37 whenever LSB side bits have been decoded for example for one pixel (see the right-side sequence shown in FIG. 28B).

The data combining section 38 connects bit sequence "10101010" in the unit of MSB side bits, namely two bits "10", "10", "10", and "10" stored in the MSB side output memory 34 and corresponding LSB side bits for one pixel, namely eight bits, for the number of decoded samples stored in the LSB side output memory 37, combines MSB side bits and LSB side bits, and obtains pixel data for the number of decoded samples, namely four pixels (see FIG. 53C).

Next, the decoding process for MSB side encoded data of bit sequence "011010101" as exemplified in FIG. 54A will be described. In this example shown in FIG. 54A, for the bit sequence, the run-length process has not been performed in the unit of MSB side bits and the run-length process has not been performed in the unit of a predetermined number of bytes.

At step S80 in the flow chart shown in FIG. 49, one bit is read from the beginning of the bit sequence and thereby the first flag is obtained. Since the value of the first flag is "0", it denotes that the run-length process has not been performed in the MSB side bits (decoding procedure (1) shown in FIG. 54B). Since the value of the first flag is "0", the determined result at step S82 denotes that the run-length process has not been performed in the unit of MSB side bits. In this case, the flow advances to step S88. At step S88, bit sequence "11010101" for a predetermined number of bytes, preceded by the first flag, is output (decoding procedure (2) shown in FIG. 54B).

After decoding procedure (1) and decoding procedure (2) have been completed, the process in the unit of the data structure of output data on the MSB side shown in FIG. 41 has been completed. At this point, since the number of decoded samples has been obtained, the LSB side encoded data are decoded on the basis of the number of decoded samples.

The combining process for decoded MSB side bits and decoded LSB side bits performed by the data combining section 38 is nearly the same as the combining process described with reference to FIG. 51A to FIG. 51 and FIG. 53A to FIG. 53C. In other words, as exemplified in FIG. 55A to FIG. 55C, MSB side encoded data (3) shown in FIG. 55A is processed as described with reference to FIG. 54A and FIG. 54B. As a result, bit sequence "11010101" for a predetermined number of bytes, preceded by the first flag, is obtained (see the left-side sequence shown in FIG. 55B) and the bit sequence is stored in the MSB side output memory 34.

In this example, since the run-length process has not been performed in the unit of a predetermined number of bytes, the determined result at step S132 in the flow chart shown in FIG. 23 denotes that "4" as the number of repetitions of MSB side bits becomes the number of decoded samples N.

On the other hand, LSB side encoded data are stored in the LSB side output memory 37 whenever LSB side bits have been decoded for example for one pixel (see the right-side sequence shown in FIG. 55).

The data combining section 38 connects bit sequence "11010101" in the unit of MSB side bits, two bits, namely "11", "01", "01", and "01", stored in the MSB side output memory 34 and corresponding LSB side bits for one pixel, namely eight bits, for the number of decoded samples stored in the LSB side output memory 37, combines MSB side and LSB side bits, and obtains pixel data for the number of decoded samples (see FIG. 55C).

2-2-2. Decoding Process According to First Modification of Second Embodiment

Next, an example of a decoding process according to a first modification of the second embodiment of the present invention corresponding to the encoding process of which in the condition that the position of the second flag that denotes whether a bit sequence of a predetermined number of bytes is repeated is changed in output data, only when the second flag is necessary, it is added, output data of one output system is separated into LSB side encoded data and MSB side encoded data will be described.

In the first modification of the second embodiment, since the decoding apparatus 2B that performs the decoding process according to the first modification of the first embodiment can be applied as it is, detail description of the decoding apparatus will be omitted. In the following description, a predetermined number of bytes is one byte.

2-2-2-2. Decoding Process

An overall flow and a decoding process for LSB side encoded data in the decoding process according to the first modification of the second embodiment are the same as those in the decoding process according to the first modification of the first embodiment described with reference to FIG. 32 and FIG. 33. In the decoding process according to the first modification of the second embodiment, since the position of the second flag is changed, the decoding process for MSB side encoded data is changed. Next, with reference to flow charts shown in FIG. 32 and FIG. 33, the decoding process according to the first modification of the second modification will be described.

In other words, basically, as was described with reference to FIG. 32, at step S90, the number of bits of baseband pixel data that is encoded is set. At the next step, S91, encoded data that have been encoded in the encoding process shown in FIG. FIG. 6 to FIG. 8, FIG. 10 and of which output data of one output system have been separated into LSB side encoded data and MSB side encoded data and output according to the first modification of the second embodiment is read for example through a file and stored in the input memory 30B.

At the next step S92, the memory control section 31 obtains LSB side encoded data length information. At step S93, the LSB side encoded data are decoded according to the flow chart shown in FIG. 33. At step S94, encoded data stored in the input memory 30 is read from the position represented by the encoded data length information and MSB side encoded data are decoded according to a flow chart shown in FIG. 56 that will be described later.

After LSB side encoded data and MSB side encoded data have been completed for one frame at step S93 and step S94, respectively, the flow advances to step S95. At step S95, the data combining section 38 combines baseband LSB side bits decoded at step S93 and baseband MSB side bits decoded at step S94 and restores pixel data for one frame.

Figure 56:
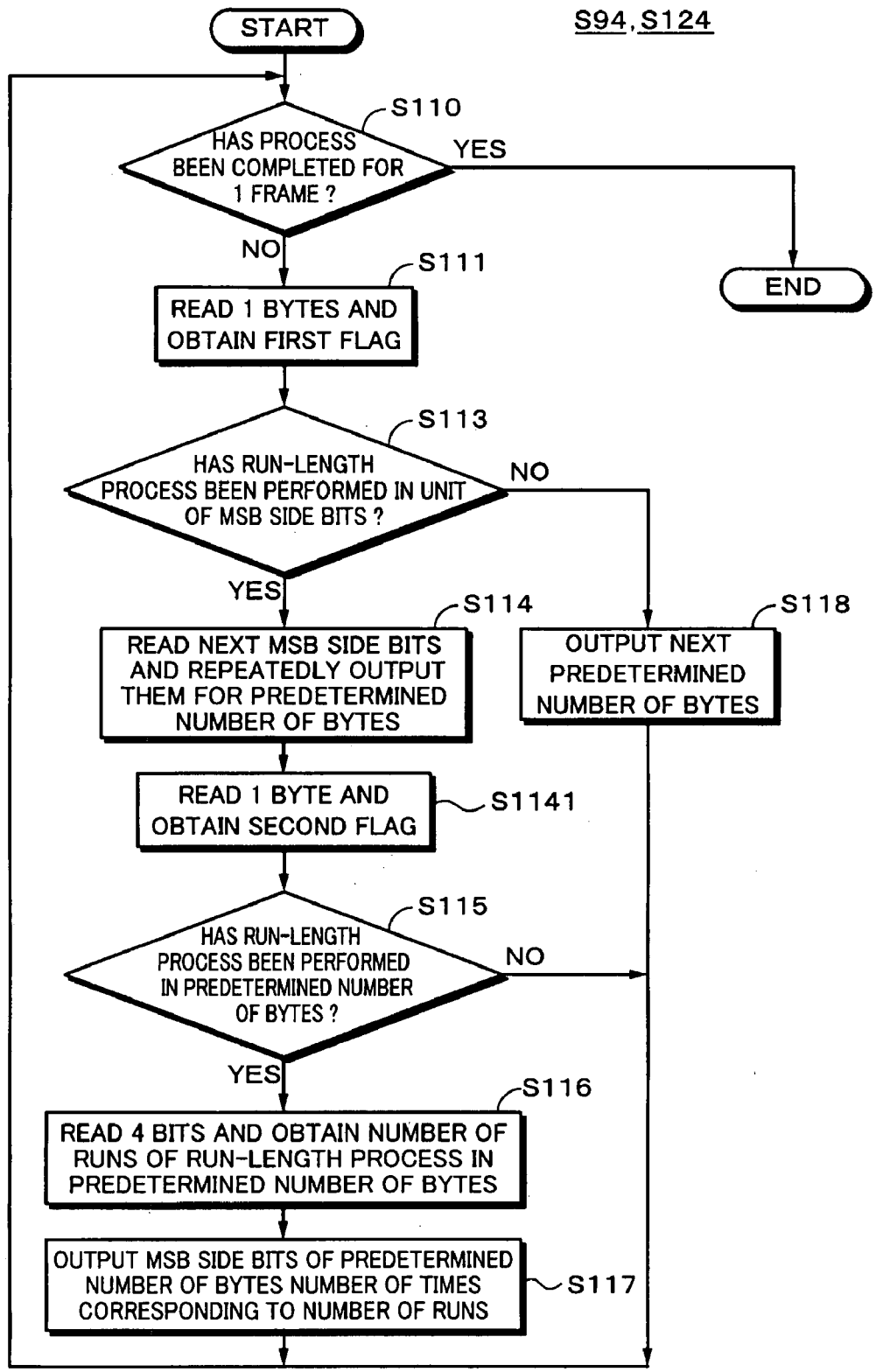
FIG. 56 is a flow chart showing an example of a decoding process according to the first modification of the second embodiment of the present invention.

FIG. 56 is a flow chart showing an example of the decoding process for MSB side bits according to the first modification of the second embodiment. In the flow chart shown in FIG. 56, in the decoding process according to the first modification of the first embodiment described with reference to FIG. 34, the position of the step of obtaining the second flag is changed. In other words, after the value of the first flag is determined, the second flag is obtained.

In other words, in the flow chart shown in FIG. 56, when the determined result at step S110 denotes that the decoding process has not been completed for one frame, the flow advances to step S111. At step S111, with reference to the data structure of the output data on the MSB side described with reference to FIG. 41, one bit is read from the beginning of the bit sequence and thereby the first flag is obtained by the first stage decoding section 32. At the next step, S113, it is determined whether or not the run-length process has been performed in the unit of MSB side bits based on the value of the first flag. When the value of the first flag is "1", the determined result denotes that the run-length process has been performed in the unit of MSB side bits. In this case, the flow advances to step S114. At step S114, the next two bits of the first flag, namely the level of the run-length, is read by the first stage decoding section 32. The value of the two bits is repeatedly output for a predetermined number of bytes (in this example, one byte).

In contrast, when the value of the first flag is "0", the determined result denotes that the run-length process has not been performed in the unit of MSB side bits. In this case, the flow advances to step S118. At step S118, a predetermined number of bytes, namely one byte, preceded by the first flag, are read and output.

After the output of the level of the run-length has been completed at step S114, the flow advances to the next step, S1141. At step S1141, the next one bit preceded by the level of the run-length is read. The second flag is obtained by the second stage decoding section 33. At the next step, S115, it is determined whether or not the run-length process has been performed in the unit of a predetermined number of bytes on the basis of the value of the second flag.

When the value of the second flag is "1", the determined result denotes that the run-length process has been performed in the unit of a predetermined number of bytes. In this case, the flow advances to step S116. At step S116, the next four bits preceded by the second flag are read and thereby the number of runs of the run-length process in the unit of a predetermined number of bytes is obtained. At the next step, S117, the second stage decoding section 33 repeatedly outputs the data for the predetermined number of bytes output from the first stage decoding section 32 the number of times corresponding to the number of runs.

2-2-2-3. Specific Example of Decoding Process

Next, with reference to the flow charts shown in FIG. 32, FIG. 33, and FIG. 56, and with reference to FIG. 57A and FIG. 57B, a specific example of the decoding process according to the first modification of the second embodiment will be described. In this example, it is assumed that the number of quantizer bits of pixel data is 10 bits, a predetermined number of bytes is one byte, and the encoding process has been performed in the unit of one byte.

Next, the decoding process for MSB side encoded data of bit sequence "100100111100011010101 . . ." exemplified in FIG. 57A will be described.

At step S111 in the flow chart shown in FIG. 56, one bit is read from the beginning of the bit sequence and thereby the first flag is obtained. Since the value of the first flag is "1", it denotes that the run-length process has been performed in the unit of MSB side bits (decoding procedure (1) shown in FIG. 57B). Since the value of the first flag is "1", the determined result at step S113 denotes that the run-length process has been performed in the unit of MSB side bits. In this case, the flow advances to step S114. At step S114, bit sequence "00" of two bits, which represents the level of the run-length, preceded by the first flag, is read. Bit sequence "00" of two bits is repeated four times and thereby bit sequence "00000000" of a predetermined number of bytes is output (decoding procedure (2) shown in FIG. 57B).

Since the value of the first flag is "1", the next one bit of the level of the run-length becomes the second flag. At the next step, S1141, the next one bit of the level of the run-length is read and thereby the second flag is obtained. Since the value of the second flag is "1", it denotes that the run-length process has been performed in the unit of a predetermined number of bytes (decoding procedure (3) shown in FIG. 57B). At step S115, it is determined that the run-length process have been performed in the predetermined number of bytes based on the value of the second flag. At step S116, bit sequence "0011" of four bits, which represents the number of runs of the run-length, is read. Since the bit sequence denotes that the number of runs is "3", bit sequence "00000000" that has been immediately previously output is repeatedly output three times (decoding procedure (4) shown in FIG. 57).

Thereafter, the flow returns to step S110. At step S110, since the process has not been performed for one frame, the flow advances to step S111. At step S111, the next one bit of bit sequence "0011" of four bit, which represents the number of runs of the run-length, is read and thereby the first flag is obtained. In the example shown in FIG. 57A, since the value of the first flag is "1", it denotes that the run-length process has been performed in the unit of MSB side bits (decoding procedure (5) shown in FIG. 57B). At step S113, it is determined that the run-length process have been performed in the unit of MSB side bits based on the value of the first flag. Bit sequence "10" of two bits, which represents the level of the run-length, preceded by the first flag, is read and bit sequence "10" is repeated four times (at step S114). As a result, bit sequence "10101010" of a predetermined number of bytes is output (decoding procedure (6) shown in FIG. 57B).

Since the value of the first flag is "1", the next one bit of the level of the run-length becomes the second flag. At the next step, S1411, the next one bit of the level of the run-length is read and thereby the second flag is obtained. Since the value of the second flag is "0", it denotes that the run-length process has not been performed in the unit of a predetermined number of bytes (decoding procedure (7) shown in FIG. 57B). Since the value of the second flag is "0", the determined result at the next step, S115, denotes that the run-length process has not been performed in the unit of a predetermined number of bytes. In this case, the flow returns to step S110.

Since the process has not been completed for one frame, the flow advances from step S110 to step S111. At step S111, the next one bit of the second flag is read and thereby the first flag is obtained. In the example shown in FIG. 57A, since the value of the first flag is "0", it denotes that the run-length process has not been performed in the unit of MSB side bits. Thus, at the next step, S113, it is determined that the run-length process have not been performed in the unit of MSB side bits on the basis of the value of the first flag. Thereafter, the flow advances to step S118. At step S118, a predetermined number of bytes preceded by the first flag are read and bit sequence "11010101" of the predetermined number of bytes is output.

The foregoing process is repeated for pixels of one frame, for example until the last bit of the encoded data stored in the input memory 30 has been read.

The combining process for decoded baseband LSB side bits and decoded baseband MSB side bits is the same as that according to the first modification of the first embodiment described with reference to FIG. 36A to FIG. 36C. Thus, to prevent redundancy, detail description of the combining process will be omitted.

2-2-3. Decoding Process According to Second Modification of Second Embodiment

Next, an example of a decoding process according to a second modification of the second embodiment of the present invention corresponding to the encoding process of which in the condition that the position of the second flag that denotes whether or not a bit sequence of a predetermined number of bytes is repeated is changed on output data, only when the second flag is necessary, it is added, encoded LSB side bits and encoded MSB side bits are independently output will be described.

In the second modification of the second embodiment, the decoding apparatus 2C that performs the decoding process according to the second modification of the first embodiment can be applied as it is, detail description of the decoding apparatus will be omitted. In the following description, a predetermined number of bytes is one byte.

An overall flow and a decoding process for LSB side encoded data of the decoding process according to the second modification of the second embodiment is the same as those of the decoding process according to the second modification of the first embodiment described with reference to FIG. 38 and FIG. 33. In the decoding process according to the second modification of the first embodiment, since the position of the second flag is changed, the decoding process for MSB side encoded data is changed. Next, with reference to the flow charts shown in FIG. 38 and FIG. 33, the decoding process according to the second modification of the second embodiment will be described.

In other words, basically, as was described with reference to FIG. 38, at step S20, the number of bits of baseband pixel data that is encoded is set. At step S121, LSB side encoded data that have been encoded in the encoding process described with reference to FIG. 6 to FIG. 8, FIG. 10, and FIG. 42 are read for example through a file and stored in the MSB side input memory 30A. Likewise, at step S134, MSB side encoded data that has been encoded in the encoding process are read for example through a file and stored in the MSB side input memory 30A.

At step S122, the LSB side encoded data stored in the input memory 30B are decoded according to the flow chart shown in FIG. 56. After the LSB side encoded data and the MSB side encoded data have been decoded for one frame at step S122 and step S124, respectively, the flow advances to step S125. At step S125, the data combining section 38 combines baseband LSB side bits decoded at step S122 and baseband MSB side bits decoded at step S124 and restores pixel data for one frame.

The combining process for the baseband LSB side bits and baseband MSB side bits decoded by the data combining section 38 is the same as that according to the first modification of the first embodiment described with reference to FIG. 36.

Thus, to prevent redundancy, detail description of the combining process will be omitted.

2-2-4. Decoding Process According to Third Modification of Second Embodiment

Next, an example of a decoding process according to a third modification of the second embodiment of the present invention corresponding to the encoding process of which in the condition that the position of the second flag that denotes whether or not a bit sequence of a predetermined number of bytes is repeated is changed, only when the second flag is necessary, it is added, a predetermined number of bytes is two bytes and the run-length process is performed in the unit of MSB side bits for two bytes will be described.

In the decoding process according to third modification of the second embodiment, the decoding apparatus 2A (see FIG. 20) corresponding to the encoding apparatus 1A according to the first embodiment can be applied as it is. In addition, the overall flow and a decoding process for LSB side encoded data according to the first embodiment described with reference to FIG. 21, FIG. 23, and FIG. 24 can be applied as they are. In addition, the decoding process for MSB side encoded data according to the second embodiment described with reference to FIG. 49 can be nearly applied. Thus, to prevent redundancy, these detail description will be omitted. In the following description, a predetermined number of bytes is two bytes.

Since the decoding process for LSB side encoded data is the same as the decoding process for LSB side encoded data of which LSB side bits of a bit sequence of one byte have been encoded, description of this decoding process will be omitted.

FIG. 58A and FIG. 58B and FIG. 59A and FIG. 59B show an example of decoding procedures of the decoding process according to the third modification of the second embodiment. Next, with reference to FIG. 58A to FIG. 59B and the flow chart shown in FIG. 49, the decoding process according to the third modification of the second embodiment will be described. In this example, it is assumed that the output format of encoded data is interleaved data of MSB side encoded data and LSB side encoded data according to the first embodiment described with reference to FIG. 12.

Next, the decoding process for MSB side encoded data of bit sequence "10010001" exemplified in FIG. 58A will be described. In the bit sequence shown in FIG. 58A, the run-length process has been performed in the unit of MSB side bits and the run-length process has been performed in the unit of a predetermined number of bytes.

First of all, at step S80 in the flow chart shown in FIG. 49, one bit is read from the beginning of the bit sequence and thereby the first flag is obtained. In the example shown in FIG. 58A, since the value of the first flag is "1", it denotes that the run-length process has been performed in the unit of MSB side bits (decoding procedure (1) shown in FIG. 58B). Since the value of the first flag is "1", the determined result at step S82 shown in FIG. 49 denotes that the run-length process has been performed in the unit of MSB side bits. In this case, the flow advances to step S83 shown in FIG. 49. At step S83, bit sequence "00" of two bits, which represents the level of the run-length, preceded by the first flag is read and the bit sequence is repeatedly for the length of a predetermined number of bytes. In the example shown in FIG. 58A, bit sequence "00" of two bits, which represents the level of the run-length, is repeated eight times. As a result, bit sequence "0000000000000000" is output (decoding procedure (2) shown in FIG. 58B).

Since the value of the first flag is "1", the flow advances to step S831 shown in FIG. 49. At step S831, the next one bit of the level of the run-length becomes the second flag. At the next step, S831, the next one bit of the level of the run-length is read and thereby the second flag is obtained. Since the value of the second flag is "1", it denotes that the run-length process has been performed in the unit of two bytes (decoding procedure (3) shown in FIG. 58B). Since the value of the second flag is "1", the determined result at step S84 denotes that the run-length process has been performed in the unit of two bytes. In this case, the flow advances to step S85. At step S85, bit sequence "0001" of four bits, which represents the number of runs of the run-length, preceded by the second flag is read. Since the bit sequence denotes that the number of runs is "1", bit sequence "0000000000000000" that has been immediately previously output is repeated one time and output (decoding procedure (4) shown in FIG. 58B).

After decoding procedure (1) to decoding procedure (4) have been completed, the process in the unit of the data structure of output data on the MSB side shown in FIG. 47 has been completed. At this point, since the number of decoded samples is obtained, the LSB side encoded data are decoded based on the number of decoded samples.

Next, the decoding process for MSB side encoded data of bit sequence "01010101011010101" exemplified in FIG. 59A will be described. In the bit sequence shown in FIG. 59A, the run-length process has not been performed in the unit of MSB side bits and the run-length process has not been performed in the unit of a predetermined number of bytes.

First of all, at step S80 of the flow chart shown in FIG. 49, one bit is read from the beginning of the bit sequence and thereby the first flag is obtained. Since the value of the first flag is "0", it denotes that the run-length process has not been performed in the unit of MSB side bits (decoding procedure (1) shown in FIG. 59B). Since the value of the first flag is "0", the determined result at step S82 denotes that run-length process has not been performed in the unit of MSB side bits. In this case, the flow advances to step S88. At step S88, bit sequence "1010101011010101" of a predetermined number of bytes, preceded by the first flag, is output (decoding procedure (2) shown in FIG. 59B).

After decoding procedure (1) and decoding procedure (2) have been completed, the process in the unit of the data structure of output data on the MSB side shown in FIG. 47 has been completed. At this point, since the number of decoded samples is obtained, the LSB side encoded data are decoded based on the number of decoded samples. In this example, since the run-length process has not been performed in the unit of two bytes, the determined result at step S132 of the flow chart shown in FIG. 23 denotes that "8" as the number of repetitions of MSB side bits is the number of decoded samples N.

After the LSB side encoded data have been decoded and baseband LSB side bits have been stored in the LSB side output memory 37, the data combining section 38 performs the combining process for MSB side bits and LSB side bits. The combining process is performed whenever LSB side bits have been decoded for one pixel.

In the decoding process according to the third modification of the second embodiment, any of the output format of the second embodiment of which MSB side encoded data and LSB side encoded data are interleaved and the output format of the first modification of the second embodiment of which one output sequence is separated into LSB side bits and MSB side bits can be applied. In this case, the decoding apparatus 2B shown in FIG. 31 is used for the decoding process and the decoding process based on the flow charts shown in FIG. 32, FIG. 33, and FIG. 56 is performed.

Likewise, in the decoding process according to the third modification of the second embodiment, the output format of the second modification of the second embodiment of which LSB side encoded data and MSB side encoded data are independently output can be applied. In this case, the decoding apparatus 2C shown in FIG. 37 is used for the decoding process and the decoding process based on the flow charts shown in FIG. 38, FIG. 33, and FIG. 56 is performed.

When the encoding process is performed in the unit of three bytes or a data length larger then three bytes, the decoding process according to the third modification of the second embodiment can be applied.

3. Hardware Structure Applicable Both to First Embodiment and Second Embodiment 3-1. Example of Hardware Structure Next, with reference to FIG. 60, a hardware structure applicable both to the encoding apparatuses 1A, 1B, and 1C and decoding apparatuses 2A, 2B, and 2C according to the first embodiment and the second embodiment will be described. As exemplified in FIG. 60, the encoding apparatuses 1A, 1B, and 1C and the decoding apparatuses 2A, 2B, and 2C can be accomplished by the same structure as a computer device.

A bridge 201 controls data to be transferred to a CPU 203, a random-access memory (RAM) 204, and a graphic processing unit (GPU) 205. The RAM 204 is used as a work memory for the CPU 203. The GPU 205 generates and outputs a display signal that causes a display unit 208 to display data according to a display control command supplied from the CPU 203.

A bridge 202 connected to the bridge 201 through a bus 209 controls data to be transferred to a hard disk drive (HDD) 206, a universal serial bus (USB) interface (I/F) 207, and a bus 212. An Institute Electrical and Electronics Engineer (IEEE) 1394 standard based interface may be connected to the bridge 202. The hard disk drive 206 records program and data that cause the CPU 203 to operate. In addition, the hard disk drive 206 can record data generated by the CPU 203 and data supplied from the outside through each interface. In addition, the hard disk drive 206 can, be used as a work memory for the CPU 203.

The bus 212 is for example a peripheral component interconnect (PCI) bus and is connected to an input interface (I/F) 210 and a drive device 211. Connected to the input I/F 210 are a pointing device, such as a mouse 213, and a keyboard 214. The mouse 213 and keyboard 214 output a signal corresponding to an input operation that the user performs. The drive device 211 reproduces data from a record medium such as a Compact Disc-Read Only Memory (CD-ROM) or a Digital Versatile Disc-ROM (DVD-ROM). As the drive device 211, a device corresponding to a rewritable record medium such as a Compact Disc-Recordable (CD-R), a Compact Disc-Re-Writable (CD-RW), a DVD Recordable (DVD-R), a DVD Re-recordable (DVD-RW), a DVD+R format (DVD+R), a DVD+RW format (DVD+RW), or a Blu-ray Disc may be used.

A video I/F 220 is also connected to the bus 212. The video I/F 220 inputs and outputs for example baseband digital video data.

A communication I/F 215 can be connected to the bus 212 to communicate with an external device. The communication I/F 215 communicates with an external device according to a predetermined protocol such as Transmission Control Protocol/Internet Protocol (TCP/IP) to exchange data with the external device.

The CPU 203 executes a predetermined process with the RAM 204 as a work memory according to a program recorded in the hard disk drive 206, generates various types of commands and data, and supplies the generated commands and data to each section of the apparatus. In addition, data generated in each section of the apparatus are supplied to the CPU 203.

3-2. Example of Application to Encoding Process

The structures of the encoding apparatuses 1A, 1B, and 1C are composed as software that is executed on the CPU 203 according to a program. For example, in the encoding apparatus 1A described with reference to FIG. 1, as the input data memory 10, the output data memory 15, the LSB side data memory 12, and the MSB side data memory 16, predetermined regions of the RAM 204 can be used. Instead, as the input data memory 10, the output data memory 15, the LSB side data memory 12, and the MSB side data memory 16, predetermined regions of the hard disk drive 206 may be used. The data separation section 11, the DPCM section 13, the Huffman encoding section 14, and the first stage run-length process section 17 and the second stage run-length process section 18, which encode MSB side bits can be structured as software that is executed on the CPU 203.

Next, an example of the encoding process for picture data that such an apparatus performs will be described in brief. Baseband digital video data to be encoded are supplied from the outside to the video I/F 220. The digital video data supplied to the video I/F 220 are recorded for example in the hard disk drive 206. The CPU 203 reads digital video data from the hard disk drive 206 in the unit of a frame and transfers the digital video data to the RAM 204. The digital video data are stored in a first region of the RAM 204 assigned as the input data memory 10.

The digital video data may be supplied from the USB I/F 207 or the communication I/F 215. In addition, baseband digital video data may be reproduced from the drive device 211 and supplied to the apparatus.

The CPU 203 reads digital video data for one frame stored in the first region of the RAM 204 corresponding to pixels arranged for example horizontally and rightwardly in each line on the screen starting from the upper left corner. When the digital video data are composed of pixel data of R, G, and B colors, the digital video data are read for each color. The CPU 203 encodes the pixel data by the encoding method according to the first embodiment, the first modification of the first embodiment, the second modification of the first embodiment, the third modification of the first embodiment, the second embodiment, the first modification of the second embodiment, the second modification of the second embodiment, or the third modification of the second embodiment.

For example, in the encoding apparatus 1A according to the first embodiment, the CPU 203 separates read pixel data into eight LSB side bits and the remaining MSB side bits excluding the eight LSB side bits. It is assumed that the number of quantizer bits of pixel data has been input for example from the keyboard 214 and has been set. The CPU 203 performs the encoding process for the LSB side bits by DPCM encoding process and Huffman encoding process and stores LSB side encoded data in the second region assigned in the output data memory 15 of the RAM 204 in a predetermined manner. Likewise, the CPU 203 performs the encoding process for MSB side bits by the run-length process in the unit of MSB side bits and the run-length process in the unit of a predetermined number of bytes and stores MSB side encoded data in the second region of the RAM 204 in a predetermined manner.

After the encoding process has been completed for one frame, the encoded data are read from the second region of the RAM 204 and output. For example, the encoded data that are read from the RAM 204 are temporarily recorded in the hard disk drive 206. The encoded data recorded in the hard disk drive 206 are output to the outside through the USB I/F 207 or the communication I/F 215. Instead, encoded data that are read from the hard disk drive 206 may be recorded to a recordable record medium loaded into the drive device 211.

When the CPU 203 can execute a plurality of such processes in parallel, the CPU 203 can perform the encoding process for LSB side bits and the encoding process for MSB side bits in parallel. In addition, in this case, the CPU 203 can process pixel data of R, G, and B colors in parallel. For example, it is thought that processes of the CPU 203 are time-division controlled according to a program so that the CPU 203 executes processes for MSB side bits, LSB side bits, and pixel data of R, G, and B colors in individual time-divided threads.

3-3. Example of Application to Decoding Process

The foregoing structure applies to the decoding apparatuses and decoding processes. In other words, the decoding apparatuses 2A, 2B, and 2C are structured as software that is executed on the CPU 203 according to a program. For example, in the decoding apparatus 2A described with reference to FIG. 20, as the input memory 30, the MSB side output memory 34, and the LSB side output memory 37, predetermined regions of the RAM 204 are used. Instead, as the input memory 30, the MSB side output memory 34, and the LSB side output memory 37, predetermined regions of the hard disk drive 206 may be used. The memory control section 31 corresponds to the bridge 201. The function of the memory control section 31 may be accomplished as software that is executed on the CPU 203. The first stage decoding section 32 and the second stage decoding section 33, which decode MSB side encoded data, and the Huffman decoding section 35 and the DPCM decoding section 36, which decode LSB side encoded data, and the data combining section 38, which combines decoded LSB side bits and decoded MSB side bits, are structured as software that is executed on the CPU 203.

Next, an example of the decoding process for encoded data of which picture data have been encoded that such an apparatus performs will be described in brief. Encoded data to be decoded are supplied to the apparatus for example through the USB I/F 207 and recorded in the hard disk drive 206. Instead, encoded data may be supplied from the communication I/F 215. When the drive device 211 reproduces encoded data from a record medium, the encoded data may be supplied to the apparatus.

When MSB side encoded data and LSB side encoded data are supplied as data of one system, they are recorded as one file in the hard disk drive 206. In contrast, when MSB side encoded data and LSB side encoded data are independently supplied, two files for the MSB side encoded data and LSB side encoded data are recorded in the hard disk drive 206. In this example, it is assumed that encoded data are stored in one file (or two files). The CPU 203 reads encoded data from the hard disk drive 206 and transfers them to the RAM 204. The encoded data are stored in the first region of the RAM 204 assigned as the input memory 30.

The CPU 203 reads encoded data from the first region of the RAM 204 and decodes them on the basis of the encoding method of the encoded data according to the first embodiment, the first modification of the first embodiment, the second modification of the first embodiment, the third modification of the first embodiment, the second embodiment, the first modification of the second embodiment, the second modification of the second embodiment, or the third modification of the second embodiment. In this example, it is assumed that the encoding method for the encoded data is known.

For example, in the process of the decoding apparatus 2A according to the first embodiment, the CPU 203 sends a read request to the bridge 201 to read MSB side encoded data and LSB side encoded data from the first region in the unit of a bit in a predetermined manner. The CPU 203 performs the decoding process corresponding to the run-length process in the unit of MSB side bits and the run-length process in the unit of a predetermined number of bytes for the MSB side encoded data that have been read from the RAM 204 and stores the decoded MSB side bits to the second region of the RAM 204 assigned as the MSB side output memory 34. Likewise, the CPU 203 performs the Huffman code decoding process and the DPCM decoding process for LSB side encoded data that have been read from the RAM 204 and stores the decoded LSB side bits in the third area of the RAM 204 assigned as the LSB side output memory 37.

After the decoding process has been completed for example for one frame, the CPU 203 reads the decoded MSB side bits and the decoded LSB side bits from the second region and the third region of the RAM 204, respectively, and performs the combining process for them. The decoded pixel data of which the original number of quantizer bits have been restored are temporally recorded in the hard disk drive 206. The restored pixel data are output from the hard disk drive 206 to the outside through the USB I/F 207 or the communication I/F 215. Instead, decoded pixel data read from the hard disk drive 206 may be recorded to a recordable record medium loaded into the drive device 211.

When the CPU 203 can execute a plurality of such processes in parallel, the CPU 203 can perform the decoding process for LSB side encoded data and MSB side encoded data in parallel. In addition, the CPU 203 can perform processes for encoded data of which pixel data of R, G, and B colors have been encoded in parallel.

Figure 60:
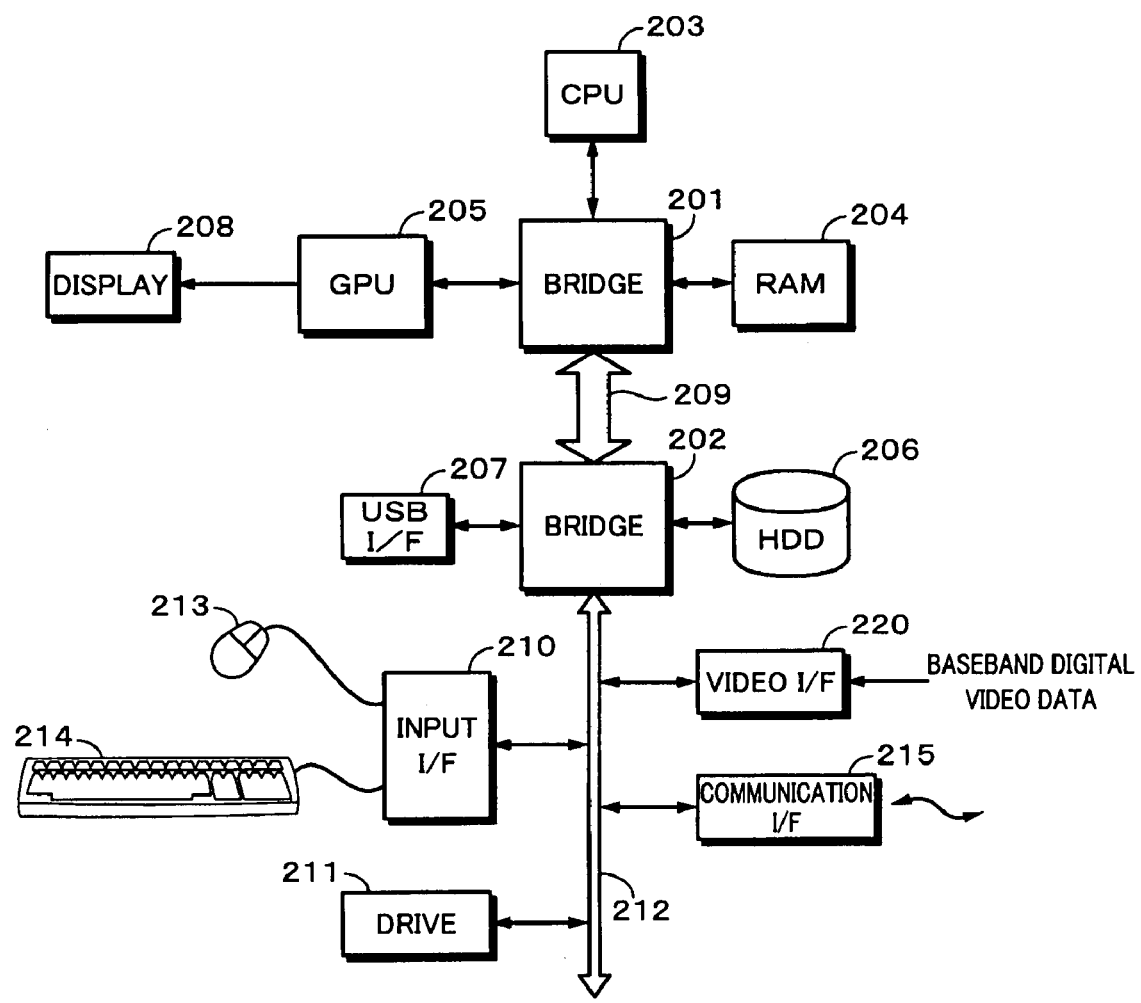
FIG. 60 is a block diagram showing an example of the hardware structure according to both the first embodiment and the second embodiment of the present invention.

In the foregoing, the encoding method and the decoding method according to the first embodiment, the first modification of the first embodiment, the second modification of the first embodiment, the third modification of the first embodiment, the second embodiment, the first modification of the second embodiment, the second modification of the second embodiment, or the third modification of the second embodiment are executed by hardware that has the same structure as the computer device shown in FIG. 60. Instead, the encoding apparatus and the decoding apparatus may have independent hardware components that execute individual functions and the CPU may totally control their operations.

4. Third Embodiment of Present Invention
(Hardware Structure Having Plurality of CPUs)

Next, a third embodiment of the present invention will be described. In the third embodiment, the encoding method and the decoding method according to the first embodiment, the first modification of the first embodiment, the second modification of the first embodiment, the third modification of the first embodiment, the second embodiment, the first modification of the second embodiment, the second modification of the second embodiment, or the third modification of the second embodiment are executed by a plurality of CPU cores that can independently operate.

4-1. Example of Hardware Structure

Figure 61:
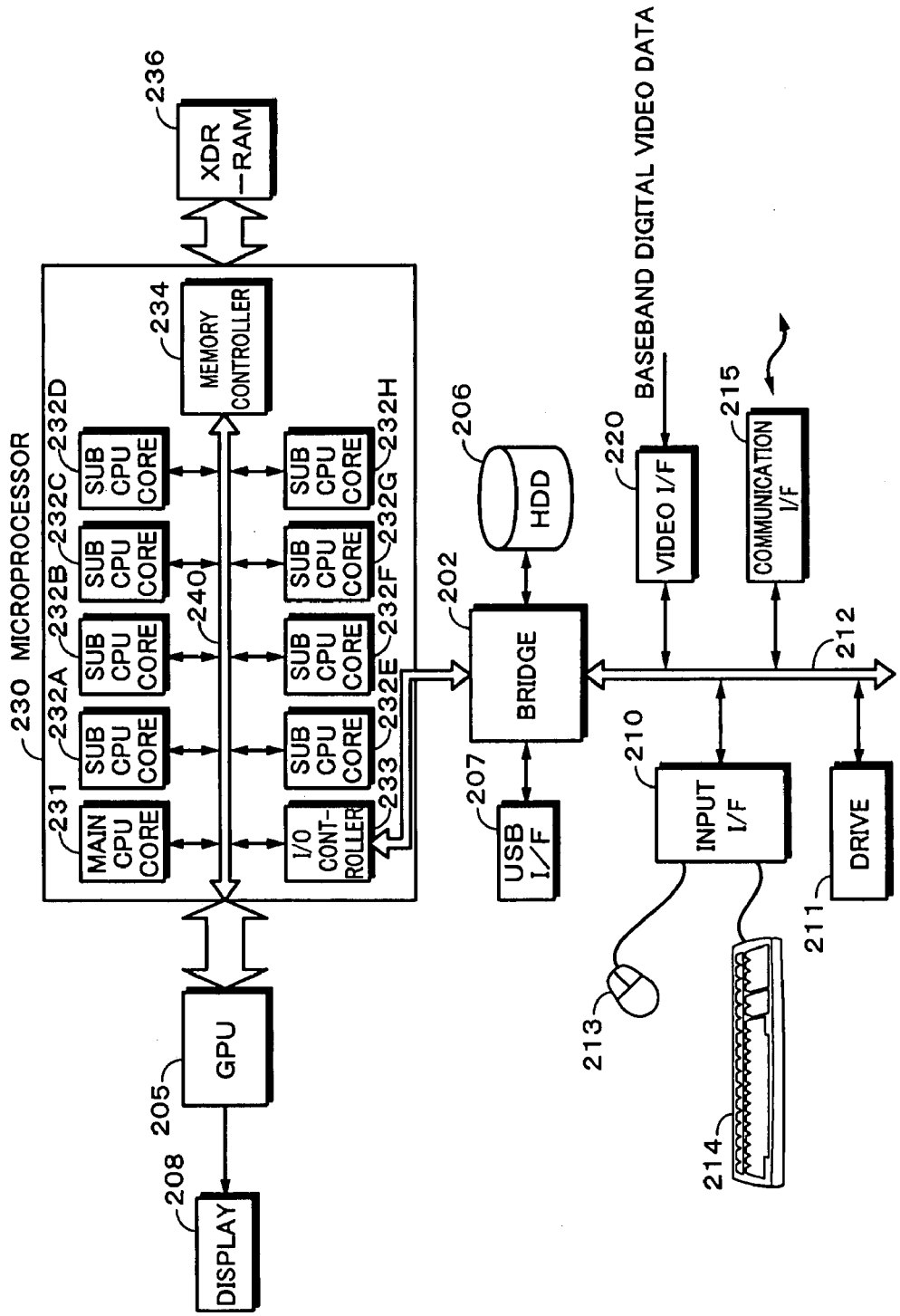
FIG. 61 is a block diagram showing an example of the hardware structure according to a third embodiment of the present invention.

FIG. 61 shows an example of the hardware structure according to the third embodiment of the present invention. The hardware structure exemplified in FIG. 61 can be applied to all the encoding apparatuses 1A, 1B, and 1C and the decoding apparatuses 2A, 2B, and 2C according to the first embodiment and the second embodiment.

In the structure shown in FIG. 61, similar sections to those in FIG. 60 will be denoted by similar reference numerals and their detail description will be omitted.

As shown in FIG. 61, in the hardware structure according to the third embodiment of the present invention, a microprocessor 230 has a plurality of CPU cores 231 and 332A to 232H, an input/output (I/O) controller 233, and a memory controller 234 that are connected through an internal bus 240. The CPU core 231 is referred to as a main CPU core, whereas the CPU cores 232A to 232H are referred to as sub CPU cores. In FIG. 61, the microprocessor 230 has eight sub CPU cores 232A to 232H. However, the third embodiment is not limited to such an example. Instead, the microprocessor 230 may have more than eight sub CPU cores. Instead, the microprocessor 230 may have smaller than eight sub CPU cores.

The main CPU core 231 execute a basic program such as an operating system (OS). The eight sub CPU cores 232A to 232H connected to the main CPU core 231 through the internal bus 240 are for example Reduced instruction Set Computer (RISC) type signal processors. While the main CPU core 231 and the sub CPU cores 232A to 232H are communicating with each other through the internal bus 240, they can operate in parallel.

The I/O controller 233 is connected to the bridge 202 and controls signals that are input and output to and from the main CPU core 231, the sub CPU cores 232A to 232H, and the bridge 202. The memory controller 234 controls the microprocessor 230 to access an Extreme Data Rate (XDR)-RAM 236. The XDR-RAM 236 is used as a work memory for the microprocessor 230. The XDR-RAM 236 is a RAM having a very high data transfer rate that allows the plurality of CPU cores of the microprocessor 230 to access the XDR-RAM 236.

In such a structure, the eight sub CPU cores 232A to 232H can independently perform an encoding process or a decoding process. The main CPU core 231 executes processes other than those that the sub CPU cores 232A to 232H perform. For example, the main CPU core 231 controls the sub CPU cores 232A to 232H and performs processes for signals that are input from the bridge 202 through the I/O controller 233.

4-2. Example of Application to Encoding Process

The encoding apparatuses 1A, 1B, and 1C are structured as software that is executed on the microprocessor 230 according to a program. For example, in the encoding apparatus 1A described with reference to FIG. 1, as the input data memory 10, the output data memory 15, the LSB side data memory 12, and the MSB side data memory 16, predetermined regions of the XDR-RAM 236 are used. Instead, as these memories, predetermined regions of the hard disk drive 206 may be used.

As was described above, since the sub CPU cores 232A to 232H can independently operate, when independently executable encoding processes are distributively assigned to the sub CPU cores 232A to 232H, the encoding process can be performed at high speed. The processes can be assigned to the sub CPU cores 232A to 232H according to a program.

For example, after pixel data have been separated by the data separation section 11, the encoding process for LSB side bits and the encoding process for MSB side bits can be independently performed. In addition, encoding processes for pixel data of R, G, and B colors can be also independently performed. When each region into which a screen is divided is encoded, each of the divided regions can be independently encoded.

The sub CPU cores 232A to 232H are assigned to independently executable processes. In the following description, it is assumed that sub CPU cores are assigned to processes for MSB side bits and LSB side bits of pixel data of R, G, and B colors.

Encoding processes for MSB side bits of pixel data of R, G, and B colors are assigned to the sub CPU cores 232A, 232B, and 232C, respectively. In other words, in each of the sub CPU core 232A, 232B, and 232C, processes performed by the first stage run-length process section 17 and the second stage run-length process section 18, which encode MSB side bits, are executed as software.

Likewise, encoding processes for LSB side bits of pixel data of R, G, and B colors are assigned to the sub CPU cores 232D, 232E, and 232F, respectively. In other words, in the sub CPU cores 232D, 232E, and 232F, processes performed by the DPCM section 13 and the Huffman encoding section 14, which perform the encoding process for LSB side bits, are executed as software.

The separation process in which the data separation section 11 separates pixel data into MSB side bits and LSB side bits can be performed by the main CPU core 231. Instead, this process may be assigned to for example the sub CPU core 232G or 232H to which the encoding process has not been assigned. In addition, the main CPU core 231 can supervise and control the encoding processes that the sub CPU cores 232A to 232H perform.

Next, the encoding process performed by the apparatus having the structure shown in FIG. 61 will be described in brief. Like the case described with reference to FIG. 60, baseband digital video data to be encoded are supplied from the outside to the video I/F 220 and recorded for example in the hard disk drive 206. The main CPU core 231 of the microprocessor 230 reads digital video data from the hard disk drive 206 in the unit of a frame and transfers the digital video data to the XDR-RAM 236. The digital video data are stored in the first region of the XDR-RAM 236 assigned as the input data memory 10.

Each of the sub CPU cores 232A to 232F reads digital video data for one frame stored in the first region of the XDR-RAM 236 corresponding to pixels arranged for example horizontally and rightwardly in each line on the screen starting from the upper left corner. For example, the sub CPU cores 232A to 232F send a read request to the memory controller 234 to read data that they process from the XDR-RAM 236. Corresponding to this request, the memory controller 234 reads data from the XDR-RAM 236 in a predetermined manner and supplies the data to the corresponding sub CPU cores 232A to 232F.

Each of the sub CPU cores 232A to 232F performs the encoding process for the supplied data in the encoding method according to the first embodiment, the first modification of the first embodiment, the second modification of the first embodiment, the third modification of the first embodiment, the second embodiment, the first modification of the second embodiment, the second modification of the second embodiment, or the third modification of the second embodiment. The sub CPU cores 232A to 232C and the sub CPU cores 232D to 232F can the encoding process in parallel.

For example, the sub CPU core 232A, which encodes MSB side bits of pixel data of R color, performs the run-length process in the unit of MSB side bits and the run-length process in the unit of a predetermined number of bytes for the supplied MSB side bits of pixel data of R color. The MSB side encoded data are written to a predetermined address of the second region assigned as the output data memory 15 of the XDR-RAM 236, for example an address assigned to the sub CPU core 232A, under the control of the memory controller 234.

As another example, the sub CPU core 232D, which encodes LSB side bits of pixel data of R color, performs the DPCM encoding process and the Huffman encoding process for the supplied LSB side bits of pixel data of R color. The LSB side encoded data are written to a predetermined address of the second region assigned as the output data memory 15 of the XDR-RAM 236, for example an address assigned to the sub CPU core 232D, under the control of the memory controller 234.

After the encoding process has been completed for one frame, encoded data are read from the second region of the XDR-RAM 236 and then output in a predetermined manner. For example, the encoded data that have been read from the XDR-RAM 236 are temporarily recorded in the hard disk drive 206 and then output to the outside through the USB I/F 207 or the communication I/F 215 or recorded on a recordable record medium loaded into the drive device 211.

As described above, according to the third embodiment, the plurality of sub CPU cores 232A to 232H perform the encoding process for picture data in a predetermined unit of picture data in parallel. Thus, according to the third embodiment, the encoding process can be performed at very high speed in comparison with the structure of which the process is performed by one CPU 203 described with reference to FIG. 60.

4-3. Example of Application to Decoding Process

The forgoing structure applies to the decoding apparatus and the decoding process. In other words, the decoding apparatuses 2A, 2B, and 2C are structured as software that is executed on the microprocessor 230 according to a program. For example, in the decoding apparatus 2A described with reference to FIG. 20, as the input memory 30, the MSB side output memory 34, and the LSB side output memory 37, predetermined regions of the XDR-RAM 236 are used. Instead, as these memories, predetermined regions of the hard disk drive 206 may be used.

As was described above, since the sub CPU cores 232A to 232H can independently operate, when independently executable encoding processes are distributively assigned to the sub CPU cores 232A to 232H, the decoding process can be performed at high speed.

For example, the decoding process for LSB side encoded data and MSB side encoded data can be independently performed. When pixel data of R, G, and B colors have been encoded, the decoding process for encoded data of R, G, and B colors can be independently performed. When divided regions of a screen have been encoded, encoded data of divided regions can be independently decoded.

Like the foregoing encoding process, the sub CPU cores 232A to 232H are assigned to such independently executable processes. These processes can be assigned to the sub CPU cores 232A to 232H according to a program. In the following description, it is assumed that sub CPU cores are assigned to LSB side encoded data and MSB side encoded data of which LSB side bits and MSB side bits of pixel data of R, G, and B colors have been encoded.

For example, the decoding processes for MSB side encoded data of which MSB side bits of pixel data of R, G, and B colors have been encoded are assigned to the sub CPU cores 232A to 232C. In other words, in the sub CPU cores 232A to 232C, the decoding processes for MSB side encoded data performed by the first stage decoding section 32 and the second stage decoding section 33 are executed as software.

Likewise, the decoding processes for LSB side encoded data of which LSB side bits of pixel data of R, G, and B colors have been encoded are assigned to the sub CPU cores 232D, 232E, and 232F. In other words, in the sub CPU cores 232D, 232E, and 232F, the decoding processes for LSB side encoded data performed by the Huffman decoding section 35 and the DPCM decoding section 36 are executed as software.

The memory controller 234 can control the control section 31 to read data from the input memory 30 and the data combining section 38 to perform the combining process for decoded MSB side bits and decoded LSB side bits under the control of the main CPU core 231. In addition, the main CPU core 231 can supervise and control the decoding processes that the sub CPU cores 232A to 232F perform.

Next, the decoding process for encoded data of picture data performed by the apparatus having the structure shown in FIG. 61 will be described in brief. Like the case described with reference to FIG. 60, encoded data to be decoded are supplied for example through the USB I/F 207, the communication I/F 215, or a record medium on which encoded data have been recorded, and recorded to the hard disk drive 206.

When MSB side encoded data and LSB side encoded data are supplied as one system, they are recorded as one file in the hard disk drive 206. On the other hand, when MSB side encoded data and LSB side encoded data are independently supplied, two files of MSB side encoded data and LSB side encoded data are recorded in the hard disk drive 206. For example, the main CPU core 231 reads encoded data from the hard disk drive 206 in the unit of for example a frame and transfers the encoded data to the XDR-RAM 236. The encoded data are stored in the first region of the XDR-RAM 236 assigned as the input memory 30.

The sub CPU cores 232A to 232F read encoded data from the first region of the XDR-RAM 236 in a predetermined manner and perform the decoding process for LSB side encoded data and MSB side encoded data based on the encoding method of the encoded data according to the first embodiment, the first modification of the first embodiment, the second modification of the first embodiment, the third modification of the first embodiment, the second embodiment, the first modification of the second embodiment, or the third modification of the second embodiment. It is assumed that the decoding method for encoded data is known.

When encoded data are read from the XDR-RAM 236, if MSB side encoded data and LSB side encoded data have been interleaved as in the first embodiment and the second embodiment, the XDR-RAM 236 is controlled as follows. In other words, the main CPU core 231 controls the sub CPU cores 232A to 232C, which decode MSB side encoded data, and sub CPU cores 232D to 232F, which decode LSB side encoded data, alternately to send read requests to the memory controller 234.

When MSB side encoded data and LSB side encoded data are separated in output data of one system as in the first modification of the first embodiment and the first modification of the second embodiment, the XDR-RAM 236 is controlled as follows. In other words, the memory controller 234 reads MSB side encoded data and LSB side encoded data based on encoded data length information at the beginning of data under the control of the main CPU core 231 corresponding to read requests from the sub CPU cores 232A to 232C and the sub CPU cores 232D to 232F. The MSB side encoded data are supplied to the sub CPU cores 232A to 232C and the LSB side encoded data are supplied to the sub CPU cores 232D to 232F.

When MSB side encoded data and LSB side encoded data are independently supplied as in the second modification of the first embodiment and the second modification of the second embodiment, encoded data that are read from the XDR-RAM 236 are controlled as follows. In other words, the memory controller 234 reads MSB side encoded data and LSB side encoded data corresponding to read requests from the sub CPU cores 232A to 232C and the sub CPU cores 232D to 232F under the control of the main CPU core 231, supplies the MSB side encoded data to the sub CPU cores 232A to 232C, and supplies the LSB side encoded data to the sub CPU cores 232D to 232F.

The sub CPU cores 232A to 232C and sub CPU cores 232D to 232F decode the supplied encoded data in a predetermined manner. The sub CPU cores 232A to 232C and sub CPU cores 232D to 232F can perform the decoding processes in parallel.

As an example of the decoding process of a sub CPU core, the sub CPU core 232A, which decodes MSB side encoded data of MSB side bits of pixel data of R color, performs the decoding process for the supplied MSB side encoded data corresponding to the run-length process in the unit of MSB side bits and the run-length process in the unit of a predetermined number of bytes and stores the decoded MSB side bits to the second region of the XDR-RAM 236 assigned as the MSB side output memory 34 in a predetermined manner.

As another example of the decoding process of a sub CPU core, the sub CPU core 232D, which decodes LSB side encoded data of LSB side bits of pixel data of R color, performs decoding processes for the supplied LSB side encoded data corresponding to the Huffman code decoding process and DPC decoding process and stores the decoded LSB side bits to the third area of the XDR-RAM 236 assigned as the LSB side output memory 37.

After the decoding process has been completed for example for one frame, the main CPU core 231 controls the memory controller 234 to read MSB side bits and LSB side bits from the second region and the third region of the XDR-RAM 236 and performs the combining process for the MSB side bits and LSB side bits. The combined and restored pixel data having the original number of quantizer bits are temporarily recorded for example in the hard disk drive 206 and then output through the USB I/F 207, the communication I/F 215, or a recordable record medium loaded into the drive device 211.

Thus, according to the third embodiment, the decoding process for encoded data of picture data is performed by the plurality of sub CPU cores 232A to 232H in a predetermined unit of encoded data. Thus, the decoding process for encoded data can be performed at very high speed in comparison with the structure of which the process is performed by one CPU 203 described with reference to FIG. 60.

It should be understood by those skilled in the art that various modifications, combinations, sub-combinations and alternations may occur depending on design requirements and other factors insofar as they are within the scope of the appended claims or the equivalents thereof.

What is claimed is:

1. An encoding method of losslessly encoding picture data composed of pixel data, the encoding method comprising the steps of:
    separating the pixel data whose number of quantizer bits is larger than eight bits into a first portion and a second portion, the first portion being composed of eight bits on an LSB side, the second portion being composed of remaining bits on an MSB side excluding the first portion;
    losslessly performing a first encoding process for the first portion; and
    losslessly performing a second encoding process for the second portion, the second encoding process being different from the first encoding process,
    wherein the second encoding process is performed by combining a first run-length process and a second run-length process, the first run-length process being performed by comparing a predetermined number of bytes composed of a plurality of second portions of adjacent pixels in the unit of the second portion, the second run-length process being performed by comparing the predetermined number of bytes composed of the plurality of second portions of the adjacent pixels in the unit of the predetermined number of bytes.

2. The encoding method as set forth in claim 1, wherein the first encoding process is performed by entropy-encoding a difference of the first portions of adjacent pixels.

3. The encoding method as set forth in claim 1, wherein the first run-length process is performed when all the plurality of second portions contained in the predetermined number of bytes match.

4. The encoding method as set forth in claim 3, wherein when the first run-length process has been performed, a run number is not output.

5. The encoding method as set forth in claim 1, wherein when the first run-length process has not been performed, the second run-length process is not performed.

6. The encoding method as set forth in claim 1, wherein the second encoding process is performed by:
    outputting a first flag which denotes whether or not the first run-length process has been performed and a second flag which denotes whether or not the second run-length process has been performed,
    outputting a level of a run of the first run-length process when the first flag denotes that the first run-length process has been performed,
    outputting the predetermined number of bytes composed of the plurality of second portions when the first flag denotes that the first run-length process has not been performed, and
    outputting a run number of the second run-length process when the second flag denotes that the second run-length process has been performed.

7. The encoding method as set forth in claim 1, wherein the second encoding process is performed by:
    outputting a first flag which denotes whether or not the first run-length process has been performed,
    outputting a level of a run of the first run-length process and a second flag which denotes whether or not the second run-length process has been performed, when the first flag denotes that the first run-length process has been performed,
    outputting the predetermined number of bytes composed of the plurality of second portions, when the first flag denotes that the first run-length process has not been performed, and
    outputting a run number of the second run-length process, when the second flag denotes that the second run-length process has been performed.

8. The encoding method as set forth in claim 1, wherein the predetermined number of bytes is one byte and picture data composed of pixel data whose number of quantizer bits is equal to or larger than nine hits and equal to or smaller than 12 bits are encoded.

9. The encoding method as set forth in claim 1, wherein the predetermined number of bytes is two bytes and picture data composed of pixel data whose number of quantizer bits is equal to or larger than nine bits and equal to or smaller than 15 bits are encoded.

10. The encoding method as set forth in claim 1,
wherein the first encoding step and the second encoding step are executed in parallel.

11. The encoding method as set forth in claim 1,
wherein the first encoding step and the second encoding step are executed in parallel for pixels of red, green, and blue or pixels of luminance Y, color difference Cb, and color difference Cr.

12. The encoding method as set forth in claim 1,
wherein the first encoding step and the second encoding step are executed in parallel for regions into which a frame is divided in a predetermined manner.

13. The encoding method as set forth in claim 1,
wherein an output at the first encoding step and an output at the second encoding step are interleaved in a predetermined unit and output.

14. The encoding method as set forth in claim 13,
wherein the second encoding process is performed in the unit of the predetermined number of bytes composed of a plurality of second portions of adjacent pixels, and
wherein an output at the second encoding process for the predetermined number of bytes composed of the plurality of second portions and an output at the first encoding process corresponding to the output at the second encoding process are interleaved and output.

15. The encoding method as set forth in claim 1,
wherein an output at the first encoding step and an output at the second encoding step are combined.

16. The encoding method as set forth in claim 1,
wherein an output at the first encoding and an output at the second encoding process are independent.

17. An encoding apparatus which losslessly encodes picture data composed of pixel data, the encoding apparatus comprising:
a separation device which separates the pixel data whose number of quantizer bits is larger than eight bits into a first portion and a second portion, the first portion being composed of eight bits on an LSB side, the second portion being composed of remaining bits on an MSB side excluding the first portion;
a first encoding device which losslessly performs a first encoding process for the first portion; and
a second encoding device which losslessly performs a second encoding process for the second portion, the second encoding process being different from the first encoding process,
wherein the second encoding process is performed by combining a first run-length process and a second run-length process, the first run-length process being performed by comparing a predetermined number of bytes composed of a plurality of second portions of adjacent pixels in the unit of the second portion, the second run-length process being performed by comparing the predetermined number of bytes composed of the plurality of second portions of the adjacent pixels in the unit of the predetermined number of bytes.

18. A decoding method of decoding encoded data, comprising the steps of:
decoding first encoded data for which a first portion composed of eight bits on an LSB side of pixel data whose number of quantizer bits is larger than eight bits has been losslessly encoded according to a first encoding process:
decoding second encoded data for which a second portion composed of remaining bits on the MSB side of the pixel data excluding the first portion has been losslessly encoded according to a second encoding process, the second encoding process being different from the first encoding process; and
combining the first decoded data, decoded and outputted at the first decoding step, and the second decoded data, decoded and outputted at the second decoding step, such that pixel data of the first decoded data corresponding to pixel data of the second decoded data,
wherein the second encoded data contain:
a first flag which denotes whether or not a first run-length process has been performed, in the first run-length process, a predetermined number of bytes composed of the plurality of second portions of adjacent pixels are compared in the unit of the second portion,
a second flag which denotes whether or not a second run-length process has been performed, in the second run length process, the predetermined number of bytes composed of the plurality of second portions of the adjacent pixels are compared in the unit of the predetermined number of bytes,
a level of a run of the first run-length process, when the first flag denotes that the first run-length process has been performed;
a predetermined number of bytes composed of the plurality of second portions, when the first flag denotes that the first run-length process has not been performed; and
a run number of the second run-length process, when the second flag denotes that the second run-length process has been performed, and
wherein the second decoding step is performed by:
obtaining the first flag and the second flag from the second encoded data;
obtaining the level of the run and repeatedly outputting the level of the run the number of times corresponding to the number of quantizer bits of the pixel data, when the first flag denotes that the first run-length process has been performed,
obtaining the run number of the second run-length process and repeatedly outputting the level of the run that has been repeatedly output the number of times corresponding to the number of quantizer bits of the pixel data the number of times corresponding to the run number, when the second flag denotes that the second run-length process has been performed, and
obtaining the predetermined number of bytes composed of the plurality of second portions and outputting them, when the first flag denotes that the first run-length process has not been performed.

19. The decoding method as set forth in claim 18,
wherein the first encoded data have been formed by entropy-encoding a difference of the first potions of adjacent pixels, and
wherein the first decoding step is performed by decoding entropy code of the first encoded data and successively adding decoded data every adjacent eight pixels.

20. A decoding method of decoding encoded data, comprising the steps of:
decoding first encoded data for which a first portion composed of eight bits on an LSB side of pixel data whose number of quantizer bits is larger than eight bits has been losslessly encoded according to a first encoding process;
decoding second encoded data for which a second portion composed of remaining bits on the MSB side of the pixel data excluding the first portion has been losslessly encoded according to a second encoding process, the second encoding process being different from the first encoding process; and combining the first decoded data, decoded and outputted at the first decoding step, and the second decoded data, decoded and outputted at the second decoding step, such that pixel data of the first decoded data corresponding to pixel data of the second decoded data wherein the second encoded data contain:
- a first flag which denotes whether or not the first run-length process has been performed,
- a level of a run of the first run-length process and a second flag which denotes whether or not the second run-length process has been performed, when the first flag denotes that the first run-length process has been performed,
- a predetermined number of bytes composed of the plurality of second portions, when the first flag denotes that the first run-length process has not been performed, and
- a run number of the second run-length process, when the second flag denotes that the second run-length process has been performed, and wherein the second decoding step is performed by:
- obtaining the first flag from the second encoded data;
- obtaining the level of the run and repeatedly outputting the level of the run the number of times corresponding to the number of quantizer bits of the pixel data, when the first flag denotes that the first run-length process has been performed,
- obtaining the run number of the second run-length process and repeatedly outputting the level of the run that has been repeatedly output the number of times corresponding to the number of quantizer bits of the pixel data the number of times corresponding to the run number, when the second flag denotes that the second run-length process has been performed, and
- obtaining the predetermined number of bytes composed of the plurality of second portions and outputting them, when the first flag denotes that the first run-length process has not been performed.

21. The decoding method as set forth in claim 18,
wherein the predetermined number of bytes is one byte, and
wherein in the encoded data, the picture data composed of the pixel data whose number of quantizer bits is equal to or larger than nine bits and equal to or smaller than 12 bits have been encoded.

22. The decoding method as set forth in claim 18,
wherein the predetermined number of bytes is two bytes, and
wherein in the encoded data, the picture data composed of the pixel data whose number of quantizer bits is equal to or larger than nine bits and equal to or smaller than 15 bits have been encoded.

23. The decoding method as set forth in claim 18,
wherein the first decoding step and the second decoding step are executed in parallel.

24. The decoding method as set forth in claim 18,
wherein the first decoding step and the second decoding step are executed in parallel for pixels of red, green, and blue or pixels of luminance Y, color difference Cb, and color difference Cr.

25. The decoding method as set forth in claim 18,
wherein the first decoding step and the second decoding step are executed in parallel for regions into which a frame is divided in a predetermined manner.

26. The decoding method as set forth in claim 18,
wherein the first encoding data and the second encoding data have been interleaved in a predetermined unit and output, and
wherein the first decoding step and the second decoding step are performed by alternately reading the first encoded data and the second encoded data from the encoded data and decoding the first encoded data and the second encoded data.

27. The decoding method as set forth in claim 26,
wherein the second encoding process has been performed in the unit of a predetermined number of bytes composed of a plurality of second portions of adjacent pixels, and
wherein an output of the second encoding process for the predetermined number of bytes composed of the plurality of second portions and an output of the first encoding process corresponding to the output of the second encoding process have been interleaved and output.

28. The decoding method as set forth in claim 18,
wherein the first encoded data and the second encoded data have been combined, information which represents a boundary position of the first encoded data and the second encoded data has been added thereto, and output, and
wherein the first decoding step and the second decoding step arc performed by reading the first encoded data and the second encoded data from the encoded data based on the information which represents the boundary position.

29. The decoding method as set forth in claim 18,
wherein the first encoded data and the second encoded data have been output independently as encoded data, and
wherein the first decoding step and the second decoding step are performed by reading the first encoded data and the second encoded data and decoding the first encoded data and the second encoded data.

30. A decoding apparatus which decodes encoded data, comprising:
- a first decoding device which decodes first encoded data for which a first portion composed of eight bits on an LSB side of pixel data whose number of quantizer bits is larger than eight bits has been losslessly encoded according to a first encoding process;
- a second decoding device which decodes second encoded data for which a second portion composed of remaining bits on the MSB side of the pixel data excluding the first portion has been losslessly encoded according to a second encoding process, the second encoding process being different from the first encoding process; and
- a data combining device which combines the first decoded data that have been decoded and outputted by the first decoding device and the second decoded data that have been decoded and outputted by the second decoding device such that pixel data of the first decoded data corresponding to pixel data of the second decoded data, wherein the second encoded data contain:
- a first flag which denotes whether or not a first run-length process has been performed, in the first run-length process, a predetermined number of bytes composed of the plurality of second portions of adjacent pixels are compared in the unit of the second portion,
- a second flag which denotes whether or not a second run-length process has been performed, in the second run length process, the predetermined number of bytes composed of the plurality of second portions of the adjacent pixels are compared in the unit of the predetermined number of bytes, a level of a run of the first run-length process when the first flag denotes that the first run-length process has been performed;

a predetermined number of bytes composed of the plurality of second portions, when the first flag denotes that the first run-length process has not been performed; and a run number of the second run-length process, when the second flag denotes that the second run-length process has been performed, and wherein the second decoding process is performed by:

obtaining the first flag and the second flag from the second encoded data;

obtaining the level of the run and repeatedly outputting the level of the run the number of times corresponding to the number of quantizer bits of the pixel data, when the first flag denotes that the first run-length process has been performed, obtaining the run number of the second run-length process and repeatedly outputting the level of the run that has been repeatedly output the number of times corresponding to the number of quantizer bits of the pixel data the number of times corresponding to the run number, when the second flag denotes that the second run-length process has been performed, and obtaining the predetermined number of bytes composed of the plurality of second portions and outputting them, when the first flag denotes that the first run-length process has not been performed.

* * * * *